(12) United States Patent
Sewall et al.

(10) Patent No.: US 11,806,795 B2
(45) Date of Patent: Nov. 7, 2023

(54) SECURITY ARTICLES COMPRISING GROUPS OF MICROSTRUCTURES MADE BY END MILLING

(71) Applicant: 3M INNOVATIVE PROPERTIES COMPANY, St. Paul, MN (US)

(72) Inventors: Nelson D. Sewall, Forest Lake, MN (US); Christopher S. Grinde, Baldwin, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1120 days.

(21) Appl. No.: 16/485,085

(22) PCT Filed: Feb. 5, 2018

(86) PCT No.: PCT/US2018/016851
§ 371 (c)(1),
(2) Date: Aug. 9, 2019

(87) PCT Pub. No.: WO2018/151964
PCT Pub. Date: Aug. 23, 2018

(65) Prior Publication Data
US 2023/0201932 A1 Jun. 29, 2023

Related U.S. Application Data

(60) Provisional application No. 62/527,511, filed on Jun. 30, 2017, provisional application No. 62/515,993, (Continued)

(51) Int. Cl.
*B23C 5/10* (2006.01)
*B23C 3/10* (2006.01)
*G02B 5/124* (2006.01)

(52) U.S. Cl.
CPC ............... *B23C 5/10* (2013.01); *B23C 3/10* (2013.01); *G02B 5/124* (2013.01); *B23C 2265/08* (2013.01)

(58) Field of Classification Search
None
See application file for complete search history.

(56) References Cited

U.S. PATENT DOCUMENTS

| 1,591,572 A | 7/1926 | Stimson |
| 3,684,348 A | 8/1972 | Rowland |

(Continued)

FOREIGN PATENT DOCUMENTS

| CN | 2284663 | 6/1998 |
| CN | 202006295 | 10/2011 |

(Continued)

OTHER PUBLICATIONS

International Search report for PCT International Application No. PCT/US2018/016851 dated May 10, 2018, 6 pages.

*Primary Examiner* — Jennifer D. Carruth

(57) ABSTRACT

The present disclosure relates to end milling methods for making microstructures, a tool comprising such microstructures, the microstructures, and replications thereof, where the microstructures are part of a structured surface configured as a security article. Some of the microstructures are configured differently from others to define an optically detectable indicia in the structured surface. Microstructures in a first group may for example differ from microstructures in a second group in terms of one or more of size, orientation, cube corner type, and dihedral angle value(s), to define the indicia or a portion thereof. The microstructures may comprise full or truncated cube corner elements, and the article may be a retroreflective sheeting.

20 Claims, 42 Drawing Sheets

Related U.S. Application Data filed on Jun. 6, 2017, provisional application No. 62/458,812, filed on Feb. 14, 2017.

(56) References Cited

U.S. PATENT DOCUMENTS

| | | | |
|---|---|---|---|
| 3,712,706 A | 1/1973 | Stamm | |
| 3,833,285 A | 9/1974 | Heenan | |
| 3,863,525 A | 2/1975 | Cale | |
| 3,926,402 A | 12/1975 | Heenan | |
| 4,025,159 A | 5/1977 | McGrath | |
| 4,176,992 A | 12/1979 | Ross | |
| 4,319,615 A | 3/1982 | Ditmanson | |
| 4,478,769 A | 10/1984 | Pricone | |
| 4,533,286 A | 8/1985 | Kishi | |
| 4,588,258 A | 5/1986 | Hoopman | |
| 4,601,861 A | 7/1986 | Pricone | |
| 4,775,219 A | 10/1988 | Appeldorn | |
| 4,968,195 A | 11/1990 | Hayakawa | |
| 5,117,304 A | 3/1992 | Huang | |
| 5,156,863 A | 10/1992 | Pricone | |
| 5,378,091 A | 1/1995 | Nakamura | |
| 5,565,151 A | 10/1996 | Nilsen | |
| 5,814,355 A | 9/1998 | Shusta | |
| 5,840,406 A | 11/1998 | Nilsen | |
| 5,981,032 A | 11/1999 | Smith | |
| 6,015,214 A | 1/2000 | Heenan | |
| 6,021,559 A | 2/2000 | Smith | |
| 6,120,879 A | 9/2000 | Szczech | |
| 6,149,354 A | 11/2000 | Walters | |
| 6,159,407 A | 12/2000 | Krinke | |
| 6,253,442 B1 | 7/2001 | Benson | |
| 6,257,860 B1 | 7/2001 | Luttrell | |
| 6,428,252 B1 | 8/2002 | Oldani | |
| 6,772,039 B2 | 8/2004 | Kakino et al. | |
| 6,884,371 B2 | 4/2005 | Smith | |
| 7,021,873 B2 | 4/2006 | Chihara | |
| 7,156,527 B2 | 1/2007 | Smith | |
| 7,257,877 B2 | 8/2007 | Hanaoka | |
| 7,370,981 B2 | 5/2008 | Couzin | |
| 7,410,604 B2 | 8/2008 | Erickson | |
| 7,815,319 B2 | 10/2010 | Mimura | |
| 7,930,954 B2 | 4/2011 | Asakawa | |
| 8,728,610 B2 | 5/2014 | Benson | |
| 9,207,662 B2 | 12/2015 | Keller | |
| 9,470,822 B2 | 10/2016 | Smith | |
| 9,489,339 B2 | 11/2016 | Mackman | |
| 10,108,176 B2 | 10/2018 | Sherbrooke et al. | |
| 10,449,610 B2 | 10/2019 | Brambs | |
| 10,507,535 B2 | 12/2019 | Kobayashi | |
| 2001/0026860 A1 | 10/2001 | Benson | |
| 2002/0071732 A1 | 6/2002 | Funaki | |
| 2003/0075815 A1 | 4/2003 | Couzin | |
| 2003/0227682 A1 | 12/2003 | Sewall | |
| 2003/0227683 A1 | 12/2003 | Sewall | |
| 2004/0114243 A1 | 6/2004 | Couzin | |
| 2004/0174601 A1 | 9/2004 | Smith | |
| 2004/0174602 A1 | 9/2004 | Smith | |
| 2005/0088743 A1 | 4/2005 | Sawayama | |
| 2005/0151119 A1 | 7/2005 | Jones | |
| 2005/0246052 A1 | 11/2005 | Coleman et al. | |
| 2006/0007542 A1 | 1/2006 | Smith | |
| 2006/0291969 A1 | 12/2006 | Koch | |
| 2007/0014644 A1 | 1/2007 | Masuyama | |
| 2007/0147965 A1 | 6/2007 | Yamada | |
| 2007/0177268 A1 | 8/2007 | Benson | |
| 2008/0233353 A1 | 9/2008 | Sakurai | |
| 2009/0114347 A1 | 5/2009 | Gelli | |
| 2009/0240367 A1 | 9/2009 | Takahashi et al. | |
| 2010/0165463 A1* | 7/2010 | Mimura | G02B 5/124 359/530 |
| 2011/0013281 A1 | 1/2011 | Mimura | |
| 2011/0149395 A1 | 6/2011 | Benson | |
| 2012/0081787 A1 | 4/2012 | Mimura | |
| 2012/0128291 A1 | 5/2012 | Teitelbaum | |
| 2012/0207869 A1 | 8/2012 | Imai | |
| 2012/0229898 A1 | 9/2012 | Northey | |
| 2012/0282022 A1 | 11/2012 | Phebus | |
| 2013/0034682 A1 | 2/2013 | Free | |
| 2014/0078586 A1 | 3/2014 | Spurgeon | |
| 2014/0078587 A1 | 3/2014 | Orensteen | |
| 2014/0340750 A1 | 11/2014 | Neal | |
| 2015/0267593 A1 | 9/2015 | Lauder et al. | |
| 2015/0298225 A1 | 10/2015 | Ueno | |
| 2016/0033694 A1 | 2/2016 | Smith | |
| 2017/0010395 A1 | 1/2017 | Smith | |
| 2018/0104749 A1 | 4/2018 | Brambs | |
| 2018/0154461 A1 | 6/2018 | Nishio | |
| 2018/0339350 A1 | 11/2018 | Mura | |
| 2020/0016669 A1 | 1/2020 | Brambs | |
| 2020/0025982 A1 | 1/2020 | Gubela | |

FOREIGN PATENT DOCUMENTS

| | | |
|---|---|---|
| CN | 102736150 | 10/2012 |
| CN | 204094211 | 1/2015 |
| CN | 105372732 | 3/2016 |
| EP | 0 844 056 | 5/1998 |
| EP | 1 965 232 | 9/2008 |
| EP | 2 594 149 | 5/2013 |
| JP | 58-164617 | 9/1983 |
| JP | 59-120517 | 7/1984 |
| JP | 62-292309 | 12/1987 |
| JP | 1-170512 | 7/1989 |
| JP | 3-8688 | 1/1991 |
| JP | 3-60909 | 3/1991 |
| JP | 3-130318 | 12/1991 |
| JP | 4-146018 | 5/1992 |
| JP | 5-41623 | 6/1993 |
| JP | 6-15922 | 3/1994 |
| JP | 6-78076 | 11/1994 |
| JP | 8-252713 | 10/1996 |
| JP | 9-160624 | 6/1997 |
| JP | 10-34422 | 2/1998 |
| JP | 2000-263308 | 9/2000 |
| JP | 2001-1231 | 1/2001 |
| JP | 2001033609 | 2/2001 |
| JP | 2001-310211 | 11/2001 |
| JP | 2001-315020 | 11/2001 |
| JP | 2002-280677 | 9/2002 |
| JP | 2003-15528 | 1/2003 |
| JP | 2003-256012 | 9/2003 |
| JP | 2004-34191 | 2/2004 |
| JP | 2005049385 | 2/2005 |
| JP | 2006-189664 | 7/2006 |
| JP | 2008-000844 | 1/2008 |
| JP | 2009134285 | 6/2009 |
| JP | 2010-82943 | 4/2010 |
| JP | 2011-212971 | 10/2011 |
| JP | 2012108213 | 6/2012 |
| JP | 2014-71415 | 4/2014 |
| KR | 10-0616371 | 8/2006 |
| KR | 1020100079855 | 7/2010 |
| WO | WO 1995-11464 | 4/1995 |
| WO | WO 1995-11471 | 4/1995 |
| WO | WO 1997-12727 | 4/1997 |
| WO | WO 1997-27035 | 7/1997 |
| WO | WO 1997-041464 | 11/1997 |
| WO | WO 2000-60385 | 10/2000 |
| WO | WO 2001-062461 | 8/2001 |
| WO | WO 2002-066190 | 8/2002 |
| WO | WO 2002/079819 | 10/2002 |
| WO | WO 2007-127167 | 11/2007 |
| WO | WO 2008-024861 | 2/2008 |
| WO | WO 2014-116431 | 7/2014 |
| WO | WO 2014-151368 | 9/2014 |
| WO | WO 2016-100733 | 6/2016 |

* cited by examiner

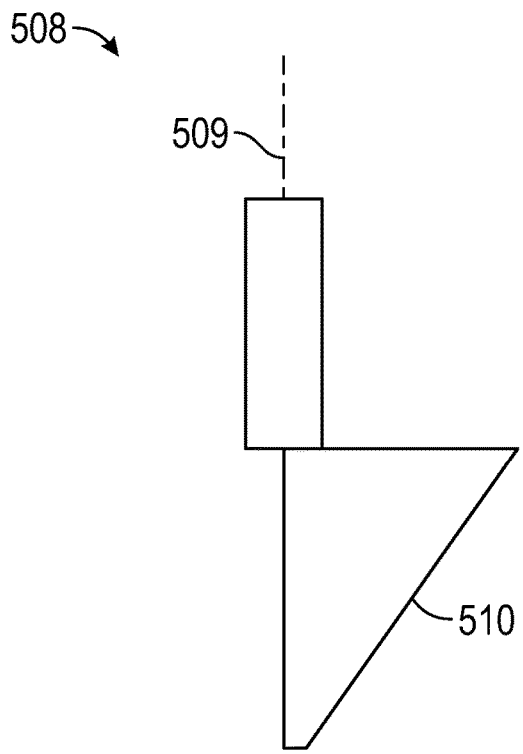
FIG. 5A
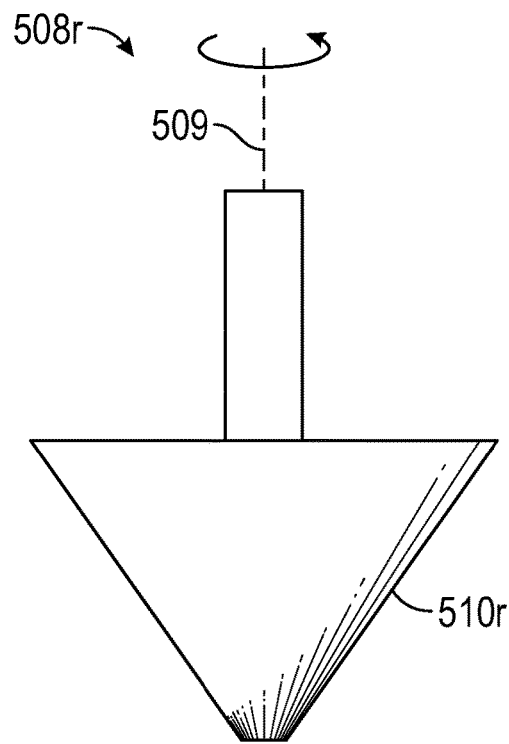
FIG. 5B
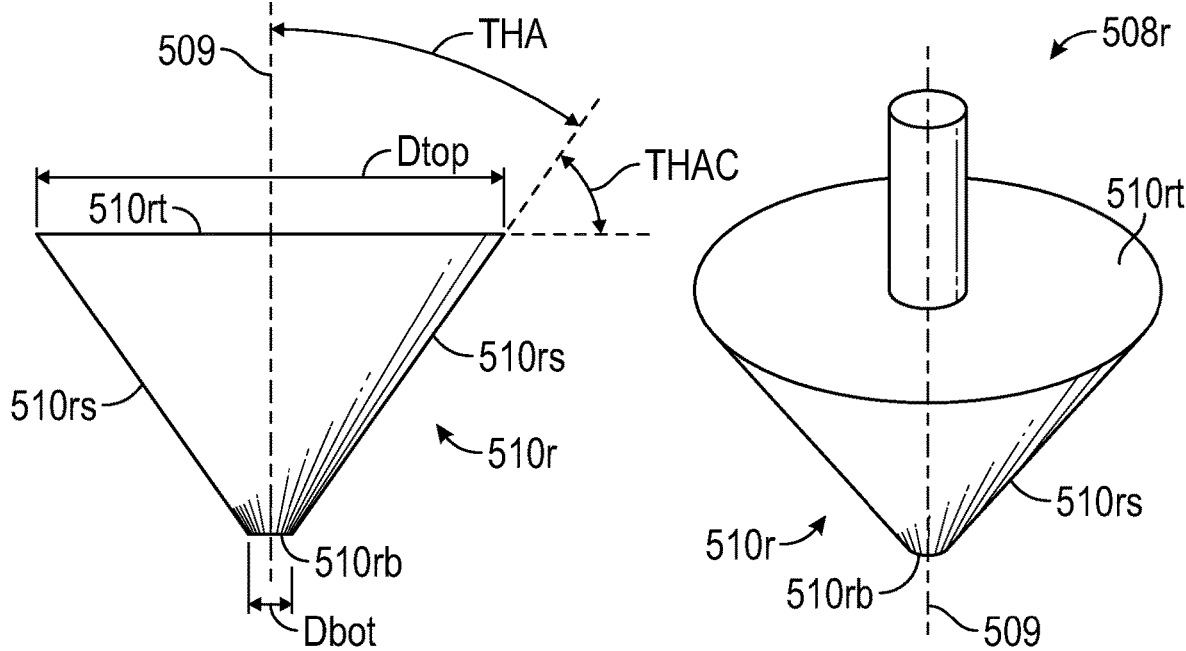
FIG. 5C
FIG. 5D

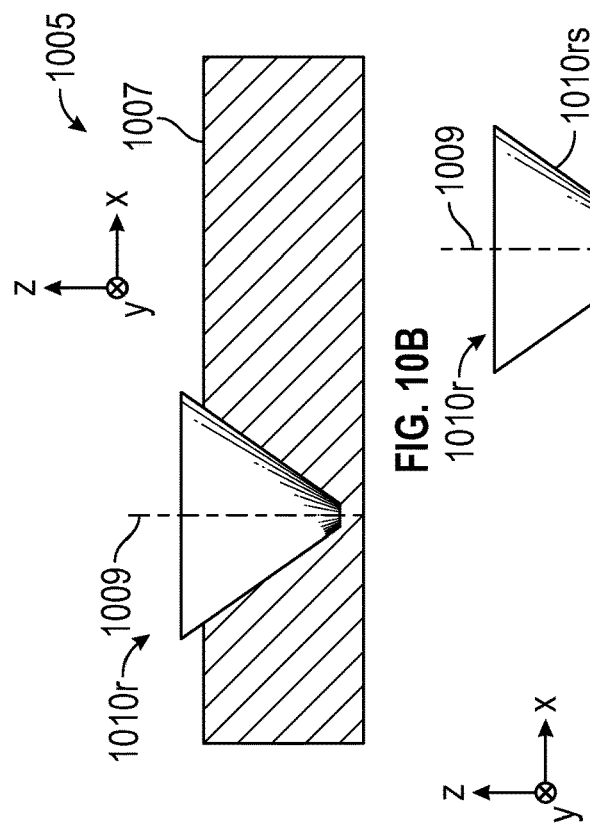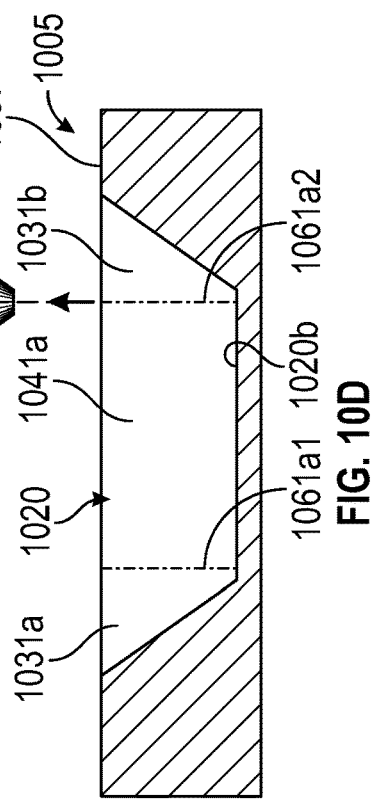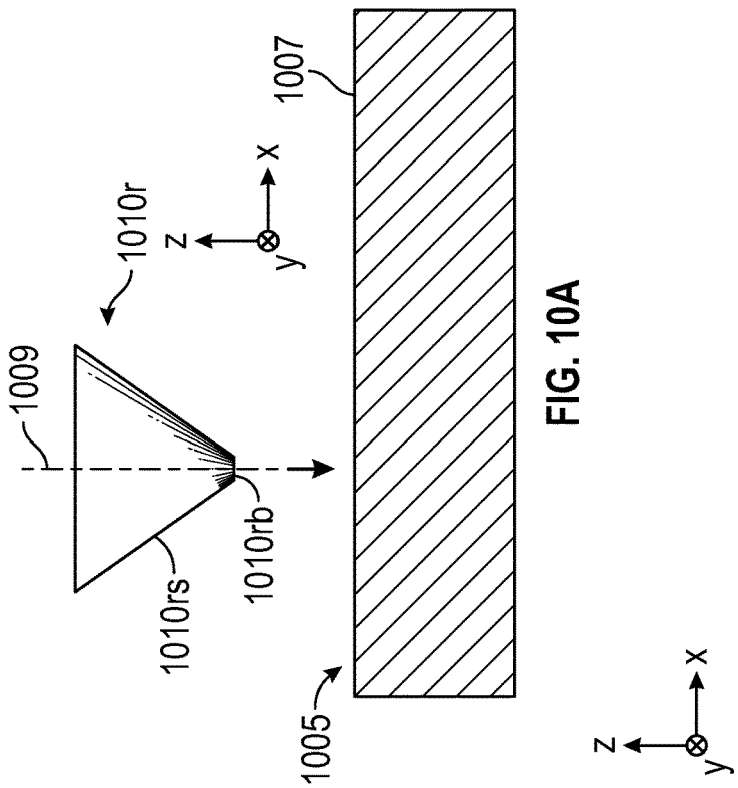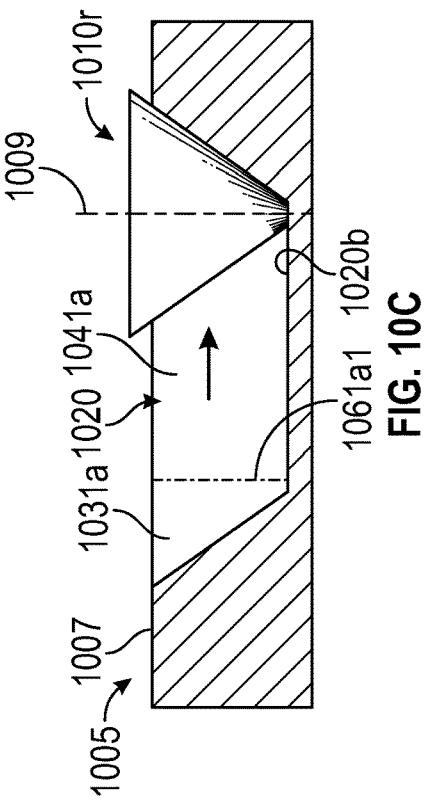
FIG. 10A
FIG. 10B
FIG. 10C
FIG. 10D

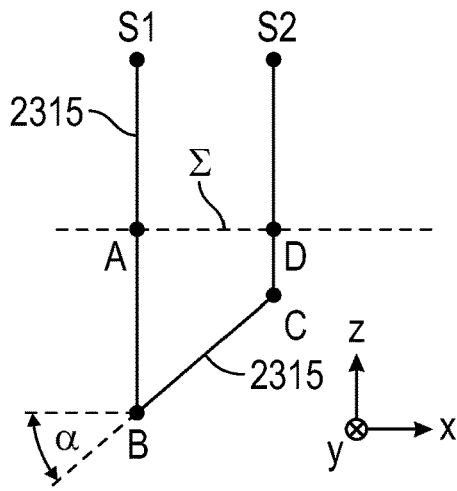
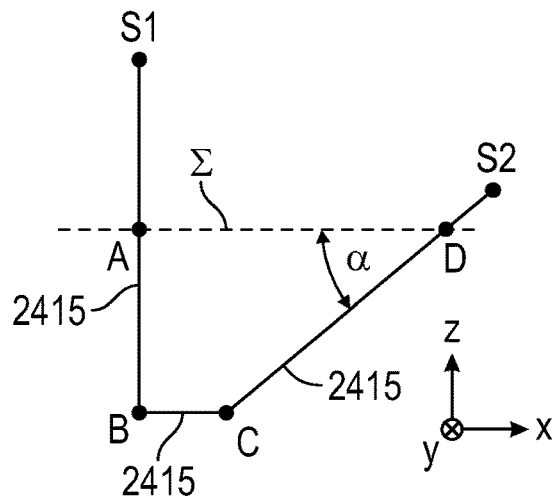
FIG. 23     FIG. 24
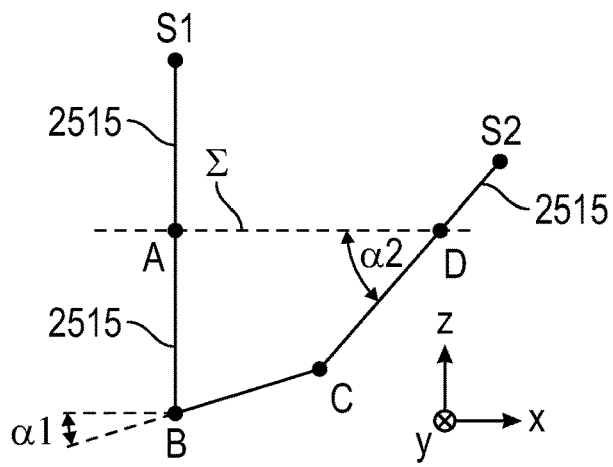
FIG. 25
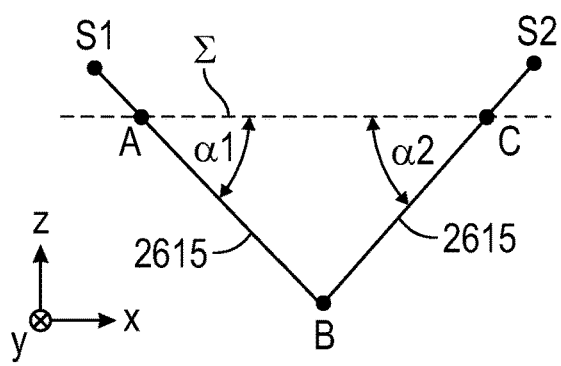
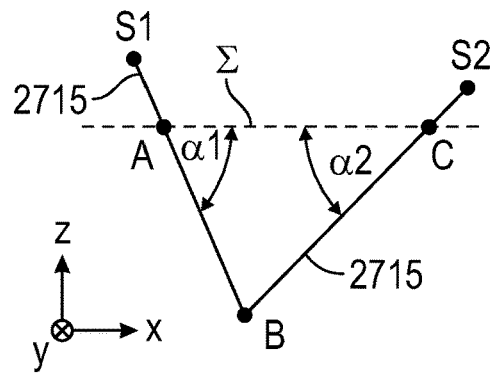
FIG. 26     FIG. 27

SECURITY ARTICLES COMPRISING GROUPS OF MICROSTRUCTURES MADE BY END MILLING

CROSS REFERENCE TO RELATED APPLICATIONS

This application is a national stage filing under 35 U.S.C. 371 of PCT/US2018/016851, filed Feb. 5, 2018, which claims the benefit of Provisional Application No. 62/458,812, filed Feb. 14, 2017 and Provisional Application No. 62/515,993, filed Jun. 6, 2017 and Provisional Application No. 62/527,511, filed Jun. 30, 2017, the disclosures of all of which are incorporated by reference in their entirety herein.

CROSS REFERENCE TO RELATED APPLICATIONS

This application claims the benefit under 35 U.S.C. § 119(e) of the following U.S. provisional applications, each of which is incorporated herein by reference: U.S. Ser. No. 62/458,812, "End Milling Methods for Making Microstructures, Tools Comprising Microstructures, and Microstructures", filed Feb. 14, 2017; U.S. Ser. No. 62/515,993, "Non-Orthogonal Cube Corner Elements and Arrays Thereof Made by End Milling", filed Jun. 6, 2017; and U.S. Ser. No. 62/527,511, "Security Articles Comprising Groups of Microstructures Made by End Milling", filed Jun. 30, 2017.

FIELD

The present disclosure relates primarily to microstructures, including sheeting, films, substrates, tools, and other articles having at least one surface that contains microstructures, with particular application to such articles in which the microstructures include cube corner elements, and where the microstructures are arranged or distributed on or in the surface to define indicia that may be used to establish authenticity of the article or for other security purposes. The disclosure also pertains to related methods, systems, articles, and components.

BACKGROUND

Articles in which microstructures are formed in a surface of the article are known and have many uses and applications, including mechanical applications such as abrasives, and optical applications such as light directing films and other light directing materials, including such films and materials configured for use as security articles. One known category of microstructures is the class of cube corner elements, which are used to make retroreflective films.

Simply put, a cube corner element is a structure having a set of three flat reflective faces or facets, referred to as optical faces, the optical faces being grouped together and oriented to be orthogonal to each other. With this geometrical arrangement, incident light that strikes a first one of the faces is reflected to a second such face, and then to the third reflective face. The laws of reflection ensure that the light reflected by the third face propagates in a direction that is essentially opposite to the direction of the incident light.

Retroreflective films and materials are thus characterized by the ability to redirect light, even light that is obliquely incident on the film, back toward the originating light source. Retroreflective sheeting is used widely for a variety of traffic and personal safety uses. For example, retroreflective sheeting is commonly employed in road signs, barricades, license plates, pavement markers, and marking tape, as well as retroreflective tapes configured for application to vehicles or clothing. Retroreflective materials have also been used as security articles.

Microstructured sheeting, such as cube corner retroreflective sheeting, is commonly produced by first manufacturing a master mold that has a structured surface. The structured surface of the master mold corresponds either to the desired microstructured surface geometry of the finished sheeting product, or to a negative (inverted) copy thereof, depending upon whether the finished sheeting is designed to incorporate microstructured protrusions, such as cube corner pyramids that jut out of a surface, or microstructured indentations or recesses, such as cube corner cavities that dip or sink into a surface, or both microstructured protrusions and recesses. The master mold is then replicated using any suitable technique such as conventional nickel electroforming to produce tooling for forming sheeting by processes such as embossing, extruding, or cast-and-curing. U.S. Pat. No. 5,156,863 (Pricone et al.) provides an illustrative overview of processes for forming tooling used in the manufacture of cube corner retroreflective sheeting. Known methods for manufacturing the original master mold include pin bundling techniques, direct machining techniques, and techniques that employ laminae.

In pin bundling techniques, a plurality of pins, each having a geometric shape such as a cube corner element on one end, are assembled together to form a master mold. U.S. Pat. No. 1,591,572 (Stimson) and U.S. Pat. No. 3,926,402 (Heenan) provide illustrative examples. Pin bundling offers the ability to manufacture a wide variety of cube corner geometries in a single mold, because each pin is individually machined. However, such techniques are generally considered to be impractical for making small cube corner elements—e.g. those having a cube height less than about 1 millimeter—because of the large number of pins and the diminishing size thereof required to be precisely machined and then arranged in a bundle to form the mold.

In direct machining techniques, series of grooves are formed in the surface of a planar substrate such as a metal plate to form a master mold comprising microstructures, typically, truncated cube corner elements. In direct machining, a large number of individual faces are typically formed along the same groove formed by continuous motion of a cutting tool. Thus, such individual faces maintain their alignment throughout the mold fabrication procedure. For this reason, direct machining techniques offer the ability to accurately machine very small cube corner elements. A drawback to direct machining techniques, however, has been reduced design flexibility in the types of cube corner geometries that can be produced, due to a reliance on grooves of constant depth to form the faces of the microstructures, which in turn places restrictions on the achievable optical characteristics of the finished cube corner sheeting, such as the "total light return" of the sheeting, discussed below.

In techniques that employ laminae, a plurality of thin sheets or plates, referred to as laminae, are machined to have grooves or other geometric shapes formed on one longitudinal edge thereof, and are then assembled to form a master mold. Techniques that employ laminae are generally less labor intensive than pin bundling techniques because fewer parts are separately machined. For example, one lamina can typically have about 400-1000 individual cube corner elements formed therein, in comparison to one pin having only a single cube corner element. Illustrative examples of techniques that employ laminae to make cube corner sheeting and related microstructured articles can be found in EP 0 844 056 A1 (Mimura et al.), U.S. Pat. No. 5,981,032 (Smith et al.), U.S. Pat. No. 6,015,214 (Heenan et al.), U.S. Pat. No. 6,257,860 (Luttrell et al.), and U.S. Pat. No. 7,156,527 (Smith). However, techniques employing laminae have less design flexibility compared to that achievable by pin bundling. For example, the linear or stacked arrangement of the laminae tends to produce microstructured elements arranged in rows, which therefore imposes limitations on the design options available for forming microstructures.

Cube corner elements with non-orthogonal optical faces and dihedral angles are known. See for example U.S. Pat. No. 3,833,285 (Heenan) and U.S. Pat. No. 4,775,219 (Appeldorn et al.). In the Heenan '285 patent, each of a plurality of reflector elements at the rear of a reflector has three dihedral angles defined by the intersection of adjacent faces, and two of the dihedral angles of all of the reflector elements are substantially 90 degrees, and the third dihedral angle of at least some of the reflector elements is substantially greater than the angle of the other two dihedral angles, so that light reflected by the reflector is diverged into an elongated pattern. In the Appeldorn '219 patent, the three lateral faces of cube corner elements are formed by three intersecting sets of parallel V-shaped grooves, and at least one of the sets includes, in a repeating pattern, at least two groove side angles that differ from one another, such that the array of cube corner elements is divided into repeating sub-arrays that each comprise a plurality of cube corner elements in a plurality of distinctive shapes that retroreflect light in distinctively shaped light patterns.

SUMMARY

Cube corner elements have historically been made by pin bundling, by direct machining, or by lamina-based fabrication techniques. We have developed a completely new technique for making cube corner elements that involves end milling. The new technique is not limited to the fabrication of cube corner elements, but can be used to make many other types of structures as well, including many types of microstructures. The new technique can be used to make distinctive security articles in which cube corner elements or other microstructures made by the disclosed techniques are provided in one or more arrays or other groups on a structured surface of the article, and the microstructures are arranged or distributed on the surface to define an optically detectable indicia. The indicia may serve as a mark of authenticity for the security article itself, or for another product to which the security article is attached or otherwise combined. The security article may be a useful article, i.e., it may have a substantial utilitarian function beyond providing an indicia or security image. The security article may be or comprise a retroreflective sheeting, or the security article may be an abrasive material, for example.

In some cases, the indicia may be defined simply by the shape of the boundary of one microstructure array, e.g. where inside the boundary the structured surface is filled with a dense packing of microstructures, but outside the boundary the surface has no such microstructures (e.g. the surface may be flat or smooth in such places), or the surface may have a less dense packing of the same type or a different type of microstructures outside the boundary, or vice versa. More preferably, the structured surface includes at least two different types of microstructures. Some of the microstructures are configured differently from others to define the optically detectable indicia in the structured surface. Microstructures in a first group may for example differ from microstructures in a second group in terms of one or more of size, orientation, cube corner type, dihedral angle value(s), or other characteristic(s) to define the indicia, or portion thereof. At least some of the microstructures on the structured surface, e.g., at least some of the microstructures in one or both of the first and second groups of microstructures, are microstructures that are made directly or indirectly (e.g. via one or more replication processes) by the end milling techniques disclosed herein.

We disclose herein, among other things, articles including a substrate having a structured surface that extends along a reference plane, the structured surface including distinct microstructures formed therein, each of the microstructures being a recess or a protrusion. Each of the microstructures has a first face, and a second face distinct from the first face, that connect to each other by a rounded edge, the rounded edge extending along an axis that is inclined at an angle α relative to the reference plane. The microstructures include first microstructures and second microstructures that differ from each other to define indicia.

Each of the microstructures may have at least one characteristic dimension on the order of 1 millimeter or less. At least some of the microstructures may be or comprise cube corner elements. The first microstructures and the second microstructures may both comprise cube corner elements. At least some of the microstructures may not be or comprise cube corner elements. At least some of the microstructures may be recesses. At least some of the microstructures may be protrusions. The first microstructures may differ from the second microstructures in terms of one or more of size, orientation, cube corner type, and dihedral angle value(s). The first microstructures may differ from the second microstructures in terms of orientation, and the orientation may be with regard to rotation about an axis orthogonal to the reference plane. The first microstructures may differ from the second microstructures in terms of cant angle. The first and second microstructures may differ sufficiently from each other so that the indicia is detectable by an ordinary observer of the article under ambient lighting conditions. The indicia may have a visibility that changes as a function of one or both of illumination geometry and observation geometry. The rounded edge may have a radius of curvature of at least 10 micrometers as measured in a selected cross-sectional plane. The rounded edge may exhibit a curvature of constant radius in a selected cross-sectional plane but not in a cross-sectional plane that is perpendicular to both the first and second faces. The substrate may comprise a metal. The article may be a tool suitable for microreplication. The article may be a master, and the structured surface may be a working surface of the master. The substrate may be or comprise a light-transmissive material. The substrate may be thin and flexible, with a length and width greater than its thickness. The article may be or comprise a cube corner sheeting.

We also disclose articles that include a substrate having a structured surface that extends along a reference plane, the structured surface including cube corner elements formed therein. The cube corner elements include first cube corner elements and second cube corner elements that differ from each other to define indica. At least some of the cube corner elements each have a compound face that includes a first face and a second face that meet along a break line, the break line being inclined relative to the reference plane.

The compound face, the first face, and the second face may all be nominally flat. For each of the at least some of the cube corner elements, the compound face may be an optical face of the cube corner element. For each of the at least some of the cube corner elements, the cube corner element has a perimeter, and the break line may extend to the perimeter. For each of the at least some of the cube corner elements, the cube corner element has a vertex, and the break line may extend to the vertex. Each of the cube corner elements may have at least one characteristic dimension on the order of 1 millimeter or less. The first cube corner elements may differ from the second cube corner elements in terms of one or more of size, orientation, cube corner type, and dihedral angle value(s). The first cube corner elements may differ from the second cube corner elements in terms of orientation, and the orientation may be with regard to rotation about an axis orthogonal to the reference plane. The first cube corner elements may differ from the second cube corner elements in terms of cant angle. The indicia may have a visibility that changes as a function of one or both of illumination geometry and observation geometry.

We also disclose methods of making security articles, the methods including providing a substrate having a working surface that extends along a reference plane, forming a plurality of microstructures in the substrate, the microstructures including first microstructures and second microstructures that differ from each other to define indicia, wherein the forming includes cutting the substrate with a rotating end mill to form a recess in the substrate, and, during the cutting, causing the rotating end mill to move along a cutting path relative to the substrate, the cutting path including a path portion that is inclined relative to the reference plane.

The path portion may be inclined at an angle α relative to the reference plane, and α may be in a range from 1 to 89 degrees. The method may also include forming distinct first and second faces of the recess during the cutting as the rotating end mill moves along the path portion. The first and second faces may be nominally flat and connected by a rounded edge. At least some of the microstructures may be or comprise cube corner elements. The first microstructures and the second microstructures may both comprise cube corner elements. The first microstructures may differ from the second microstructures in terms of one or more of size, orientation, cube corner type, and dihedral angle value(s). The first microstructures may differ from the second microstructures in terms of orientation, and the orientation may be with regard to rotation about an axis orthogonal to the reference plane. The first microstructures differ from the second microstructures in terms of cant angle. The forming may be carried out such that the indicia has a visibility that changes as a function of one or both of illumination geometry and observation geometry.

Numerous related methods, systems, and articles are also disclosed.

These and many other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

FIG. 4A is a front view of an oversimplified, stationary cutting tool, FIG. 4B is a front view of the cutting envelope formed by rapidly rotating the cutting tool of FIG. 4A, and FIG. 4C is a perspective view of a substrate in which a linear V-groove has been formed by cutting into the substrate while moving the rotating cutting tool relative to the substrate;

FIG. 5A is a front view of an oversimplified, stationary cutting tool that is adapted for end milling, and FIG. 5B is a front view of the cutting tool as it rapidly rotates or spins about its longitudinal axis, forming a cutting envelope in the form of a truncated cone;

FIGS. 5C and 5D are schematic side and perspective views, respectively, of the cutting envelope formed by the rapidly rotating end mill;

FIGS. 10A-10D are a sequence of schematic side views showing how a rotating end mill can form a simple elongated recess in a substrate;

FIGS. 23, 24, 25, 26, and 27 are schematic views of alternative paths of the rotating end mill that can be used to make alternative recesses;

FIGS. 54-56A are a group of schematic plan views of different substrates whose working surfaces are shaped to form related sets of recesses, the group of figures demonstrating how the disclosed end milling techniques can be used to form a PG cube corner element in a substrate;

In the figures, like reference numerals designate like elements.

DETAILED DESCRIPTION

Figure 1:
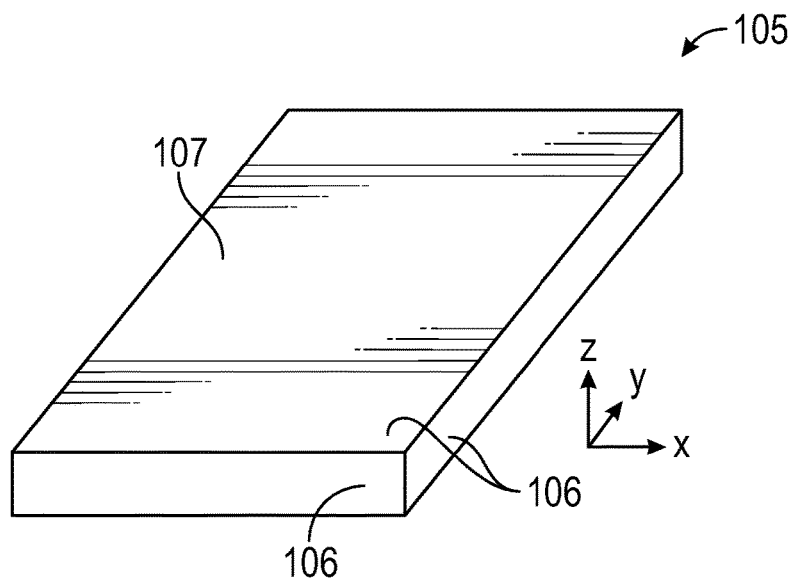
FIGS. 1, 2, and 3 are perspective views of substrates that have working surfaces in which one or more microstructures can be, or are, formed.

Having developed a new end milling technique for making cube corner elements and structures and microstructures other than cube corner elements, we apply this technique to the fabrication of articles that incorporate one or more security images, or, stated differently, articles that incorporate a detectable indicia. The indicia may be provided in a given structured surface of a substrate by providing different first and second microstructures in respective different first and second regions or zones of the structured surface. Embedding the indicia in the geometry or design of the structured surface itself, in this way, makes it difficult for unscrupulous parties to make cheap knock-off copies of the original security article.

The first and second microstructures may differ from each other in a way that is difficult for the ordinary observer of the article to detect, thus providing a subtle or faint indicia, or the differences between the first and second microstructures may be easy to detect, to provide a bold or clearly visible indicia. Numerous types of microstructures, of which the first microstructures and second microstructures are only two of many groups, may be provided on the structured surface, and differences between some microstructures may be difficult to detect to provide one or more subtle indicia, while differences between other microstructures on the same structured surface may be easy to detect to provide one or more easy to detect indicia. In most cases, the relative ease or difficulty in detecting a given indicia changes as a function of the illumination geometry, or observation geometry, or both. This is because the relative brightness or intensity of light that is reflected or transmitted by a given microstructure is usually dependent on those geometries for a given microstructure. Thus, a given distribution or pattern of first and second microstructures may provide an indicia that is difficult for an ordinary observer to detect under a first combination of illumination geometry and observation geometry, but easy to detect under a different second combination of illumination geometry and observation geometry.

Any one or more of numerous possible design differences between the first and second microstructures can be selected to produce the indicia. Such differences may include size, orientation, cube corner type, and dihedral angle value(s). In some cases, the first microstructures may be cube corner elements while the second microstructures are not cube corner elements, or vice versa. In some cases, neither the first microstructures nor the second microstructures may be cube corner elements, while in other cases, both the first and second microstructures may be cube corner elements. The first microstructures and the second microstructures need not be homogeneous groups of substantially similar or identical microstructures, but can be blends or distributions different microstructures. The first microstructures may, for example, be a first blend of cube corner elements and non-cube corner elements, and the second microstructures may be a different second blend of cube corner elements and non-cube corner elements.

Figure 71:
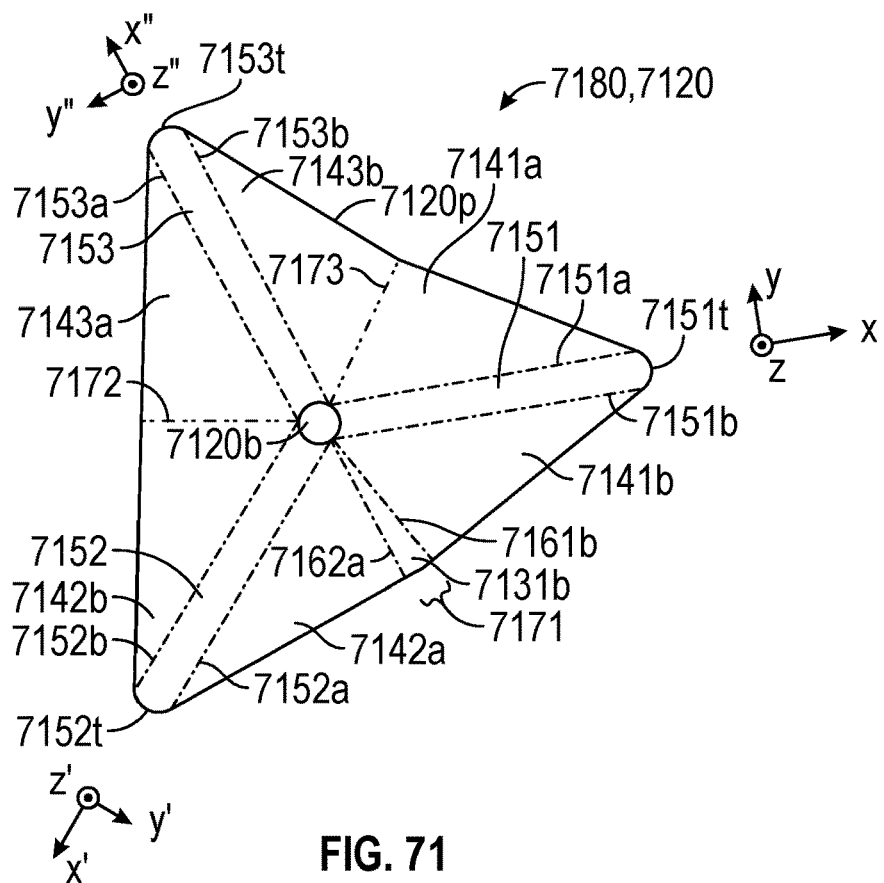
FIG. 71 is a schematic plan view of a truncated cube corner element in which two constituent faces of at least one compound optical face deviate substantially from parallelism, such that at least one of those constituent faces has a substantial dihedral angle error relative to other optical faces of the cube corner element, or portions thereof.

In order for the reader to have a better understanding of the numerous different types of structures and microstructures that can be made by the new end milling technique, and that can thus be used in the disclosed security articles, we first provide, in connection with FIGS. 1 through 71, comprehensive background information on the new end milling technique, and on the structures, microstructures, and cube corner elements formed by the technique.

With the new technique, end milling can be used to make virtually any type of cube corner element, including not only "truncated" cube corner elements but "full" or "preferred geometry" (PG) cube corner elements, including those that have a perimeter shape in plan view that is hexagonal, pentagonal, or quadrilateral, as discussed further below. Whether truncated or PG, the cube corner elements can also be canted or uncanted, and symmetrical or asymmetrical, and large or small, as also discussed below. The new technique allows the cube corner elements to be individually tailored and individually cut into the working surface of a substrate, which allows for almost limitless design flexibility. For example, in an array or cluster of adjacent microstructures made by the new technique, one cube corner element can be large and uncanted, and an adjacent cube corner element can be small and canted in a first direction, and still another adjacent cube corner element can be of medium size and canted in a different second direction; and furthermore, these adjacent, neighboring cube corner elements need not be constrained to require, for example, that an optical face of one cube corner element be coplanar with optical faces of its adjacent cube corner elements. Rather, with the new technique, a cube corner element may be designed to have no optical faces that are coplanar (not even nominally coplanar) with any of the optical faces of its adjacent or neighboring cube corner element(s).

The new technique is not limited to the fabrication of cube corner elements, but can also be used to make other types of structures and microstructures, some of which are shown or discussed below, and others of which will be readily apparent to the reader by simple combinations and extensions of the disclosed embodiments. Some of these other types of structures may be similar in appearance to a cube corner element, while others may be very different. These other structures may be useful in optical applications, e.g. transparent or reflective optical films, or in non-optical applications, including but not limited to mechanical applications such as abrasive articles, non-skid articles, and so forth. In most cases, the structures include at least one flat face that has been formed (whether in the finished article itself, or in a prior generation article related to the finished article by one or more replication operations) using the new technique by operation of an end mill. In some cases, a single structure or microstructure can have two, or three, or four such faces, or more. The structures, including structures that are cube corner elements, can also have one or more compound faces, a compound face being made up of two individual faces that are coplanar or nearly coplanar, and that meet or come together along a break line.

The new technique can be used entirely by itself to form one or more structures or microstructures in a substrate, or it can be combined with known techniques. For example, some microstructures can be made with the new technique, while other microstructures in the same substrate are made with a direct machining technique or another known technique. Furthermore, a portion, e.g. one face, of one or more microstructures can be made with the new technique, while the remainder of such microstructure(s), e.g. another face, can be made with the direct machining technique.

In cases where it is desired to form numerous microstructures in a substrate with the new technique, each microstructure can be formed individually using end milling. Depending on the sizes and types of microstructures, and the size of the substrate, the process of individually forming the entire array of microstructures may involve many hundreds, or thousands, or even millions of extremely precise individual cutting steps using one or more end mills, as described further below. Such an undertaking, which may be extremely laborious and time consuming if performed by hand with a human machinist, can be carried out in a reasonable period of time with high speed, high precision, and high quality, using modern computer controlled machines, or other automated cutting systems and equipment.

Before proceeding further, we pause here to say a few words about some of the structures, microstructures, and cube corner elements discussed herein, and related features.

In most cases, the structures discussed herein, whether a cube corner element, a microstructure, or both, are protrusions or cavities that have precisely engineered shapes, and that exist in the context of a larger surface of which they are a part, the larger surface often referred to as a structured surface, or as a working surface in the case of a machinable substrate. In some cases, the structure can be a protrusion that exists within or occupies a cavity, see e.g. FIG. 56A or 56B below. The disclosed structures typically include one or more individual faces or facets which are flat, and are arranged in a specific, engineered orientation relative to other faces or surfaces of the structure.

In this regard, a face or other surface may be said to be "flat" if it is (a) precisely flat, e.g., planar to within standard or applicable manufacturing tolerances, or (b) substantially flat, e.g., deviating from a best fit reference plane by amounts that are considered small in the intended application, e.g., deviating from such a plane by no more than a few micrometers, or by no more than ±1, ±0.5, ±0.1, ±0.05, or ±0.005 micrometers, or (c) functionally flat, e.g., the face functions in a manner that is the same as or similar to that of a precisely flat or substantially flat face or surface in the intended application. In some cases, a face or other surface may be deliberately engineered to have a small amount of curvature, texture, or other deviation from flatness in order to provide a given significant optical or mechanical functionality. In such cases, the face may still be considered to be nominally flat for purposes of this document if the face satisfies any of the preceding conditions (a)-(c), or if the deviation from flatness is small enough that the structure of which the face is a part still retains a substantial amount of the functionality it would have had if the face were actually flat. A nominally flat face may thus refer to, among other things, a face that is precisely flat, or substantially flat, or functionally flat.

A microstructure may refer generally to a structure that is small in the context of the particular application. For example, a microstructure may be a structure that has at least one characteristic dimension, such as a depth, height, length, width, or diameter (as broadly defined, not limited to circular features), that is on the order of 1 millimeter or less, e.g., 2 mm or less, or 1 mm or less, or 0.5 mm or less, or even 200 micrometers or less, or 100 micrometers or less, and typically also at least 5, 10, 15, or 20 micrometers in size. In some cases, two, three, or more of these characteristic dimensions of a structure may satisfy any of these size conditions, and any combination of these size conditions.

A microstructure may also, or alternatively, be as described in U.S. Pat. No. 4,576,850 (Martens). For example, the microstructures may generally be discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations may typically be about ±0.005 to ±750 micrometers, as measured by an optical or electron microscope, through a representative characteristic length of the surface, e.g., 1 to 30 cm. The average center line can be plano (i.e., planar or straight), or concave or convex (whether or not aspheric), or combinations thereof. Articles where the deviations are of low order, e.g., from ±0.005 to ±0.1 micrometer or, preferably, to ±0.05 micrometers, and where the deviations are of infrequent or minimal occurrence, i.e., where the surface is free of any significant discontinuities, can be considered to have an essentially "smooth" surface, as well as a "flat" surface if the average center line is plano. Other articles may have deviations of high order, e.g., from ±0.1 to ±750 micrometers, and attributable to microstructures comprising a plurality of utilitarian discontinuities which may be the same or different, and spaced apart or contiguous in a random or ordered manner.

As mentioned above, a cube corner element can be simply described as a structure having a set of three flat reflective faces or facets, referred to as optical faces, the optical faces being grouped together and oriented to be orthogonal to each other, such that incident light that strikes a first one of the faces is reflected to a second such face, and then to the third reflective face. Following the laws of reflection, the light reflected by the third face propagates in a direction that is essentially opposite to (anti-parallel to) the direction of the incident light. Such a structure generally resembles the corner of a cube, hence the term "cube corner" element. The term cube corner element also applies to a structure having a set of three faces that, though not themselves reflective, can be made reflective, or that can be replicated in a positive or negative replica to provide the three reflective faces referred to above, and in that case the three original (non-reflective) faces are still considered to be optical faces for purposes of the present disclosure. The term cube corner element also applies to structures in which the three optical faces are not precisely mutually perpendicular, but where small deviations from orthogonality, typically less than 1 degree, or less than 0.5 degrees, or less than 0.2 degrees, or less than 0.1 degree, or on the order of 1 minute of arc (0.0167 degrees), exist between any two of the three faces such that the retroreflected light is slightly spread out angularly relative to a straight line that connects the light source to the cube corner element. Such a deviation from precise orthogonality is referred to as a dihedral angle error, or more briefly as an angle error. Faces that are described herein as being nominally orthogonal (or substantially orthogonal) refer to faces that are either precisely orthogonal, or that deviate from orthogonality by a dihedral angle error.

The angle errors are large enough or substantial enough to produce a commercially useful change in the divergence profile or other light return pattern created by the cube corner element(s), but not so large that the cube corner element(s) cease to effectively function as retroreflector(s). In cases of most commercial interest, the angle errors fall within a range whose lower limit is 1 or 2 minutes of arc, and whose upper limit is 40 minutes of arc (useful in highway or traffic sign sheeting, producing up to a 2 degree deviation of light away from the direction of perfect retroreflection) or 70 minutes of arc (useful in shorter-viewing distance applications such as license plates or security features, producing up to a 4 degree deviation of light) or 120 minutes of arc (2 degrees of arc) (useful in certain display applications, producing up to an 8 degree deviation of light).

Some cube corner elements include, in addition to the set of three optical faces, one or more other faces that have a very different orientation from any of the optical faces. Such other faces are referred to as non-optical faces of the cube corner element.

Discussions of cube corner elements often make reference to dihedral edges, non-dihedral edges, and dihedral angles. A dihedral edge of a cube corner element is an edge formed at the intersection of any two of the optical faces of that cube corner element. A non-dihedral edge is any other edge of the cube corner element, including for example an edge formed by an optical face of the given cube corner element and an optical face of an adjacent cube corner element, or an edge formed by an optical face and a non-optical face of the given cube corner element. Edges—both dihedral edges and non-dihedral edges—of conventional cube corner elements are classically shown or described as being sharp in nature. In the present disclosure, some edges of a cube corner element or other structure may be sharp, while other edges may be curved or rounded.

A dihedral angle is the internal angle between two given non-parallel planes, which planes may represent two given faces of a disclosed structure or structured surface, such internal angle being measured in a reference plane that is perpendicular to both of the given planes. Stated differently, the internal angle representing the dihedral angle between the given planes is measured between a first and second line that intersect at a point, where the first line lies in one of the given planes, the second line lies in the other of the given planes, and where the first and second lines are each perpendicular to a line of intersection of the given planes. If two planes (or faces) are parallel, the dihedral angle between them is zero. The angle errors mentioned above in relation to non-orthogonal cube corner elements generally refer to small deviations of a dihedral angle from 90 degrees, unless otherwise clearly indicated.

The three dihedral edges of a cube corner element come together or intersect to form a vertex of the cube corner element. Depending on the nature of the edges and other design factors, the vertex may be a sharp point, while in other cases it may be blunt, for example, it may be a small flat area or other small area. Furthermore, the vertex may be a local maximum or a local minimum of the structured surface, depending on whether the cube corner element juts out of the surface, or sinks into the surface. The vertex is a local maximum, e.g. an apex or peak, when the cube corner element is a protrusion, i.e., where solid material exists in the space between the three optical faces. The vertex is a local minimum, e.g. a base or nadir, when the cube corner element is a cavity or recess, i.e., where vacuum, air, or a non-solid material exists in the space between the three optical faces.

Each cube corner element defines an axis, commonly referred to as a symmetry axis or a cube axis of the cube corner element. The symmetry axis passes through the vertex and trisects the structure, forming an equal angle with all three optical faces of the cube corner element. A cube corner element whose symmetry axis is perpendicular to the structured surface of which the cube corner element is a part is referred to as an "uncanted" cube corner element. Otherwise, if the symmetry axis is tilted relative to the structured surface, the cube corner element is said to be "canted".

Cube corner elements are also traditionally classified in terms of the configuration of the cube corner element's non-dihedral base edges, as well as the orientation of the cube's symmetry axis. A "truncated" cube corner element is one in which (a) the base edges of all three optical faces are coplanar (including substantially coplanar), typically lying in a plane that is parallel to the structured surface, or (b) such base edges of the three optical faces are all parallel to such plane, or (c) both (a) and (b). These base edges form a substantially triangular-shaped perimeter in plan view, which perimeter is then referred to as a "base triangle" of the truncated cube corner element. A truncated cube corner element that is uncanted produces a base triangle that is equilateral, i.e., each corner of the base triangle has an interior angle of precisely 60 degrees. See for example U.S. Pat. No. 3,712,706 (Stamm). A cube corner element whose symmetry axis is tilted in one way is said to be "forward canted" or "positive canted", if the base triangle associated with such element has only one interior angle greater than 60 degrees. See for example U.S. Pat. No. 4,588,258 (Hoopman). A cube corner element whose symmetry axis is tilted in the opposite way is said to be "backward canted" or "negative canted", and has an associated base triangle in which two of the three interior angles are greater than 60 degrees. See for example U.S. Pat. No. 5,565,151 (Nilsen).

In contrast to truncated cube corner elements, other cube corner elements, sometimes referred to as "full cube corner elements" (or "full cubes") or "preferred geometry (PG) cube corner elements" (or "PG cubes") may be designed such that at least one non-dihedral edge of one optical face is not coplanar with non-dihedral edges of the other two optical faces. A PG cube corner element that is part of a structured surface of cube corner elements may alternatively or additionally be described as a cube corner element having at least one non-dihedral edge that: (1) is nonparallel to a reference plane along which the structured surface extends; and (2) is substantially parallel to an adjacent non-dihedral edge of a neighboring cube corner element. A full cube may refer to a cube corner element that (1) is substantially free of vertical or near-vertical optical and non-optical faces, and (2) has a percent active area greater than 90% at normal incidence or at another design angle of incidence (and where we assume the illumination axis and the observation axis are collinear). A truncated cube corner element cannot satisfy this combination of conditions.

Some such PG and full cube corner elements have a perimeter in plan view that is hexagonal in shape, while others are pentagonal, and still others are quadrilateral, including but not limited to those having the shape of a parallelogram, rectangle, or square. Other PG and full cubes can have still other plan view perimeter shapes. The shapes of one or more of the optical faces (each such shape defined in the plane of its respective optical face) can also be used to identify PG and full cube corner elements, or to distinguish them from truncated cube corner elements which have triangular faces. Some PG and full cube corner elements may have at least one optical face that is rectangular, square, trapezoidal, or pentagonal, for example. In most cases, a given PG cube corner element is also a full cube corner element, and vice versa, but exceptions may exist. In the discussion that follows, cube corner element(s) referred to as a PG cube corner element(s) is or are assumed to also be full cube corner element(s), and vice versa, unless otherwise indicated.

Regardless of which of these perimeter shapes or face shapes are selected, suitably designed and proportioned PG and full cube corner elements are known to exhibit a higher total light return, e.g. when used in cube corner retroreflective sheeting, in comparison to truncated cube corner elements. Full cubes or PG cubes can be uncanted or canted in analogous fashion to truncated cube corner elements. See for example U.S. Pat. No. 6,015,214 (Heenan et al.).

With regard to light that is initially incident on a given cube corner element or array of such elements along an axis of incidence, the "total light return" for such element(s) is the fraction of such incident light that is reflected back along the axis of incidence within a specified half angle thereof, e.g. 4 degrees. The total light return can also be considered as the product of the percent active area of the cube corner element(s) and the normalized retroreflected ray intensity, for normally incident light, or for another specified orientation of the incident light. By way of example, in the limit where the normalized retroreflected ray intensity is 1.0, the maximum theoretical total light return for the truncated cube corner geometry depicted in U.S. Pat. No. 3,712,706 (Stamm) for normally incident light is 67%, whereas the maximum theoretical value is 100% for some PG cube corner elements, discussed below.

Figure 2:
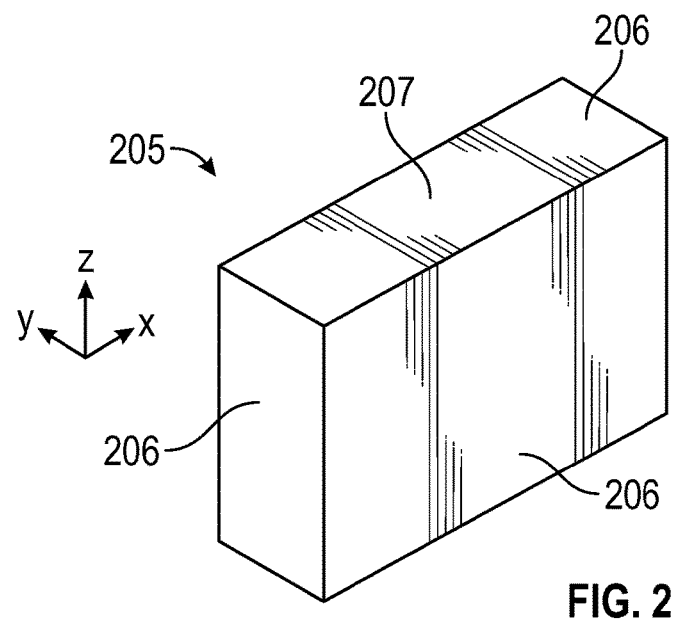
Figure 3:
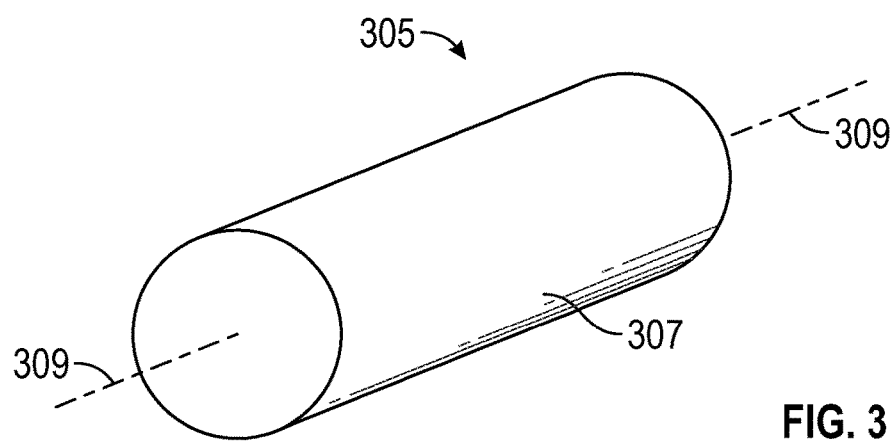

Returning now to the discussion of our new approach for making cube corner elements and other structures, FIGS. 1, 2, and 3 show perspective views of different representative substrates 105, 205, 305 in which the disclosed structures or microstructures can be, or are, formed. Each of these substrates has various outer surfaces, one of which may be designated a working surface (or structured surface) insofar as it is configured, or at least suitable, for precision material removal machining operations including at least end milling. The substrate 105 of FIG. 1 has side surfaces 106, one of which is a major surface and is designated a working surface 107. The substrate 205 of FIG. 2 has side surfaces 206, one of which is a minor surface and is designated a working surface 207. The substrate 305 of FIG. 3 has the form of a right circular cylinder having a longitudinal rotational axis 309, and as such has end surfaces and a circumferential surface, the circumferential surface being designated a working surface 307. The substrates 105, 205, 305 are made of machinable materials, or, at least a layer or other portion of such substrates located at the working surfaces thereof is made of machinable materials. Desirable machinable materials include those capable of being machined with an end mill cleanly without burr formation, with low ductility and low graininess, and the ability to maintain dimensional accuracy after the material removal operation. Depending on the desired feature size and other factors, a variety of machinable plastics or metals may be used. Suitable plastics include thermoplastic or thermoset materials such as acrylics or other materials. Machinable metals include aluminum, brass, copper, electroless nickel, and alloys thereof. Preferred metals include non-ferrous metals. The selected metal may be formed into sheets or layers by for example rolling, casting chemical deposition, electro-deposition, or forging. Preferred machining materials are typically chosen to minimize wear of the end mill cutting tool.

In many of the figures that follow, microstructures or other features are shown in the context of a Cartesian xyz coordinate system with mutually orthogonal x-, y-, and z-axes. Such Cartesian coordinate systems are likewise included in FIGS. 1 and 2. However, any other suitable coordinates systems, or no coordinate system, may also be used as desired. The depicted coordinate systems are not intended to be limiting in any way, but are included for ease of reference, for visualization, and for comparison. In most if not all cases, the coordinate system is oriented such that the z-axis is perpendicular to (and pointing directly away from) the working surface, or perpendicular to a reference plane along which the working surface or the structured surface extends, such reference plane then corresponding to an x-y plane defined by the x- and y-axes of the coordinate system. Again, this orientation is for reference and ease of description only, and should not be construed as limiting. In many of the figures, the x-axis is oriented such that, in cases where a tool path has an inclined path portion, the path portion lies in the x-z plane. But other orientations can of course also be used.

The z-axis of the coordinate system, as well as the substrate, may have any desired orientation relative to the direction of gravity, for example, the z-axis may point in the opposite direction as gravity (e.g., "upwards"), or in the same direction as gravity (e.g., "downwards"), or in any other direction. Further in this regard, in the description below, reference is made to one or more "vertical planes". Unless clearly indicated to the contrary, such a vertical plane is to be understood in relation to the working surface or structured surface at issue, not necessarily to gravity; a vertical plane thus refers to a plane that contains the normal vector of the working surface or structured surface (hence also containing the z-axis when oriented parallel to such normal vector), regardless of the direction of gravity relative to such surface, even though, in many cases, the normal vector and the z-axis are aligned with the gravitational axis. Terms such as "up", "down", and the like should also be interpreted flexibly and in a non-limiting way.

In the case of a non-flat working surface or structured surface, such as the simply curved working surface 307 of FIG. 3, such a surface can be conceptually subdivided into a multitude or grid of small localized regions. Each localized region is a closer approximation of a flat surface, and a local Cartesian xyz coordinate system may then be assigned to any such region by orienting the z-axis to be normal or perpendicular to the working surface at that position.

Material can be selectively and precisely removed from the working surfaces of the substrates 107, 207, 307 using one or more rotating end mills as described further below to create in such substrates any or all of the cube corner elements or other microstructures disclosed herein.

Figure 4A:
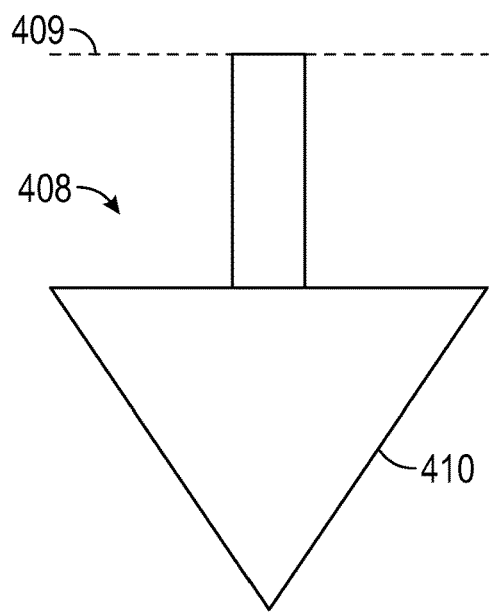
FIGS. 4A-4C depict aspects of fly cutting to contrast with end milling, where
Figure 4B:
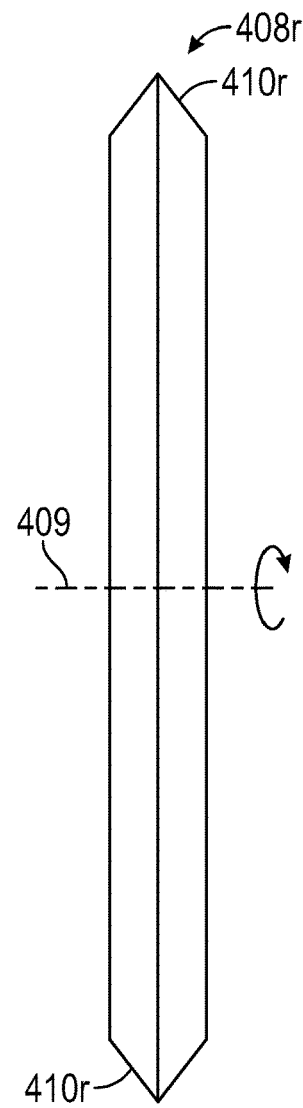
Figure 4C:
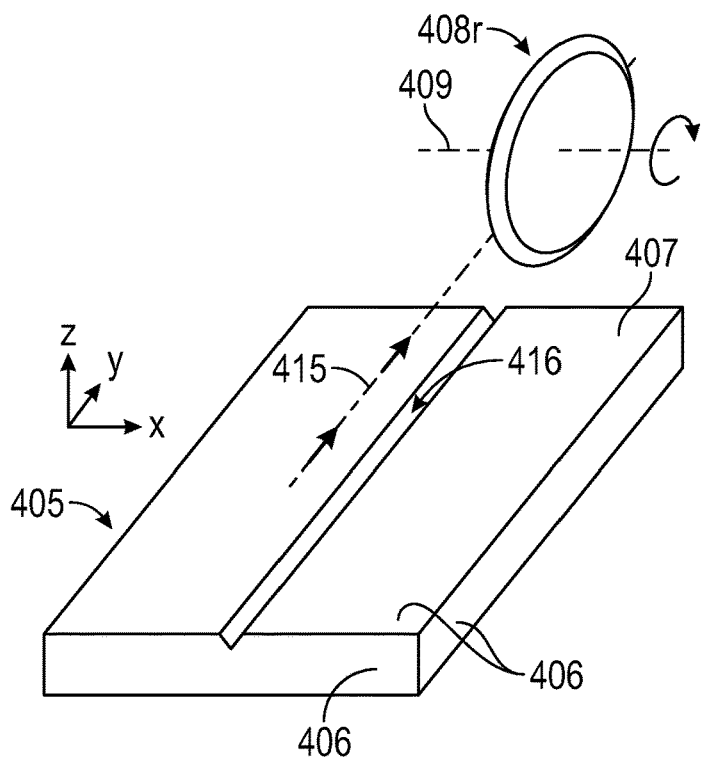

FIGS. 4A-4C show, in simplified schematic form, aspects of fly cutting, in order to draw a distinction between fly cutting and end milling. FIG. 4A shows a front view of a stationary cutting tool 408 made for fly cutting. The fly cutting tool 408 includes a cutting head 410 attached to a shaft, the tool mounted in such a way as to allow for rotation about a transverse rotational axis 409. The cutting head 410 is V-shaped with a sharp point or vertex. A motor (not shown) engages the fly cutting tool 408 and spins it rapidly about the axis 409. The rapidly rotating cutting tool 408$r$ includes a rapidly rotating, ring-shaped cutting head or cutting envelope 410$r$ as shown in FIG. 4B. The rotating cutting tool can be used to cut a V-groove into the working surface of a substrate as shown in FIG. 4C. There, a machinable substrate 405 has outer surfaces 406, one of which is designated a working surface 407. A straight V-groove 416 is cut into the working surface 407 by the cutting envelope 410$r$ as the rotating cutting tool 408$r$ is caused to move relative to the substrate 405 along a straight path 415 as shown. The V-shaped profile of the cutting head 410, and of the cutting envelope 410$r$, is copied in the V-groove 416. Direct machining of (truncated) cube corner elements involves repeating this fly cutting process to form a whole set of parallel V-grooves in the substrate 405, and then forming in similar fashion two other sets of parallel V-grooves that intersect the first set such that the resulting faces (remnants of V-groove side surfaces) formed by the fly cutting produce an array of cube corner elements.

Here and elsewhere in the present disclosure, whenever a cutting tool, whether a fly cutting tool or an end mill tool, is described as being moved or caused to move, e.g., caused to move relative to a substrate, the reader will understand that such motion may be carried out by (a) holding the substrate stationary and translating the (rotating) cutting tool, or (b) holding the (rotating) cutting tool stationary and translating the substrate, or (c) translating both the (rotating) cutting tool and the substrate, such that a relative motion is set up between the cutting tool and the substrate along the designated path.

FIGS. 5A-5D show, in simplified schematic form, aspects of end milling. FIG. 5A shows a front view of a stationary cutting tool 508 made for end milling. The end milling tool 508 includes a cutting head 510 attached to a shaft, the tool mounted in such a way as to allow for rotation about a longitudinal rotational axis 509. The cutting head 510 has a cutting edge that is tapered, but, for reasons that will become apparent, the taper is truncated at the end rather than terminating at a sharp point. The taper can be characterized by an angle, referred to herein as a tool half angle (THA), between the tapered cutting edge and the rotational axis 509. A motor (not shown) engages the end milling tool 508 and spins it rapidly about the axis 509. The rapidly rotating cutting tool 508r includes a rapidly rotating, cone-shaped cutting head or cutting envelope 510r as shown in FIG. 5B. Enlarged views of the cutting envelope 510r are shown in FIG. 5C (side or cross-sectional view) and FIG. 5D (perspective view).

The enlarged FIGS. 5C and 5D illustrate more clearly that the rotating end mill cutting envelope 510r actually has the shape of a cone whose end or tip is truncated. In an end milling operation, the rotating cutting tool needs to be capable of being forced down onto, and into, a substrate to remove any material that exists in the path of the cutting envelope 510r. One can readily appreciate from this that, in order to make the cutting envelope sharp and not truncated, the tip of the cutting head 510 would have to be an extremely sharp, fine point, similar to the tip of a needle. But such a delicate pointed tip would be quickly damaged or destroyed in use as the rotating tool contacts and cuts into the substrate. Therefore, for practical reasons, the end mill cutting head 510 is truncated, and the cutting envelope 510r formed by the rotating cutting head is similarly truncated at an end or bottom 510rb of the envelope. Besides the bottom 510rb, the cutting envelope 510r also has a top 510rt of diameter Dtop, and a side 510rs in the form of a portion of a cone. The bottom 510rb has a diameter Dbot. The side 510rs makes an angle THA (tool half angle) relative to the axis 509, THA also being the half angle of the stationary cutting head 510. The side 510rs makes an angle THAC (tool half angle complement, such that THAC+THA=90 degrees) relative to the transverse plane or line perpendicular to the axis 509. Because the envelope 510r is formed by rotation about the axis 509, the envelope 510r exhibits rotational symmetry about the axis 509, and the top 510rt and the bottom 510rb are both circular in shape, i.e., of constant radius as measured from the axis 509.

The end milling tool 508 and its dimensions and other features can be selected as desired from any of the numerous end milling tools currently available in the marketplace, or it can be specially ordered to exacting specifications, within limits, from existing or future tool making companies, or otherwise specially made. The dimensions Dtop, Dbot, THA, and THAC of the cutting envelope 510r can therefore also be selected or tailored within reasonable limits, by appropriate selection of the end milling tool. There are practical limits to how small the diameter Dbot can be made. We are aware of milling tools for which Dbot is on the order of 20 micrometers, which corresponds to a radius (Dbot/2) of 10 micrometers; however, specialized end milling tools with even smaller values of Dbot may exist, and future advances in cutting technology may also allow for smaller values of Dbot.

We have explained why the end of the cutting envelope of the rotating end mill is truncated rather than being a sharp point. In some cases, the truncated end may be a small, flat, circular area that meets the side 510rs at a sharp edge, substantially as shown in FIGS. 5B and 5C. In other cases, the truncated end may be rounded, curved, or have some other non-flat (but still truncated) shape, and it may or may not form a sharp edge with the side 510rs. Whatever the non-flat shape is, it exhibits rotational symmetry with regard to the rotational axis 509. For simplicity and consistency in the description that follows, we assume the truncated end is small, flat, and circular, forming a sharp edge with the side 510rs, as shown in FIGS. 5B and 5C. The reader will understand, however, that the truncated end may instead have any suitable non-flat shape, and such an alternative truncated shape will produce a corresponding change in the shape of surfaces and features that are formed by the cutting action of such truncated end, in particular, features referred to as rounded edges in the structures discussed and illustrated further below.

Figure 6A:
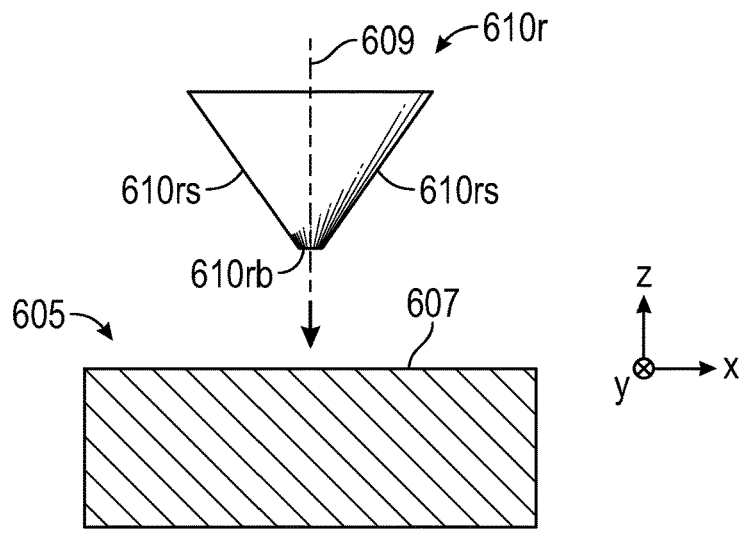
FIGS. 6A-6C are a sequence of schematic cross-sectional views showing how a rotating end mill can form a simple blind hole, cavity, or recess in a substrate.
Figure 6B:
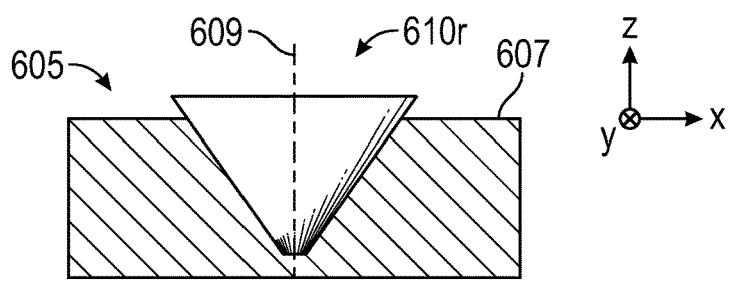
Figure 6C:
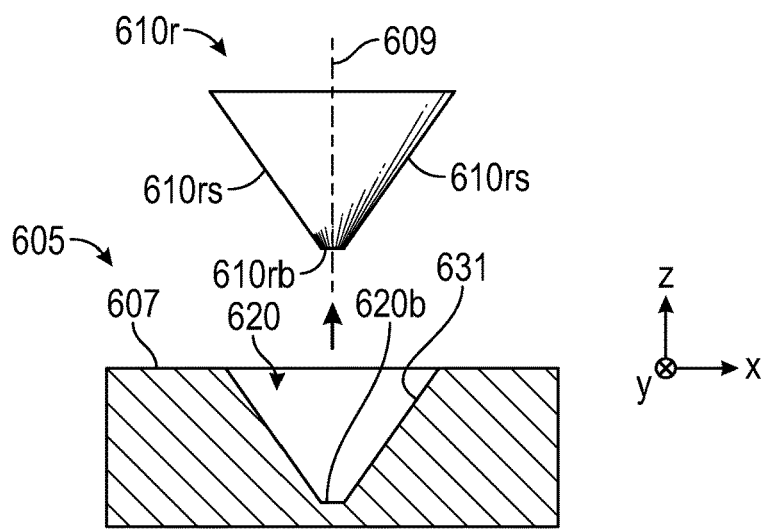

The rotating cutting tool 508r can be used to cut a simple blind hole, cavity, or recess into the working surface of a substrate, as shown in the sequence of schematic cross-sectional views of FIGS. 6A-6C. There, a machinable substrate 605, which may be the same as or similar to any of the substrates discussed herein, including any of the substrates of FIG. 1-3 or 4C, has a working surface 607. Cartesian coordinates are defined such that the working surface 607 lies in, or extends parallel to, the x-y plane, and the z-axis represents a normal vector of the surface 607. A rotating cutting tool poised above the substrate provides a rotating end mill cutting envelope 610r, as discussed above in connection with cutting envelope 510r. The cutting envelope 610r is symmetric about a rotational axis 609, and has the shape of a truncated cone, with a conical side 610rs and an end or bottom 610rb. The rotational axis 609 is parallel to the z-axis, and perpendicular to the working surface 607.

To make a simple blind hole in the substrate 605 by end milling, the rotating tool, and the cutting envelope 610r, is moved towards the working surface 607 as indicated by the downward-pointing arrow in FIG. 6A, such motion advancing beyond the working surface 607 and into the substrate 605 by the cutting action of the envelope 610r, until the envelope (and cutting tool) is at least partially lodged within the substrate 605, as shown in FIG. 6B. Thereafter, the cutting envelope 610r is drawn out of the substrate 605 along the same path that it entered, as indicated by the upward-pointing arrow in FIG. 6C. The withdrawal of the cutting envelope reveals a cavity or recess 620 that was formed by the milling action of the cutting tool as it penetrated the substrate, such recess 620 having a curved side surface 631 and a base 620b. The motion of the cutting envelope into and out of the substrate 605 (see the arrows in FIGS. 6A and 6C) is assumed to be parallel to the z-axis. (The reader will also keep in mind, in view of the preceding discussion about relative motion, that the motion of the cutting tool or cutting envelope 610r may be accomplished in any desired manner, e.g. holding the substrate 605 stationary and translating the cutting envelope 610r (according to the arrows in FIGS. 6A, 6C), or holding the cutting envelope 610r stationary and translating the substrate 605 (according to arrows opposite those of FIGS. 6A, 6C), or any combination thereof, and this same understanding should be applied to all other cutting motions disclosed herein.) The side surface 631 of the recess 620 corresponds to, and has the same conical shape as, the conical side 610rs of the cutting envelope 610r, and the base 620b of the recess 620 corresponds to, and has the same shape as, the bottom 610rb of the cutting envelope, i.e., small, flat, and round. Of course, if the bottom of the cutting envelope is a truncated shape other than flat, e.g., rounded, then the base 620b of the recess will take on the same non-flat shape as the bottom of the cutting envelope.

Figure 7:
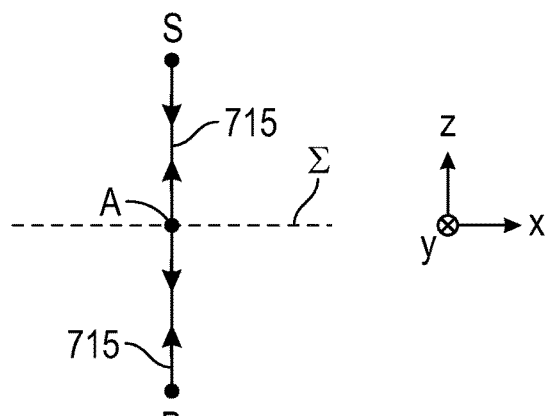
FIG. 7 is a schematic view of the path followed by the rotating end mill in connection with the sequence of FIGS. 6A-6C.

FIG. 7 is a schematic representation of the path followed by the rotating end mill in connection with the sequence of FIGS. 6A-6C. In FIG. 7, E represents the plane of the working surface 607 of substrate 605, and the path of the rotating end mill is represented by line 715. The surface plane E is parallel to the x-y plane, and the path 715 is straight, and parallel to the z-axis. The rotating end mill or cutting envelope 610r: begins at a point S, poised above the plane Σ; then moves along path 715 to point A, where contact is first made between the rotating end mill and the substrate, and where cutting begins; then continues cutting the substrate as it moves along path 715 to a deepest point B; then moves back along path 715 from point B to point A; then withdraws entirely from the recess 620 by moving from point A back to point S. Of the various identifiable portions or segments of the path 715, cutting of the substrate occurs only in the segment directed from point A to point B.

Figure 8:
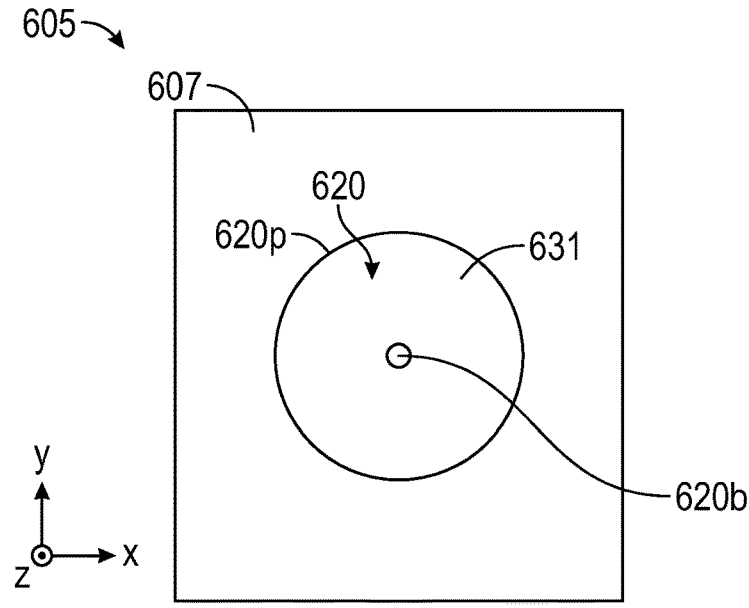
FIGS. 8 and 9 are schematic top and perspective views, respectively, of the substrate and blind hole of FIG. 6C.
Figure 9:
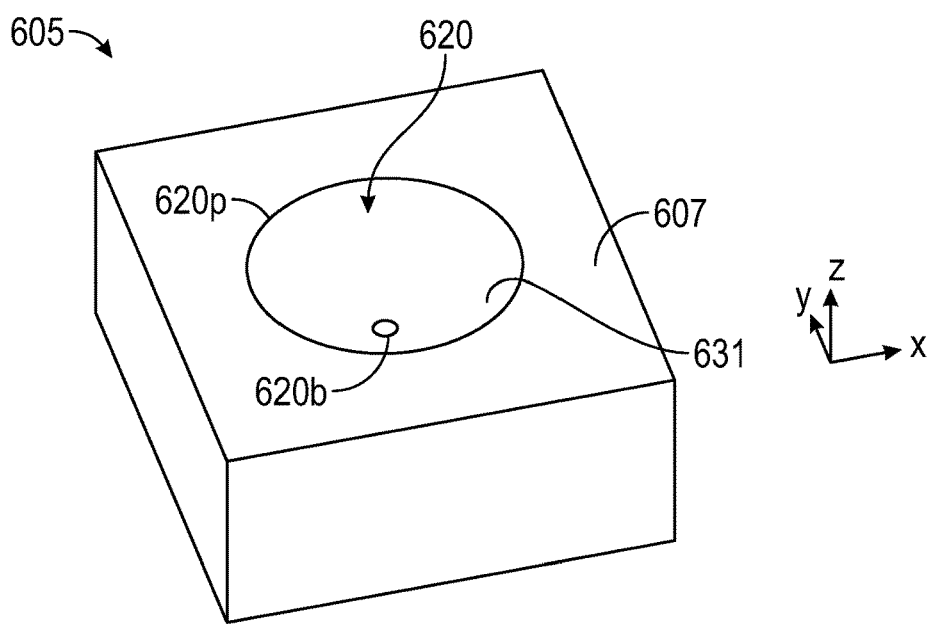

FIGS. 8 and 9 are schematic top and perspective views, respectively, of the substrate 605 and recess 620 of FIG. 6C, where like elements have like reference numbers and need no further explanation. In these views, a perimeter 620p of the recess 620 is also visible. The perimeter 620p is circular in shape, like the base 620b, because of the way the rotating end mill plunges into the substrate to form the recess, and because of the rotational symmetry of the cutting envelope 610r.

Substrate removal by end milling can also be used to make other types of recesses, cavities, and holes. The sequence of FIGS. 10A-10D shows how end milling can be used to cut a simple elongated recess into the working surface of a substrate. In these figures, a machinable substrate 1005, which may be the same as or similar to substrate 605, has a working surface 1007. Cartesian coordinates are defined such that the working surface 1007 lies in, or extends parallel to, the x-y plane, and the z-axis represents a normal vector of the surface 1007. A rotating cutting tool poised above the substrate provides a rotating end mill cutting envelope 1010r, as discussed above. The cutting envelope 1010r is symmetric about a rotational axis 1009, and has the shape of a truncated cone, with a conical side 1010rs and an end or bottom 1010rb. The rotational axis 1009 is parallel to the z-axis, and perpendicular to the working surface 1007.

To make a simple elongated recess in the substrate 1005 by end milling, the rotating tool, and the cutting envelope 1010r, is moved towards the working surface 1007 as indicated by the downward-pointing arrow in FIG. 10A, such motion advancing beyond the working surface 1007 and into the substrate 1005 by the cutting action of the envelope 1010r, until the envelope (and cutting tool) is at least partially lodged within the substrate 1005, as shown in FIG. 10B. Next, instead of being immediately withdrawn from the substrate as in FIG. 6C, the cutting envelope 1010r is moved laterally through the substrate, cutting as it goes, as indicated by the right-facing arrow in FIG. 10C. The lateral motion is parallel to the x-axis. In the view of FIG. 10C, one can already identify a recess 1020 that has been formed, even though the recess is partially occupied by the cutting envelope 1010r. Also visible in that figure are certain elements or features of the recess 1020: a side surface 1031a, another side surface 1041a, a transition line 1061a1, and a base 1020b. (We will see shortly that the surface 1031a is a curved surface, while the surface 1041a is a flat face.) Finally, after the lateral cut of FIG. 10C, the cutting envelope 1010r is drawn vertically out of the substrate 1005, as indicated by the upward-pointing arrow in FIG. 10D. The withdrawal of the cutting envelope reveals the full elongated cavity or recess 1020 that was formed by the milling action of the cutting tool as it cut through the substrate 1005. In addition to the elements 1031a, 1041a, 1061a1, and 1020b mentioned above, the recess 1020 can also be seen in FIG. 10D to have another side surface 1031b, and another transition line 1061a2. These and other features of the recess 1020 are discussed further below in connection with FIGS. 12 and 13.

Figure 11:
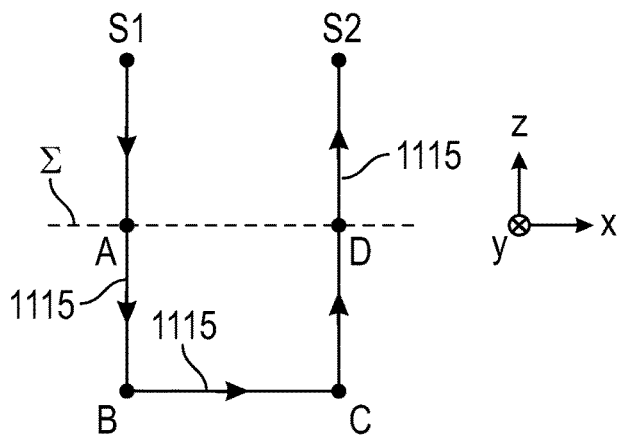
FIG. 11 is a schematic view of the path followed by the rotating end mill in connection with the sequence of FIGS. 10A-10D.

FIG. 11 is a schematic representation of the path followed by the rotating end mill in connection with the sequence of FIGS. 10A-10D. In FIG. 11, Σ represents the plane of the working surface 1007 of substrate 1005, and the path of the rotating end mill is represented by line 1115. The surface plane Σ is parallel to the x-y plane. The path 1115 has a segment from S1 to B, and a segment from C to S2, that are straight, and parallel to the z-axis. The path 1115 also has a segment from B to C which is straight and parallel to the x-axis. The rotating end mill or cutting envelope 1010r: begins at a point S1, poised above the surface plane Σ; then moves along path 1115 to point A, where contact is first made between the rotating end mill and the substrate, and where cutting begins; then continues cutting the substrate as it moves along path 1115 to a deepest point B; then moves laterally, parallel to the x-axis, from point B to point C; then moves along path 1115 vertically from point C to point D; then withdraws entirely from the recess 1020 by moving vertically from point D to point S2 above the plane Σ. Throughout its travel along the path 1115, the rotating end mill or cutting envelope 1010r maintains its rotational axis 1009 parallel to the z-axis. Of the various identifiable portions or segments of the path 1115, actual cutting of the substrate 1005 occurs only in two segments: the segment from point A to point B, and the segment from point B to point C.

Figure 12:
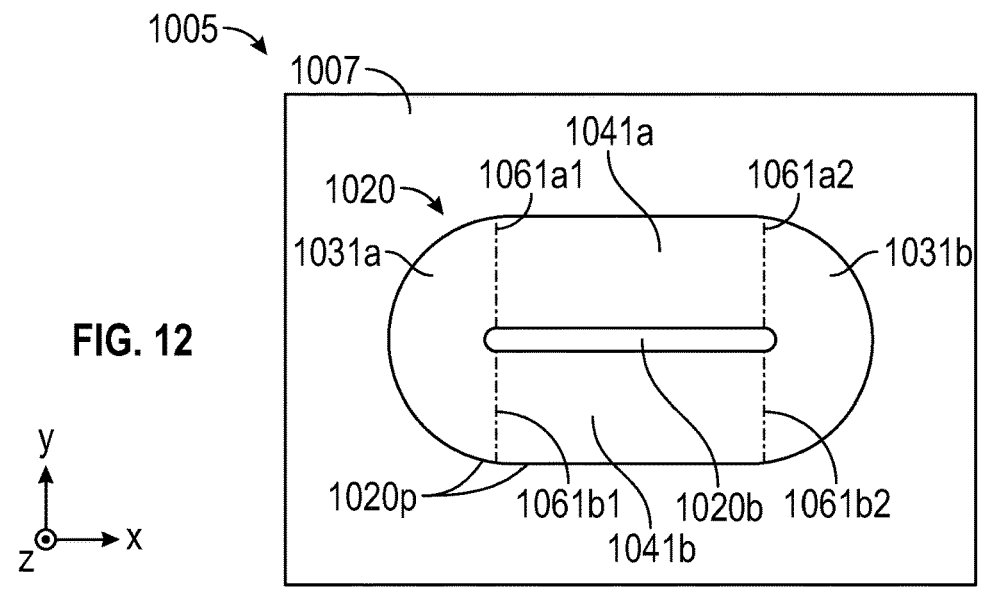
FIGS. 12 and 13 are schematic top and perspective views, respectively, of the substrate and elongated recess FIG. 10D.
Figure 13:
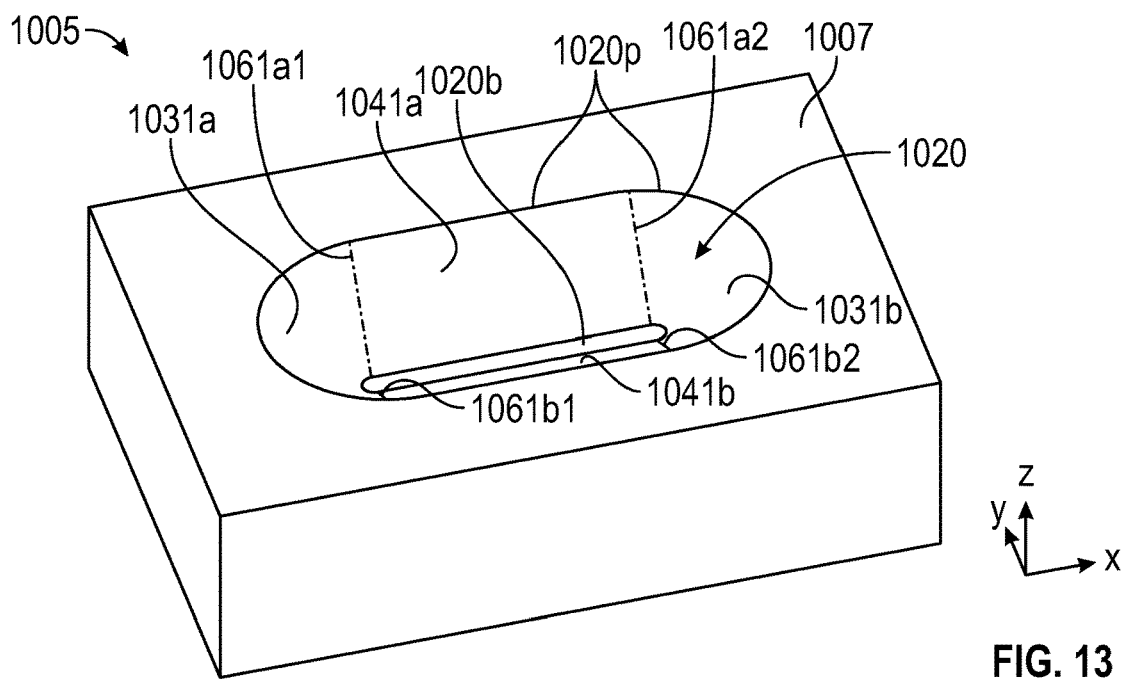

FIGS. 12 and 13 are schematic top and perspective views, respectively, of the substrate 1005 and recess 1020 of FIG. 10D, where like elements have like reference numbers. In these views, the recess 1020 can be seen to be bounded by a perimeter 1020p, portions of which are straight and portions of which are curved. The views of FIGS. 12 and 13 show more clearly that elements 1031a and 1031b are curved side surfaces of the recess 1020. Indeed, each curved side surface 1031a, 1031b corresponds to, and has the same conical shape as, a half section of the conical side 1010rs of the cutting envelope 1010r. In contrast, elements 1041a, 1041b are flat side faces of the recess 1020. Each face 1041a, 1041b is inclined in the same amount as the conical side 1010rs of the cutting envelope 1010r. Stated differently, the angle formed between face 1041a and the x-z plane (as well as the angle between face 1041b and the x-z plane) equals the tool half angle (THA) of the cutting envelope 1010r. The illustrated transition lines 1061a1, 1061a2, 1061b1, 1061b2 are not physical edges, but are provided in the figures to show where the transition from a curved surface (such as surface 1031a) to a flat face (such as face 1041a) occurs. Note that although the flat faces 1041a, 1041b are themselves each inclined relative to the working surface 1007, neither of the flat faces 1041a, 1041b has an edge that is inclined relative to the working surface 1007. Also shown in FIGS. 12 and 13 is the base 1020b of the recess 1020.

The rotating cutting tool of an end mill can also be used to cut other recesses, including recesses that can form the basis of the newly disclosed techniques for making cube corner elements and other structures. One such recess is made with an end milling procedure shown in the sequence of schematic cross-sectional views of FIGS. 14A-14B. There, a machinable substrate 1405, which may be the same as or similar to substrate 1005, has a working surface 1407. Cartesian coordinates are defined such that the working surface 1407 lies in, or extends parallel to, the x-y plane, and the z-axis represents a normal vector of the surface 1407. A rotating cutting tool, initially poised above the substrate, provides a rotating end mill cutting envelope 1410*r*, as discussed above. The cutting envelope 1410*r* is symmetric about a rotational axis 1409, and has the shape of a truncated cone, with a conical side 1410*rs* and a flat, round end or bottom 1410*rb*. The rotational axis 1409 is parallel to the z-axis, and perpendicular to the working surface 1407.

Figure 14A:
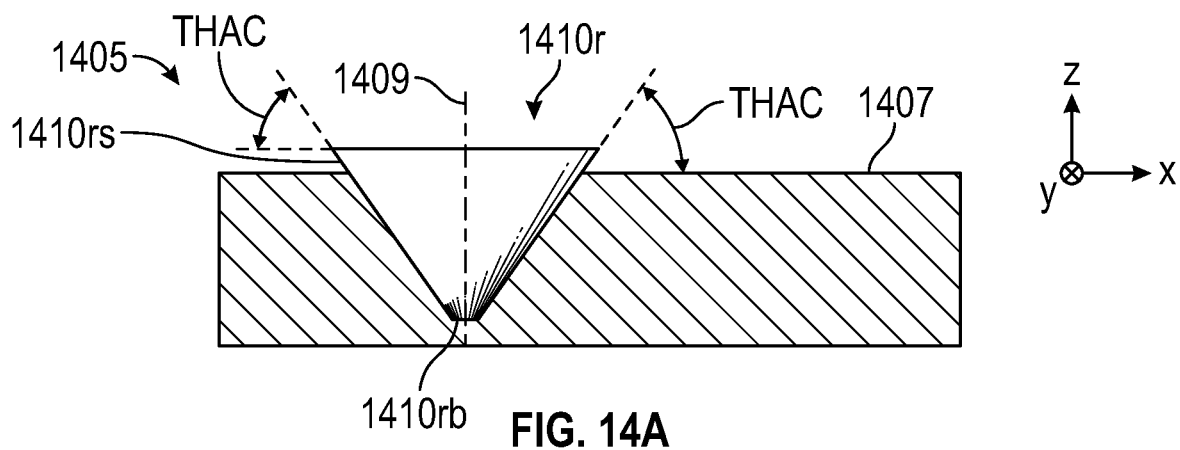
FIGS. 14A-14B are a sequence of schematic cross-sectional views showing how a rotating end mill can form another type of recess in a substrate.
Figure 14B:
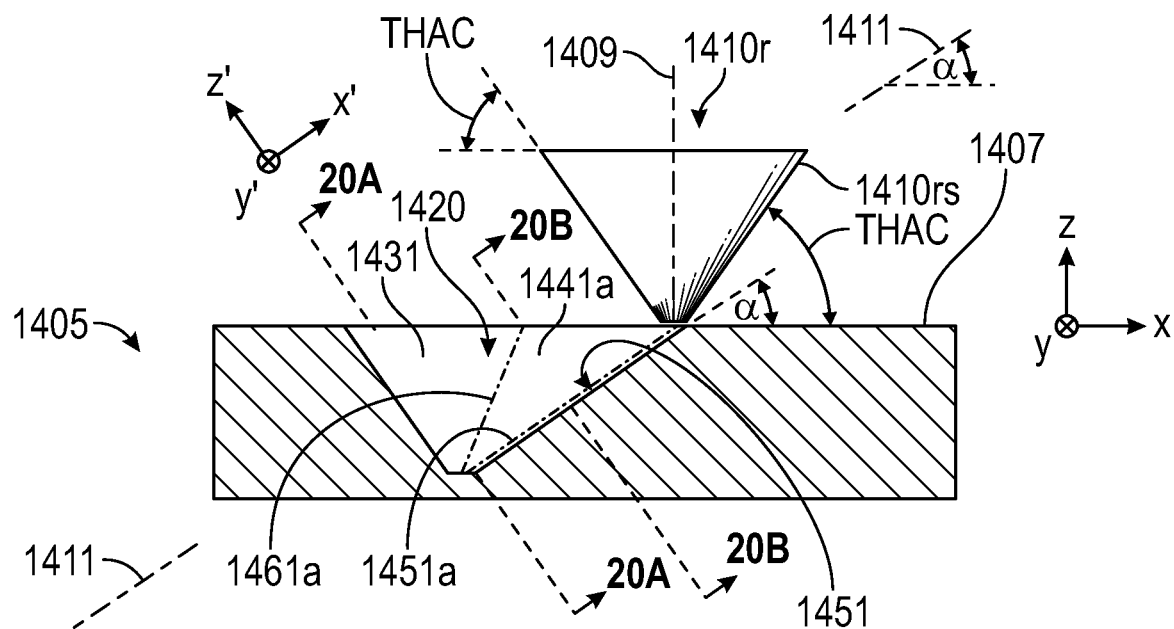

To begin making the recess in the substrate 1405 by end milling, the rotating tool, represented by the cutting envelope 1410*r*, is moved towards, and into, the working surface 1407, in similar fashion to FIGS. 6A-6B and FIGS. 10A-10B. Thus, just as in those other figures, the motion of the cutting envelope 1410*r* advances beyond the working surface 1407 and into the substrate 1405 by the cutting action of the envelope 1410*r*, until the envelope (and cutting tool) is at least partially lodged within the substrate 1405. This is shown in FIG. 14A, which is analogous to FIGS. 6B and 10B. Thereafter, the cutting envelope 1410*r* is drawn out of the substrate 1405. But instead of drawing the cutting envelope 1410*r* out along a purely vertical path like in FIG. 6C, and instead of moving the cutting envelope along a purely lateral (horizontal) path like in FIG. 10C, the cutting envelope 1410*r* is drawn out along a path that is inclined relative to the working surface 1407, while maintaining the vertical orientation of the rotational axis 1409. The inclined path: has a nonzero lateral component and a nonzero vertical component; lies in the x-z plane of FIG. 14B; and is parallel to an inclined reference axis 1411. The reference axis 1411 is inclined at an inclination angle α (alpha) measured relative to the x-y plane, or to the working surface 1407. FIG. 14B shows the substrate 1405 at the point where the rotating end mill tool, or cutting envelope 1410*r*, has just emerged from the recess 1420 which it formed in the substrate. The withdrawal of the cutting envelope 1410*r* reveals the cavity or recess 1420 that was formed by the milling action of the cutting tool through the substrate. The conical side 1410*rs* of the cutting envelope 1410*r* makes an angle THAC relative to the x-y plane or surface 1407.

Figure 15:
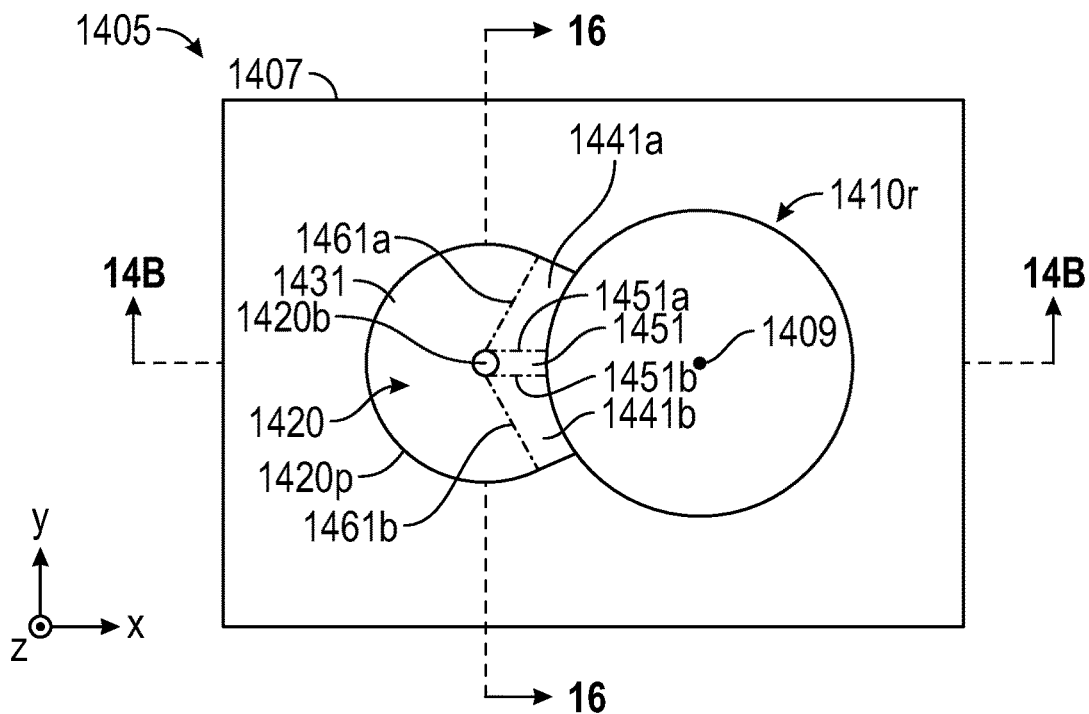
FIG. 15 is a schematic top view of the substrate and cutting envelope of FIG. 14B, where the cut line 14B-14B shows the cross-sectional plane of FIG. 14B.
Figure 16:
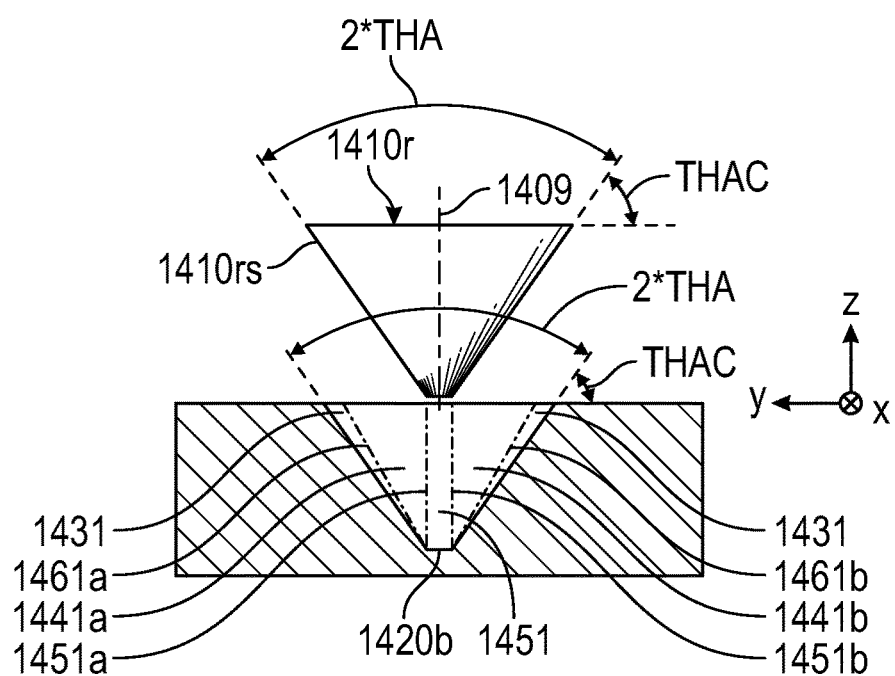
FIG. 16 is a schematic cross-sectional view of the substrate through cut line 16-16 in FIG. 15.
Figure 18:
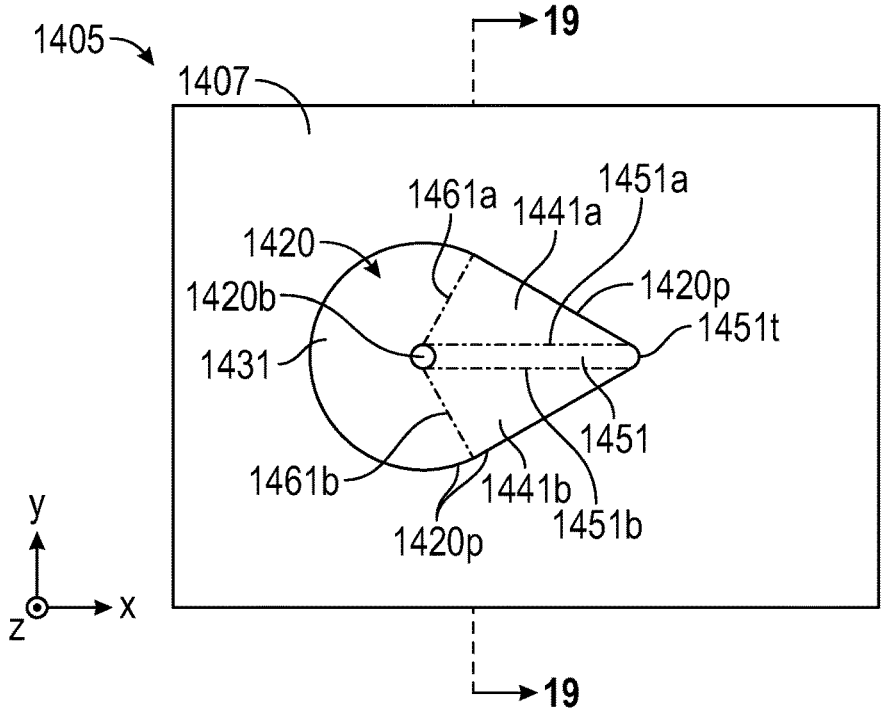
FIG. 18 is a schematic top view similar to FIG. 15, but omitting the cutting envelope so that the entire recess can be seen.
Figure 19:
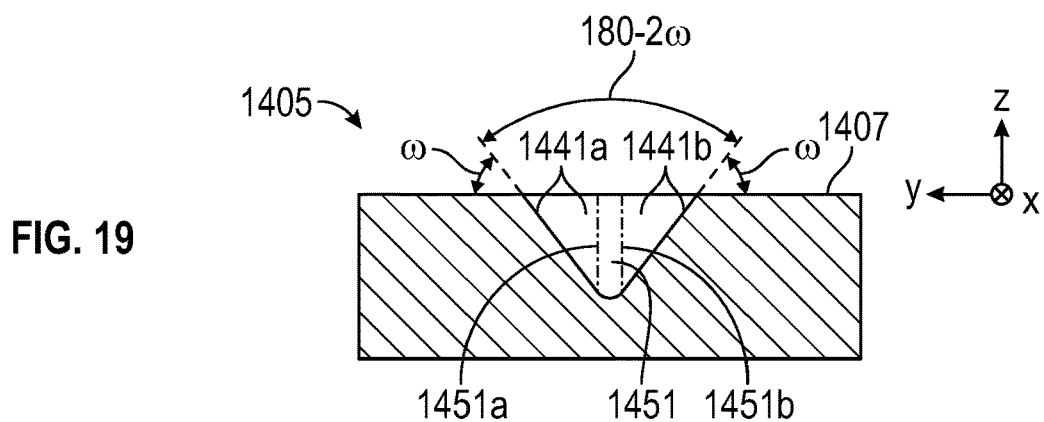
FIG. 19 is a schematic cross-sectional view through the cut line 19-19 in FIG. 18.
Figure 20A:
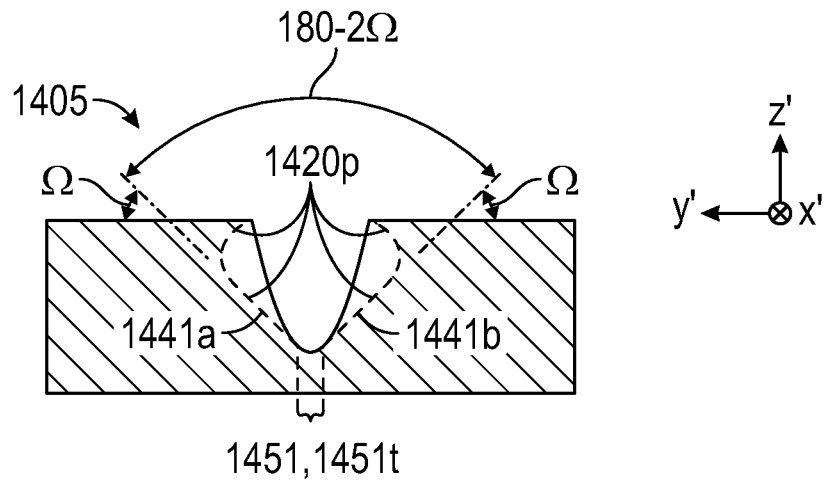
FIG. 20A is a partial schematic cross-sectional view of the substrate of FIG. 14B through cut line 20A-20A.
Figure 20B:
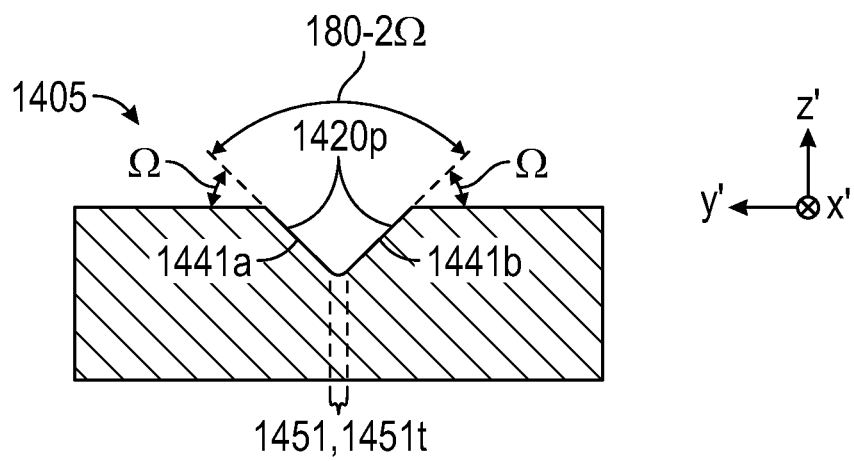
FIG. 20B is a similar view but through the cut line 20B-20B.
Figure 21:
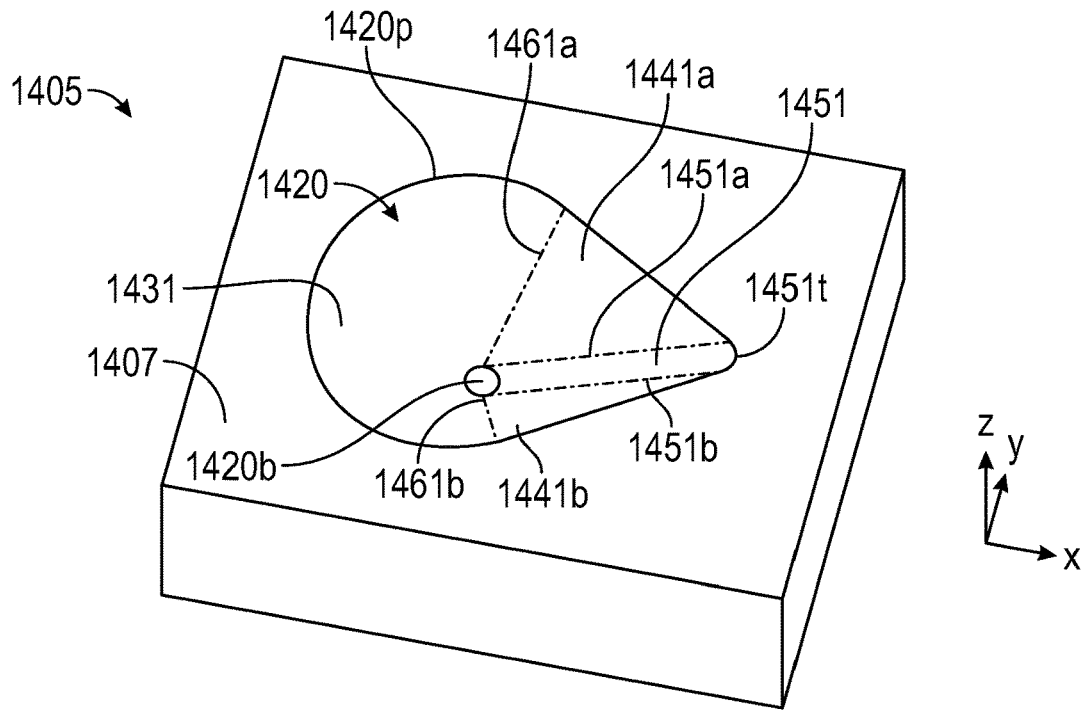
FIG. 21 is a perspective view of the substrate of FIGS. 14B, 15, 16, 18, 19, 20A, and 20B.

Some, but not all, of the features of the recess 1420 are visible in the cross-sectional view of FIG. 14B. A number of other views of the substrate 1405 and recess 1420 are also provided so the reader can more readily understand the topography of the working surface 1407 and the recess 1420 and related features. In particular: FIG. 15 shows a top view of the setup of FIG. 14B; FIG. 16 shows a cross-sectional view through cut line 16-16 in FIG. 15; FIG. 18 shows a top view like FIG. 15 but without the cutting envelope; FIG. 19 shows a cross-sectional view through cut line 19-19 in FIG. 18; FIG. 20A shows a partial cross-sectional view along cut line 20A-20A in FIG. 14B; FIG. 20B is similar to FIG. 20A but taken along cut line 20B-20B in FIG. 14B; and FIG. 21 shows a perspective view of the substrate 1405. (FIGS. 17A and 17B will be discussed further below.) The reader is invited to review and compare all of these figures to gain a clear understanding of the recess 1420. With reference to this group of figures, and keeping in mind that like reference numerals designate like elements, and that some elements are not visible or not labeled in some figures, we will now discuss the following features associated with the recess 1420: base 1420*b*; curved side surface 1431; flat face 1441*a* and flat face 1441*b*; transition lines 1461*a*, 1461*b*; rounded edge 1451; transition lines 1451*a*, 1451*b*; terminus 1451*t* of the rounded edge; and a periphery or perimeter 1420*p*.

The base 1420*b* of the recess 1420 corresponds to, and has the same shape as, the bottom 1410*rb* of the cutting envelope, i.e., small, flat, and round in those cases where the bottom 1410*rb* is also small, flat, and round. Though the base 1420*b* is small, it lies in a plane parallel to the x-y plane due to the fact that the rotational axis 1409 of the cutting envelope 1410*r* was parallel to the z-axis at the deepest point of the cutting.

The curved side surface 1431 of the recess 1420 corresponds to, and has the same conical shape as, a portion of the conical side 1410*rs* of the cutting envelope 1410*r*.

The flat faces 1441*a* and 1441*b* are formed together as a pair while the cutting envelope 1410*r* cuts its way through the substrate 1405 along the inclined cutting path. The faces 1441*a*, 1441*b* are not parallel to each other, but come together or meet along a rounded edge 1451, discussed in more detail below. A true measure of the full included angle (dihedral angle) between the faces 1441*a*, 1441*b* can be taken in any cross-sectional plane that is perpendicular to both faces, and therefore also perpendicular to the edge 1451. Measuring the angle between the faces 1441*a*, 1441*b* in other cross-sectional planes will yield values for the included angle (referred to as apparent included angles) other than the true dihedral angle.

Cut lines 20A-20A and 20B-20B (see FIG. 14B), for example, represent cross-sectional planes that are perpendicular to both faces 1441*a*, 1441*b*. A secondary Cartesian coordinate system, x'y'z' (see FIGS. 14B, 20A, and 20B) is defined such that the y'-z' plane is parallel to these cross-sectional planes, and the x' axis is parallel to the rounded edge 1451 (and also to the axis 1411). Thus, the cross-sectional views of FIGS. 20A and 20B show the true included angle (dihedral angle) between the faces 1441*a*, 1441*b*, which included angle is labeled as 180-2Ω, and where Ω (upper case omega) is the angle each such face makes with the x'-y' plane. FIG. 20B may be contrasted with FIG. 19, which is a similar cross-sectional view but in the y-z plane of the primary xyz coordinate system along cut line 19-19 (see FIG. 18). The y-z plane is not perpendicular to the faces 1441*a*, 1441*b*, nor is it perpendicular to the edge 1451. In that FIG. 19, an apparent included angle is measured, 180-2ω, where ω (lower case omega) is the apparent angle each face 1441*a*, 1441*b* makes with the x-y plane in this cross-sectional plane. Geometric principles can be used to show that ω is greater than Ω, and that the apparent included angle 180-2ω of FIG. 19 is therefore less than the true dihedral angle 180-2Ω of FIG. 20B. The apparent included angle 180-2ω between the faces is also greater than the full angle of the cutting envelope 1410*r*, see 2*THA in FIG. 16. (It can also be shown that the true dihedral angle 180-2Ω between the faces 1441*a*, 1441*b*, and the dihedral angle between similar faces disclosed herein whenever the rotational axis of the end mill cutting envelope is not perpendicular to the axis of the inclined cutting path during the formation of those faces, is greater than the cutting envelope full angle 2*THA.) With appropriate selection of the tool half angle THA and the inclination angle α of the inclined cutting path, as well as other factors discussed below, the faces 1441*a*, 1441*b* can be made to have any desired dihedral angle 180-2Ω, within practical limits. In cases involving the fabrication of cube corner elements, where the end milling procedures of FIGS. 14A-14B are just two of many other end milling cutting steps that are performed in the substrate (see e.g. FIG. 47 below), the THA and α parameters are chosen so the dihedral angle 180-2Ω between the faces equals 90 degrees. For example, in the end milling procedure of FIG. 14B, selecting THA to equal 35.264 degrees (i.e., THAC equals 54.736 degrees) and selecting the inclination angle α to equal 35.264 degrees ensures the faces 1441*a*, 1441*b* will have a 90 degree dihedral angle, i.e., they will be mutually orthogonal. Other combinations of the THA, α parameters can be used to make mutually orthogonal faces of different orientations relative to the x-y plane, as well as faces that are not mutually orthogonal.

The faces 1441*a*, 1441*b* can also be said to define respective reference planes that intersect along a line that is inclined relative to the working surface, such line being parallel to the axis 1411 and therefore, inclined at the same angle α.

Also seen in the group of FIGS. 14B, 15, 16, 18, 19, 20A, 20B, and 21 are transition lines 1461*a*, 1461*b*. These features are not physical edges, but are provided in the figures to show where the transition from a curved surface, i.e., curved side surface 1431, to a flat face, i.e., face 1441*a* and face 1441*b*, occurs.

Also seen in the group of figures is a rounded edge 1451, located at the place where faces 1441*a*, 1441*b* come together. As best seen in FIG. 14B, the rounded edge 1451 extends in a direction that is parallel to the inclined cutting path and reference axis 1411. Stated differently, the edge 1451 extends along an axis parallel to the inclined cutting path and axis 1411. FIG. 14B shows that the edge 1451 is inclined at the same angle α relative to the x-y plane as the axis 1411. This is because the edge 1451 is formed by the motion of the base 1410*rb* (or, of the outer circular cutting edge of the base 1410*rb*) while the cutting envelope moves through the solid material of the substrate along the inclined cutting path.

Since the edge 1451 is formed by the relative motion of the base 1410*rb*, the roundedness or curvature of the edge 1451 is a direct consequence of the fact that the cutting envelope 1410*r* is truncated to have a base 1410*rb* which is circular (rotationally symmetric) about the axis 1409 of the rotating end mill. That is, if it were possible to modify the cutting envelope 1410*r* to have a sharp, pointed cutting tip rather than the blunt base, then the faces 1441*a*, 1441*b* would meet to form a sharp edge. As it is, the tip of the cutting envelope is truncated, and as a result, the base has a circular cutting edge, and the edge 1451 is rounded. The reader will understand that deviations of the truncated base of the cutting envelope from perfect flatness, as discussed above, can affect the shape of the rounded edge 1451, as well as similar rounded edges on the many structures discussed below. But in general the edge 1451, and the similar edges, will still be rounded due to the fact that the cutting envelope is truncated (whether flat or non-flat) and has circular symmetry about the rotational axis of the end mill cutting tool.

The rounded edge 1451 is not rounded or curved in an arbitrary fashion, but in a particular way as a result of the orientation of the circular base 1410*rb* while the rounded edge was being formed by the end mill. This can be best understood with reference to FIG. 14B. In that figure, due to the fact that the rotational axis 1409 is parallel to the z-axis (and was parallel to the z-axis while the cutting envelope moved along the inclined cutting path), the base 1410*rb* of the cutting envelope lies in the x-y plane. In this orientation of the cutting envelope 1410*r*, the base 1410*rb* cuts circular shapes in the x-y plane. Therefore, a cross-section of the rounded edge 1451 in a plane parallel to the x-y plane will be a circular arc, i.e., it will exhibit a curvature of constant radius in that plane. This can be seen in FIG. 18 at the terminus 1451*t* of the rounded edge 1451, where the radius of curvature of the terminus 1451*t* is constant and equal to the radius of curvature of the base 1420*b*. However, in other cross-sectional planes, such as the y-z plane (see the cross-sectional view of FIG. 19), or a plane perpendicular to both faces 1441*a*, 1441*b* (see the cross-sectional view of FIG. 20B), the projection of the circular arc in such other plane produces an elliptical shape, which thus exhibits a variable curvature rather than a constant curvature. This is opposite of what one would expect for faces made (e.g. in the side of a lamina) by fly cutting using a dulled cutting tool having a rounded tip of constant curvature. In that case, the round tip would produce a rounded edge between the first and second face, but the curvature of the rounded edge would be circular (constant radius) in a cross-sectional plane that is perpendicular to both the first and second face, and would have a non-constant radius (non-circular arc) in other cross-sectional planes.

The foregoing discussion about the rounded edge 1451 exhibiting a curvature of constant radius in a plane other than a plane that is perpendicular to both faces 1441*a*, 1441*b* is also applicable to cases in which the bottom of the cutting envelope is not flat.

The curvature or radius, and the concomitant width, of the rounded edge 1451 can be selected as desired, within limits, by suitable selection of the end milling tool, which in turn controls the dimension Dbot (see FIG. 5C), and other dimensions, of the cutting envelope 1410*r*. In many applications, including many cases in which the disclosed end milling techniques are used to make cube corner elements, it will be desirable to have as small a radius of curvature for the rounded edge 1451 as possible, such that the rounded edge 1451 is as close to a sharp edge as possible. This is because rounded surfaces on a cube corner element are usually associated with inactive areas of retroreflection, and reductions in total light return. As mentioned above, the dimension Dbot may be as small as roughly 20 micrometers, or possibly smaller, which means the radius of curvature of the rounded edge 1451, in the above-described cross-sectional plane that yields constant curvature, may be as small as roughly 10 micrometers, or possibly smaller. However, in some cases it may actually be desirable for the rounded edge to have the 10 micrometer radius of curvature, or to have an even greater radius of curvature (i.e., more rounded, less sharp), whether for reasons of, for example, tool cost, or mold separation issues, or performance characteristics of the structured article.

It is apparent from the above discussion that the rounded edge 1451—as well as the other surfaces and features of the recess 1420—is an artifact of the rotating end mill (cutting envelope 1410*r*) that was used to form it. This fact may be manifested in the machined article itself (as well as in later generation articles whose structured surface is made by one or more replication steps of the working surface of the machined article) by small, nano-scale traces or features that result from imperfections or the scalloping action of the cutting tool as it works its way through the substrate material to form the edge. The rounded edge of a given disclosed substrate or article may thus be capable of being identified as an artifact of a rotating end mill, or of a truncated base thereof, solely on the basis of a close inspection of the article itself, e.g. by electron microscope or other advanced inspection techniques. This is true regardless of whether the bottom of the cutting envelope is flat or non-flat.

Also seen in the group of FIGS. 14B, 15, 16, 18, 19, 20A, 20B, and 21 are transition lines 1451*a*, 1451*b*. Like the transition lines 1461*a*, 1461*b*, the lines 1451*a*, 1451*b* are not physical edges, but are provided in the figures to show where the transitions from the rounded edge 1451 to the flat faces 1441*a*, 1441*b* occur.

The terminus 1451*t* of the rounded edge 1451 has already been referenced above. We only note here that the two-ended rounded edge 1451 also has another terminus, opposite the terminus 1451*t*, such other terminus being disposed at the base 1420*b*.

The terminus 1451*t* also forms part of the larger periphery or perimeter 1420*p* of the recess 1420. For the particular recess 1420, the perimeter 1420*p* has the general form of a teardrop. The perimeter 1420*p* has straight portions at the upper edges of the faces 1441*a*, 1441*b*, and a curved portion (circular arc of large radius of curvature) at the upper edge of the curved surface 1431, and an opposed curved portion (circular arc of small radius of curvature) corresponding to the terminus 1451*t* of the rounded edge 1451.

Having now described the recess 1420 in detail, we return briefly to FIGS. 17A and 17B to discuss the end milling process by which the recess was formed, or by which it can be formed. According to the sequence of FIGS. 14A, 14B and the associated discussion, the rotating end mill (cutting envelope) 1410*r* begins by plunging directly downward into the substrate, and then later withdrawing along a straight inclined path at the angle α. This fabrication sequence is represented by the path of FIG. 17A.

Figure 17A:
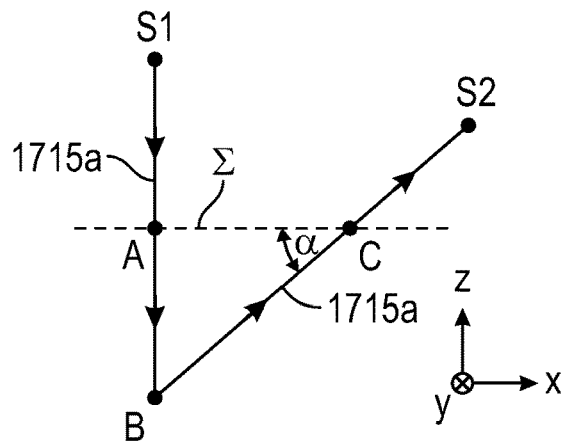
FIG. 17A is a schematic view of the path followed by the rotating end mill in connection with the sequence of FIGS. 14A-14B.

In FIG. 17A, Σ represents the plane of the working surface 1407 of substrate 1405, and the path of the rotating end mill is represented by line 1715*a*. The surface plane Σ is parallel to the x-y plane. The path 1715*a* lies entirely in the x-z plane. The path has a segment from S1 to A, and a segment from A to B, that are straight, and parallel to the z-axis. The path also has a segment from B to C, and a segment from C to S2, that are straight but inclined at the angle α relative to the x-axis, the same angle α as in FIG. 14B. The rotating end mill or cutting envelope 1410*r*: begins at the point S1 above the plane Σ; then moves along path 1715*a* to point A, where the rotating end mill first makes contact with the substrate; then continues cutting the substrate as it moves along path 1715*a* to a deepest point B; then moves along an incline at the angle α from point B to point C; then continues in the same inclined direction while withdrawing from the recess 1420 as it moves along path 1715*a* from point C to point S2 above the plane Σ. Throughout its travel along the path 1715*a*, the rotating end mill or cutting envelope 1410*r* maintains its rotational axis 1409 parallel to the z-axis. Of the various identifiable portions or segments of the path 1715*a*, actual cutting of the substrate 1405 occurs in two segments: the segment from A to B, and the segment from B to C. Thus, the path portions above the plane Σ, i.e., the path segments from S1 to A, and from C to S2, can be changed as desired with no effect on the shape of the recess formed, e.g. by repositioning points S1 or S2 to any other locations above the plane Σ, since those path portions involve no cutting of the substrate.

Figure 17B:
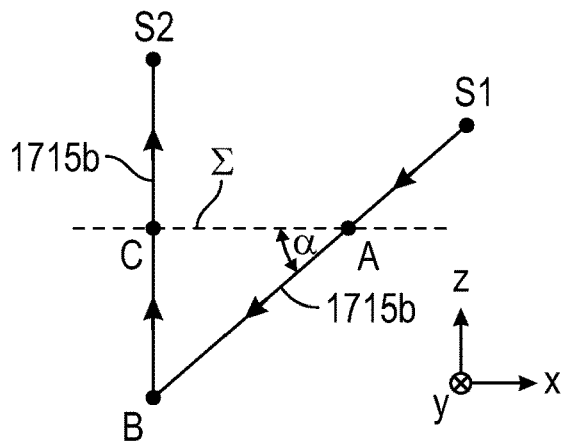
FIG. 17B is a schematic view of an alternative path that can be used to make the very same recess.

FIG. 17B depicts a path 1715*b* that is similar to path 1715*a*, in fact, path 1715*b* is simply the path 1715*a* in reverse order. Thus, in the process of FIG. 17B, the rotating end mill or cutting envelope 1410*r*: begins at the point S1 above the plane Σ; then moves at an incline (inclination angle α) along path 1715*b* to point A, where the rotating end mill first makes contact with the substrate; then continues cutting the substrate as it moves at the same incline (inclination angle α) along path 1715*b* to a deepest point B (note, at this point B on path 1715*b* the formation of the recess 1420 is complete); then begins to withdraw from the recess as it moves vertically from point B to point C; then completely withdraws from the recess 1420 as it moves along path 1715*b* from point C to point S2 above the plane Σ. Throughout its travel along the path 1715*b*, the rotating end mill or cutting envelope 1410*r* maintains its rotational axis 1409 parallel to the z-axis. Of the various identifiable portions or segments of the path 1715*b*, actual cutting of the substrate 1405 occurs in only one segment: the segment from A to B.

Cutting the substrate 1405 with the cutting envelope 1410*r* according to the motion of path 1715*a* (FIG. 17A) produces the recess 1420 as shown in FIGS. 14B, 15, 16, 18, 19, 20A, 20B, and 21. But cutting the same substrate with the same cutting envelope according to the motion of path 1715*b* (FIG. 17B) produces the same recess 1420. There are some differences in the process by which the recess is formed, but the end result is the same recess. One process difference is the number of cutting path segments—the path 1715*a* has two such segments (A to B and B to C in FIG. 17A), whereas path 1715*b* has only one cutting path segment (A to B in FIG. 17B). Another process difference is the order in which the various features of the recess 1420 are formed: with path 1715*a*, the curved side surface 1431 is formed before the faces 1441*a*, 1441*b*, and the last feature formed is the terminus 1451*t* of the rounded edge 1451; but with path 1715*b*, the terminus 1451*t* is formed first, followed by the faces 1441*a*, 1441*b*, and then the curved side surface 1431.

Any of the structures disclosed herein are capable of being replicated by using a first substrate as a master mold, or tool, or stamper, from which a structured surface can be created in a second substrate by known replication techniques such as molding, embossing, extruding, stamping, or cast-and-curing. A single or odd number of replication procedures produce a structured surface in the replica that is a negative or inverted copy of the original structured surface; two or another even number of replication procedures produce a structured surface in the replica that is a positive or non-inverted copy of the original structured surface, i.e., it is substantially the same as the original structured surface.

In one known replication procedure, a fluid resin composition is cast onto the structured surface of a tool (first substrate) and allowed to harden to form a sheet (second substrate), the sheet then having an inverted structured surface relative to the tool. A preferred method for casting fluid resin onto a tool is described in U.S. Pat. No. 7,410,604 (Erickson et al.). A variety of suitable resin compositions can be used so long as the resin can be formed into the desired configuration. In the case of cube corner sheeting or other sheeting that is intended for outdoor use, the resin is typically a transparent material that is dimensionally stable, durable, weatherable, and readily formable into the desired configuration. Examples of suitable materials include: acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable for cube corner sheeting because of their toughness and relatively higher refractive index, which generally contributes to improved retroreflective performance over a wider range of entrance angles. These materials may also include dyes, colorants, pigments, UV stabilizers, or other additives.

Figure 22:
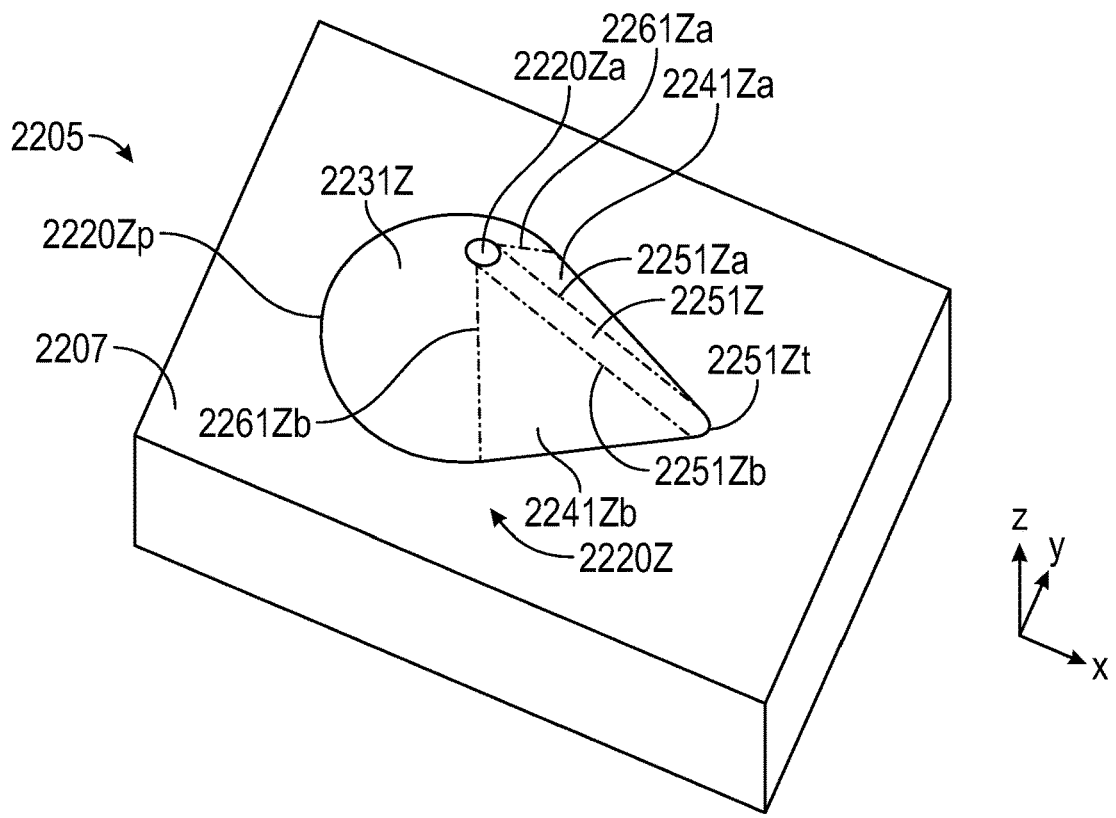
FIG. 22 is a perspective view of a substrate whose structured surface is a negative replica of that of FIG. 21, thus providing a structure that is a protrusion rather than a cavity.

In FIG. 22, a substrate 2205 is shown that has a structured surface 2207 which is a negative replica of the working surface (structured surface) 1407 of the substrate 1405 of FIGS. 14B, 15, 16, 18, 19, 20A, 20B, and 21. The substrate 2205 may thus be made by replication from the substrate 1405. The structured surface 2207 therefore comprises a protrusion 2220Z, which juts out of the structured surface 2207, in place of the recess 1420 of substrate 1405. We introduce a Cartesian coordinate system in FIG. 22 such that the x-y plane corresponds to the plane along which the structured surface 2207 generally extends, the z-axis represents a normal vector of the surface 2207, and the x-axis is oriented so that a rounded edge 2251Z, which corresponds inversely to the rounded edge 1451 of substrate 1405, lies in the x-z plane.

Features of the protrusion 2220Z have a one-to-one (and inverted) relationship with corresponding features of the recess 1420. The reader will appreciate that aspects and characteristics that were described in connection with the recess 1420 apply in corresponding fashion to the protrusion 2220Z. With that understanding, and wishing to avoid unnecessary repetition, we now briefly summarize the following features associated with the protrusion 2220Z: peak or apex 2220Za; curved side surface 2231Z; flat face 2241Za and flat face 2241Zb; transition lines 2261Za, 2261Zb; rounded edge 2251Z; transition lines 2251Za, 2251Zb; terminus 2251Zt of the rounded edge; and a periphery or perimeter 2220Zp.

The peak or apex 2220Za of the protrusion 2220Z has a small, flat, and round shape, and it lies in a plane parallel to the x-y plane.

The curved side surface 2231Z of the protrusion 2220Z has a conical shape.

The flat faces 2241Za and 2241Zb come together or meet along a rounded edge 2251Z. The dihedral angle between the faces 2241Za, 2241Zb (which we may refer to again as 180-2$\Omega$) can be measured in any cross-sectional plane that is perpendicular to both faces, and therefore also perpendicular to the edge 2251Z. The faces 2241Za, 2241Zb can be made to have any desired dihedral angle 180-2$\Omega$, within practical limits. In cases involving cube corner elements, the dihedral angle 180-2$\Omega$ between the faces equals 90 degrees. The faces 2241Za, 2241Zb can be said to define respective reference planes that intersect along a line that is inclined relative to the structured surface 2207, such line being inclined at an angle $\alpha$.

Transition lines 2261Za, 2261Zb are not physical edges, but are provided in the figure to show where the transitions from the curved side surface 2231Z to the flat faces 2241Za, 2241Zb occur.

The rounded edge 2251Z is located at the place where faces 2241Za, 2241Zb come together. The rounded edge 2251Z extends along an axis that is inclined at the angle $\alpha$ relative to the x-y plane. The rounded edge 2251Z is not rounded or curved in an arbitrary fashion. A cross-section of the rounded edge 2251Z in a plane parallel to the x-y plane will be a circular arc, i.e., it will exhibit a curvature of constant radius in that plane. However, in other cross-sectional planes, such as the y-z plane, or a plane perpendicular to both faces 2241Za, 2241Zb, the shape of the rounded edge 2251Z is elliptical, thus exhibiting a variable curvature rather than a constant curvature. The radius of curvature, and concomitant width, of the rounded edge 1451 can be within desired limits, but is generally at least 10 micrometers, as measured in the cross-sectional plane that yields constant curvature, and in some cases it can be substantially greater. As a result of being replicated from an article that was made by end milling, the rounded edge 2251Z is also an artifact of a rotating end mill, as manifested for example by small, nano-scale traces or features that resulted from imperfections or the scalloping action of a cutting tool as it worked its way through the previous generation substrate material, and were carried over by replication to the edge 2251Z.

Transition lines 2251Za, 2251Zb, like the transition lines 2261Za, 2261Zb, are not physical edges, but are provided in the figure to show where the transitions from the rounded edge 2251Z to the flat faces 2241Za, 2241Zb occur.

The terminus 2251Zt is one of two ends of the rounded edge 2251Z. The other end or terminus of the rounded edge 2251Z is disposed at the apex 2220Za. The terminus 2251Zt also forms part of the larger periphery or perimeter 2220Zp of the protrusion 2220Z. The perimeter 2220Zp has the general form of a teardrop, with straight portions at the lower edges of the faces 2241Za, 2241Zb, and a curved portion (circular arc of large radius of curvature) at the lower edge of the curved surface 2231Z, and an opposed curved portion (circular arc of small radius of curvature) corresponding to the terminus 2251Zt of the rounded edge 2251Z.

The protrusion 2220Z is made by replication from the teardrop-shaped recess 1420. And the process of forming the recess 1420, whether by the path of FIG. 17A or the path of FIG. 17B, involves cutting a substrate with a rotating end mill that moves through the substrate along a cutting path, where the cutting path includes a path portion that is inclined relative to the working surface of the substrate. In the path 1715a of FIG. 17A, the path segment from B to C is a cutting path inclined at the angle $\alpha$, and in the path 1715b of FIG. 17B, the path segment from A to B is a cutting path inclined at the angle $\alpha$.

The teardrop-shaped recess 1420 and protrusion 2220Z both bear characteristic marks of being made, directly or indirectly, by an end milling method. And although neither the recess 1420 nor the protrusion 2220Z is a cube corner element, they may nevertheless be useful—whether individually or as one member of an array or group of identical or different recesses or protrusions—when incorporated into the structured surfaces of films, sheeting, or other articles in optical, mechanical, or other applications.

Furthermore, the end milling methods for forming cube corner elements as disclosed herein spring from a recognition that the same end milling process that was used to make the flat faces of the recess 1420 and the protrusion 2220Z—namely, cutting a substrate with a rotating end mill that moves through the substrate along a cutting path that includes a portion inclined relative to the working surface of the substrate—can be repeated to form additional flat faces, and at least some of the original flat faces and the additional flat faces can then be combined to form a cube corner element in the substrate. As explained further in the discussion and figures that follow, such combination relies on appropriate control of the orientation of the flat faces relative to each other and to the working surface (or structured surface), which in turn is controlled by judicious selection of the end milling cutting parameters, such as the tool half angle THA of the cutting envelope for each cutting step, the inclination angle ($\alpha$, or $\beta$, $\gamma$, etc. as discussed below) of the inclined cutting path portion for each cutting step, the orientation of the cutting tool rotational axis relative to the z-axis and to the vertical plane of the inclined cutting path portion for each cutting step, and the relative orientations of the cutting path portions for the various cutting steps.

But before describing cube corner elements made by the end milling method, we wish to point out that numerous variations of the teardrop-shaped recess 1420, and its corresponding protrusion 2220Z, can be made that are not cube corner elements. A few of these numerous variations are described with reference to alternative paths of motion of the rotating end mill, as shown in FIGS. 23-27. Recesses that correspond to these alternative paths are shown in FIGS. 28-32, with the recess of FIG. 28 corresponding to the path of FIG. 23, the recess of FIG. 29 corresponding to the path of FIG. 24, and so forth.

The reader needs to be cautioned here that a given path of motion for the end mill, such as even the path of FIG. 17A or 17B (or any of the paths of FIGS. 23-27), can produce a whole family of different recesses (and corresponding protrusions), of which the cavity 1420 shown in FIGS. 14B, 15, 16, 18, 19, 20A, 20B, and 21 is only one member. The family of such different recesses uses the same path (e.g., FIG. 17A or 17B), but different end mill parameters, for example, different tool half angles THA (see FIG. 5C and FIGS. 34-36 below), different values for Dbot and Dtop (see FIG. 5C), and different orientations of the cutting tool rotational axis relative to the z-axis and to the vertical plane of the cutting path portion (see e.g. angles θ and ϕ in FIG. 33 below). Stated differently, a given path of motion for the end mill, by itself, is insufficient to specify the shape or configuration of a particular recess or corresponding protrusion, unless the other end mill parameters are also provided.

With this in mind, we turn our attention to FIGS. 23-27 and corresponding FIGS. 28-32. For simplicity, the entire path of motion of the end mill in each of FIGS. 23-27 is assumed to lie in a single vertical plane, which we designate the x-z plane. In each of these figures, Σ represents the plane of the working surface (or structured surface) of the substrate being cut, and Σ is deemed to be parallel to the x-y plane of the coordinate system. Each of the paths of FIGS. 23-27 will be described as beginning at a point S1 and ending at a point S2, but the reader will understand that the rotating end mill may follow the reverse path, beginning at S2 and ending at S1, to make the same recess. The recesses of FIGS. 28-32 correspond respectively to the paths of FIGS. 23-27 (keeping in mind that each of the illustrated recesses is one member of a whole family of possible recesses that may correspond to those paths) and assume that the rotational axis of the rotating cutting tool (or cutting envelope) is at all times parallel to the z-axis as it follows the corresponding path. The recesses of FIGS. 28-32 also assume these additional rotating end mill parameters (refer to FIG. 5C): THA=35.264 degrees, and Dbot=30 micrometers. The xyz coordinate axes in FIGS. 28-32 are consistent with the xyz axes in their corresponding FIGS. 23-27.

In FIG. 23, a path 2315 of the rotating end mill may begin at point S1 above the surface, proceed to point A located on the surface plane Σ, then proceed to a deepest point B, then to a point C, then to a point D located on the surface plane Σ, and finish at point S2 above the surface. The segments of the path 2315 from S1 to A, and from A to B, and from C to D, and from D to S2 are straight and parallel to the z-axis. The segment of the path 2315 from B to C is straight but inclined at an angle α relative to the x-axis. When following the path 2315 in this manner, actual cutting of the substrate occurs only in the segment from A to B, and in the segment from B to C. (In a reverse path, cutting occurs only from D to C, and from C to B.)

Figure 28:
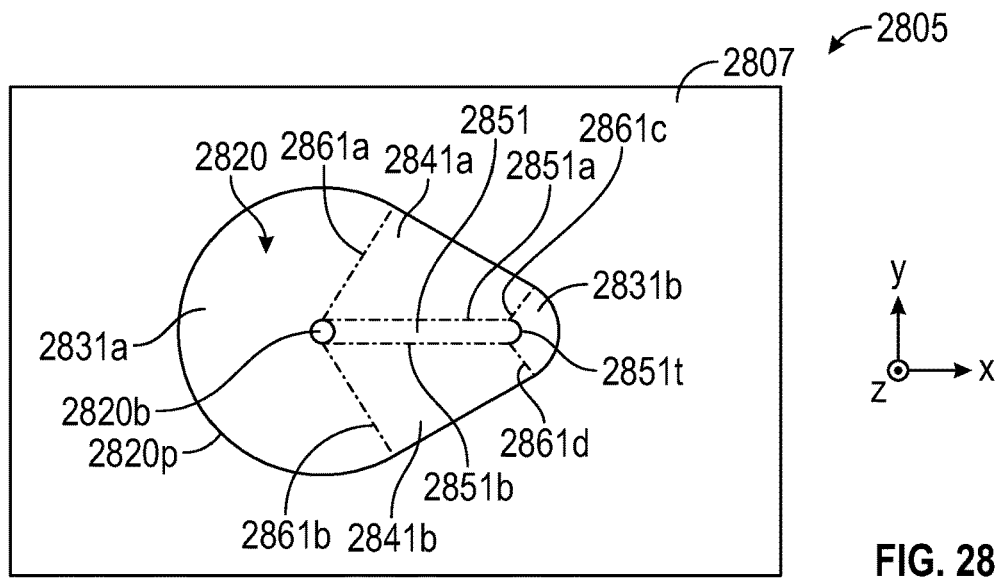
FIGS. 28, 29, 30, 31, and 32 are schematic top views of cavities that can be formed in substrates using the paths of FIGS. 23, 24, 25, 26, and 27, respectively.

FIG. 28 depicts a substrate 2805, which may be the same as or similar to substrates discussed above, having a working surface 2807 in which is formed a recess 2820, the recess being formed by a rotating end mill as described above which moves along the path 2315 of FIG. 23. The recess 2820 has a perimeter 2820p and a base 2820b. The recess 2820 also has a large curved side surface 2831a, and a smaller curved side surface 2831b. The recess 2820 also has flat faces 2841a, 2841b which come together or meet along a rounded edge 2851. The dihedral angle between these flat faces is 90 degrees. The rounded edge extends along an axis that is inclined relative to the x-y plane at the same inclination angle α as in FIG. 23. In FIG. 28, α is assumed to be 35.264 degrees. The rounded edge 2851 has a terminus 2851t, and another terminus at the base 2820b. Transition lines 2861a, 2861b, 2861c, 2861d mark the boundaries between flat faces and curved side surfaces. Transition lines 2851a, 2851b mark the boundaries between the rounded edge and the flat faces. The curved side surfaces, flat faces, rounded edge, and transition lines have the same or similar characteristics and properties as corresponding features of the cavity 1420 described in detail above. With reference to the path 2315, the flat faces 2841a, 2841b of the recess are formed while the cutting envelope moves along path segment B-C, the curved side surface 2831a is formed while the cutting envelope is positioned at point B, and the curved side surface 2831b is formed while the cutting envelope is positioned at point C.

In FIG. 24, a path 2415 of the rotating end mill may begin at point S1 above the surface, proceed to point A located on the surface plane Σ, then proceed to a deepest point B, then to another deepest point C, then to a point D located on the surface plane Σ, and finish at point S2 above the surface. The segments of the path 2415 from S1 to A, and from A to B are straight and parallel to the z-axis. The segment of the path 2415 from B to C is straight and parallel to the x-axis. The segments of the path 2415 from C to D, and from D to S2 are straight but inclined at an angle α relative to the x-axis. When following the path 2415 in this manner, actual cutting of the substrate occurs only in the segments from A to B, and from B to C, and from C to D. (In a reverse path, cutting occurs only from D to C, and from C to B.)

Figure 29:
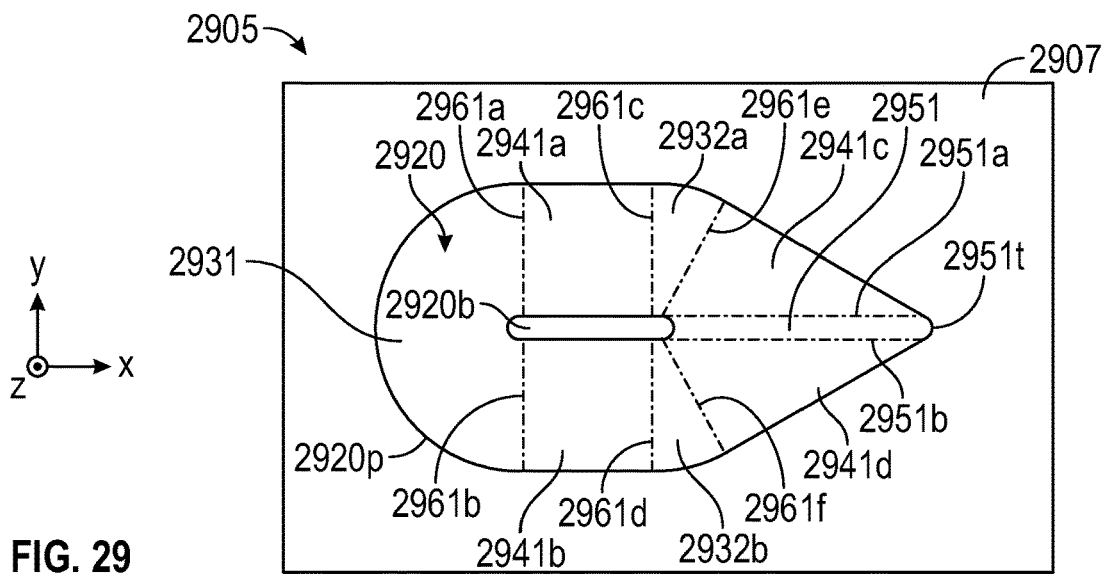

FIG. 29 depicts a substrate 2905, which may be the same as or similar to substrates discussed above, having a working surface 2907 in which is formed a recess 2920, the recess being formed by a rotating end mill as described above which moves along the path 2415 of FIG. 24. The recess 2920 has a perimeter 2920p and a base 2920b. The recess 2920 also has a large curved side surface 2931, and two smaller curved side surfaces 2932a, 2932b. The recess 2920 also has flat faces 2941a, 2941b which both intersect the base 2920b. The dihedral angle between these flat faces is the same as the full cone angle of the cutting envelope, i.e., 2*THA. The recess 2920 also has flat faces 2941c, 2941d which come together or meet along a rounded edge 2951. The dihedral angle between these flat faces is 90 degrees. The rounded edge extends along an axis that is inclined relative to the x-y plane at the same inclination angle α as in FIG. 24. In FIG. 29, α is assumed to be 35.264 degrees. The rounded edge 2951 has a terminus 2951t, and another terminus at its intersection with the base 2920b. Transition lines 2961a, 2961b, 2961c, 2961d, 2961e, 2961f mark the boundaries between flat faces and curved side surfaces. Transition lines 2951a, 2951b mark the boundaries between the rounded edge and the flat faces. The curved side surfaces, flat faces, rounded edge, and transition lines have the same or similar characteristics and properties as corresponding features of the cavity 1420 described in detail above. With reference to the path 2415, the flat faces 2941a, 2941b of the recess are formed while the cutting envelope moves along path segment B-C, the flat faces 2941c, 2941d are formed while the cutting envelope moves along path segment C-D, the curved side surface 2931a is formed while the cutting envelope is positioned at point B, and the curved side surfaces 2932a, 2932b are formed while the cutting envelope is positioned at point C.

In FIG. 25, a path 2515 of the rotating end mill may begin at point S1 above the surface, proceed to point A located on the surface plane Σ, then proceed to a deepest point B, then to a point C, then to a point D located on the surface plane Σ, and finish at point S2 above the surface. The segments of the path 2515 from S1 to A, and from A to B are straight and parallel to the z-axis. The segment of the path 2515 from B to C is straight but inclined at an angle α1 relative to the x-axis. The segments of the path 2515 from C to D, and from D to S2 are straight but inclined at an angle α2 (where α2>α1) relative to the x-axis. When following the path 2515 in this manner, actual cutting of the substrate occurs only in the segments from A to B, and from B to C, and from C to D. (In a reverse path, cutting occurs only from D to C, and from C to B.)

Figure 30:
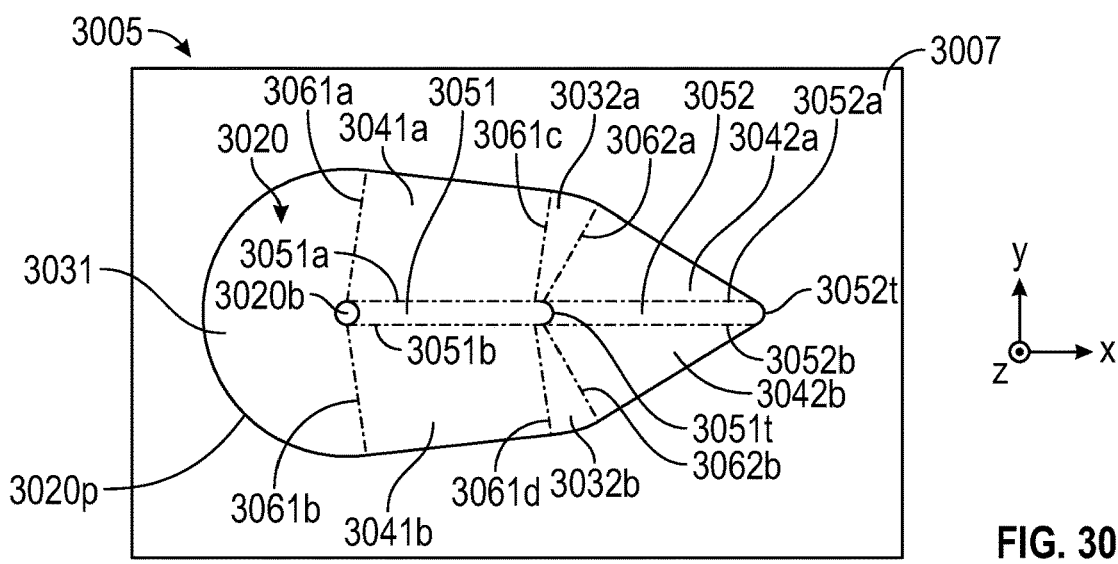

FIG. 30 depicts a substrate 3005, which may be the same as or similar to substrates discussed above, having a working surface 3007 in which is formed a recess 3020, the recess being formed by a rotating end mill as described above which moves along the path 2515 of FIG. 25. The recess 3020 has a perimeter 3020p and a base 3020b. The recess 3020 also has a large curved side surface 3031, and two smaller curved side surfaces 3032a, 3032b. The recess 3020 also has flat faces 3041a, 3041b which come together or meet along a rounded edge 3051. The dihedral angle between these flat faces is 71.783 degrees. The rounded edge 3051 extends along an axis that is inclined relative to the x-y plane at the same inclination angle α1 as in FIG. 25. In FIG. 30, α1 is assumed to be 10 degrees. The rounded edge 3051 has a terminus 3051t, and another terminus at the base 3020b. The recess 3020 also has flat faces 3042a, 3042b which come together or meet along a rounded edge 3052. The dihedral angle between these flat faces is 90 degrees. The rounded edge 3052 extends along an axis that is inclined relative to the x-y plane at the same inclination angle α2 as in FIG. 25. In FIG. 30, α2 is assumed to be 35.264 degrees. The rounded edge 3052 has a terminus 3052t, and another terminus 3051t which it shares with the other rounded edge 3051. Transition lines 3061a, 3061b, 3061c, 3061d, 3062a, 3062b mark the boundaries between flat faces and curved side surfaces. Transition lines 3051a, 3051b, 3052a, 3052b mark the boundaries between the rounded edges and the flat faces. The curved side surfaces, flat faces, rounded edges, and transition lines have the same or similar characteristics and properties as corresponding features of the cavity 1420 described in detail above. With reference to the path 2515, the flat faces 3041a, 3041b of the recess are formed while the cutting envelope moves along path segment B-C, the flat faces 3042a, 3042b are formed while the cutting envelope moves along path segment C-D, the curved side surface 3031 is formed while the cutting envelope is positioned at point B, and the curved side surfaces 3032a, 3032b are formed while the cutting envelope is positioned at point C.

In FIG. 26, a path 2615 of the rotating end mill may begin at point S1 above the surface, proceed to point A located on the surface plane Σ, then proceed to a deepest point B, then to a point C located on the surface plane Σ, and finish at point S2 above the surface. The segments of the path 2615 from S1 to A, and from A to B are straight but inclined at an angle α1 relative to the x-axis. The segments of the path 2615 from B to C, and from C to S2 are straight but inclined at an angle α2 (where α2 is about equal to α1, but they are inclined in opposite senses as shown in the figure) relative to the x-axis. When following the path 2615 in this manner, actual cutting of the substrate occurs only in the segments from A to B, and from B to C. (In a reverse path, cutting occurs only from C to B, and from B to A.)

Figure 31:
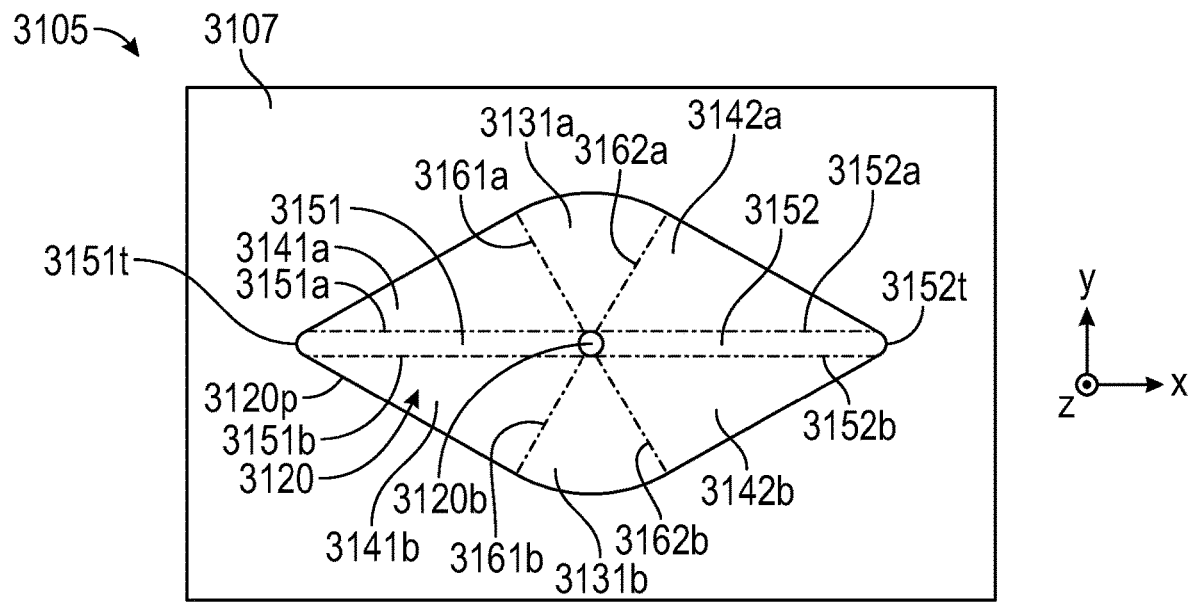

FIG. 31 depicts a substrate 3105, which may be the same as or similar to substrates discussed above, having a working surface 3107 in which is formed a recess 3120, the recess being formed by a rotating end mill as described above which moves along the path 2615 of FIG. 26. The recess 3120 has a perimeter 3120p and a base 3120b. The recess 3120 also has two curved side surfaces 3131a, 3131b. The recess 3120 also has flat faces 3141a, 3141b which come together or meet along a rounded edge 3151. The dihedral angle between these flat faces is 90 degrees. The rounded edge 3151 extends along an axis that is inclined relative to the x-y plane at the same inclination angle α1 as in FIG. 26. In FIG. 31, α1 is assumed to be 35.264 degrees. The rounded edge 3151 has a terminus 3151t, and another terminus at the base 3120b. The recess 3120 also has flat faces 3142a, 3142b which come together or meet along a rounded edge 3152. The dihedral angle between these flat faces is 90 degrees. The rounded edge 3152 extends along an axis that is inclined relative to the x-y plane at the same inclination angle α2 as in FIG. 26. In FIG. 31, α2 is assumed to be 35.264 degrees. The rounded edge 3152 has a terminus 3152t, and another terminus at the base 3120b. Transition lines 3161a, 3161b, 3162a, 3162b mark the boundaries between flat faces and curved side surfaces. Transition lines 3151a, 3151b, 3152a, 3152b mark the boundaries between the rounded edges and the flat faces. The curved side surfaces, flat faces, rounded edges, and transition lines have the same or similar characteristics and properties as corresponding features of the cavity 1420 described in detail above. With reference to the path 2615, the flat faces 3141a, 3141b of the recess are formed while the cutting envelope moves along path segment A-B, the flat faces 3142a, 3142b are formed while the cutting envelope moves along path segment B-C, and the curved side surfaces 3131a, 3131b (as well as the base 3120b) are formed while the cutting envelope is positioned at point B.

In FIG. 27, a path 2715 of the rotating end mill may begin at point S1 above the surface, proceed to point A located on the surface plane Σ, then proceed to a deepest point B, then to a point C located on the surface plane Σ, and finish at point S2 above the surface. The segments of the path 2715 from S1 to A, and from A to B are straight but inclined at an angle α1 relative to the x-axis. The segments of the path 2715 from B to C, and from C to S2 are straight but inclined at an angle α2 (where α2<α1, and these angles are inclined in opposite senses as shown in the figure) relative to the x-axis. When following the path 2715 in this manner, actual cutting of the substrate occurs only in the segments from A to B, and from B to C. (In a reverse path, cutting occurs only from C to B, and from B to A.)

Figure 32:
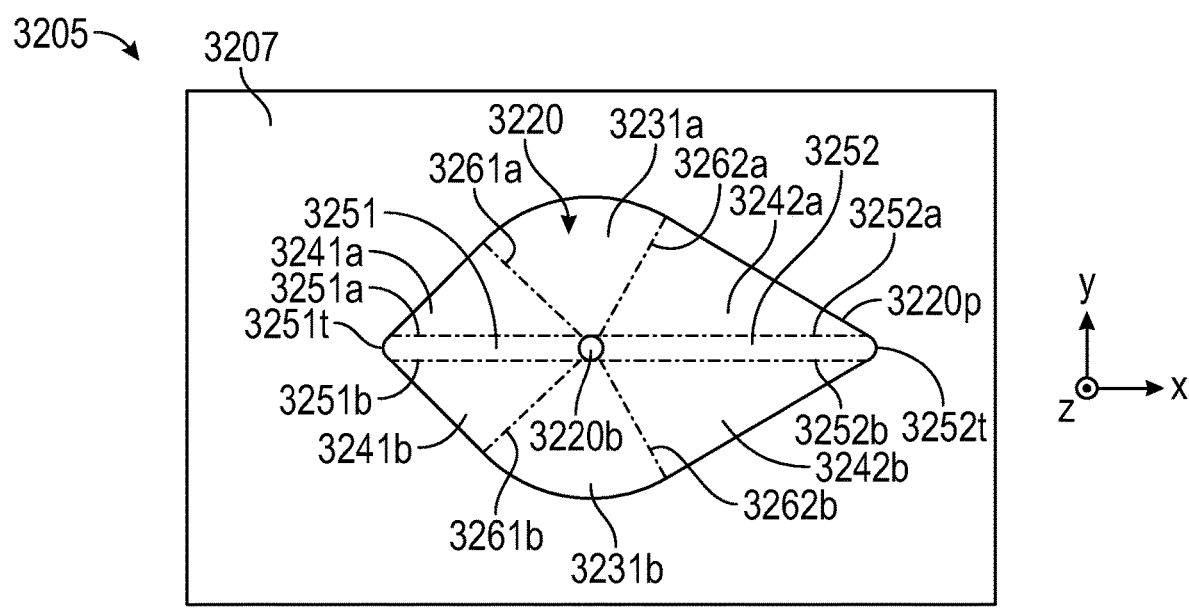

FIG. 32 depicts a substrate 3205, which may be the same as or similar to substrates discussed above, having a working surface 3207 in which is formed a recess 3220, the recess being formed by a rotating end mill as described above which moves along the path 2715 of FIG. 27. The recess 3220 has a perimeter 3220p and a base 3220b. The recess 3220 also has two curved side surfaces 3231a, 3231b. The recess 3220 also has flat faces 3241a, 3241b which come together or meet along a rounded edge 3251. The dihedral angle between these flat faces is 110.988 degrees. The rounded edge 3251 extends along an axis that is inclined relative to the x-y plane at the same inclination angle α1 as in FIG. 27. In FIG. 32, α1 is assumed to be 45.526 degrees. The rounded edge 3251 has a terminus 3251t, and another terminus at the base 3220b. The recess 3220 also has flat faces 3242a, 3242b which come together or meet along a rounded edge 3252. The dihedral angle between these flat faces is 90 degrees. The rounded edge 3252 extends along an axis that is inclined relative to the x-y plane at the same inclination angle α2 as in FIG. 27. In FIG. 32, α2 is assumed to be 35.264 degrees. The rounded edge 3252 has a terminus 3252t, and another terminus at the base 3220b. Transition lines 3261a, 3261b, 3262a, 3262b mark the boundaries between flat faces and curved side surfaces. Transition lines 3251a, 3251b, 3252a, 3252b mark the boundaries between the rounded edges and the flat faces. The curved side surfaces, flat faces, rounded edges, and transition lines have the same or similar characteristics and properties as corresponding features of the cavity 1420 described in detail above. With reference to the path 2715, the flat faces 3241a, 3241b of the recess are formed while the cutting envelope moves along path segment A-B, the flat faces 3242a, 3242b are formed while the cutting envelope moves along path segment B-C, and the curved side surfaces 3231a, 3231b (as well as the base 3220b) are formed while the cutting envelope is positioned at point B.

The recesses of FIGS. 28-32, as well as all other recesses disclosed herein, can be formed individually or in groups or arrays in the structured surface of an article, and such individual or groups of recesses can also be replicated to form individual or groups of corresponding protrusions in the structured surface of an article.

As discussed above, additional design flexibility for the disclosed recesses and protrusions can be realized by—in addition to tailoring the angle of inclination (e.g. α, α1, α2, β, γ, etc.) of the inclined cutting path portion—tailoring the end mill parameters such as THA, Dbot, and Dtop (see FIG. 5C), as well as the orientation of the cutting tool rotational axis relative to the z-axis and to the vertical plane of the cutting path portion.

Figure 33:
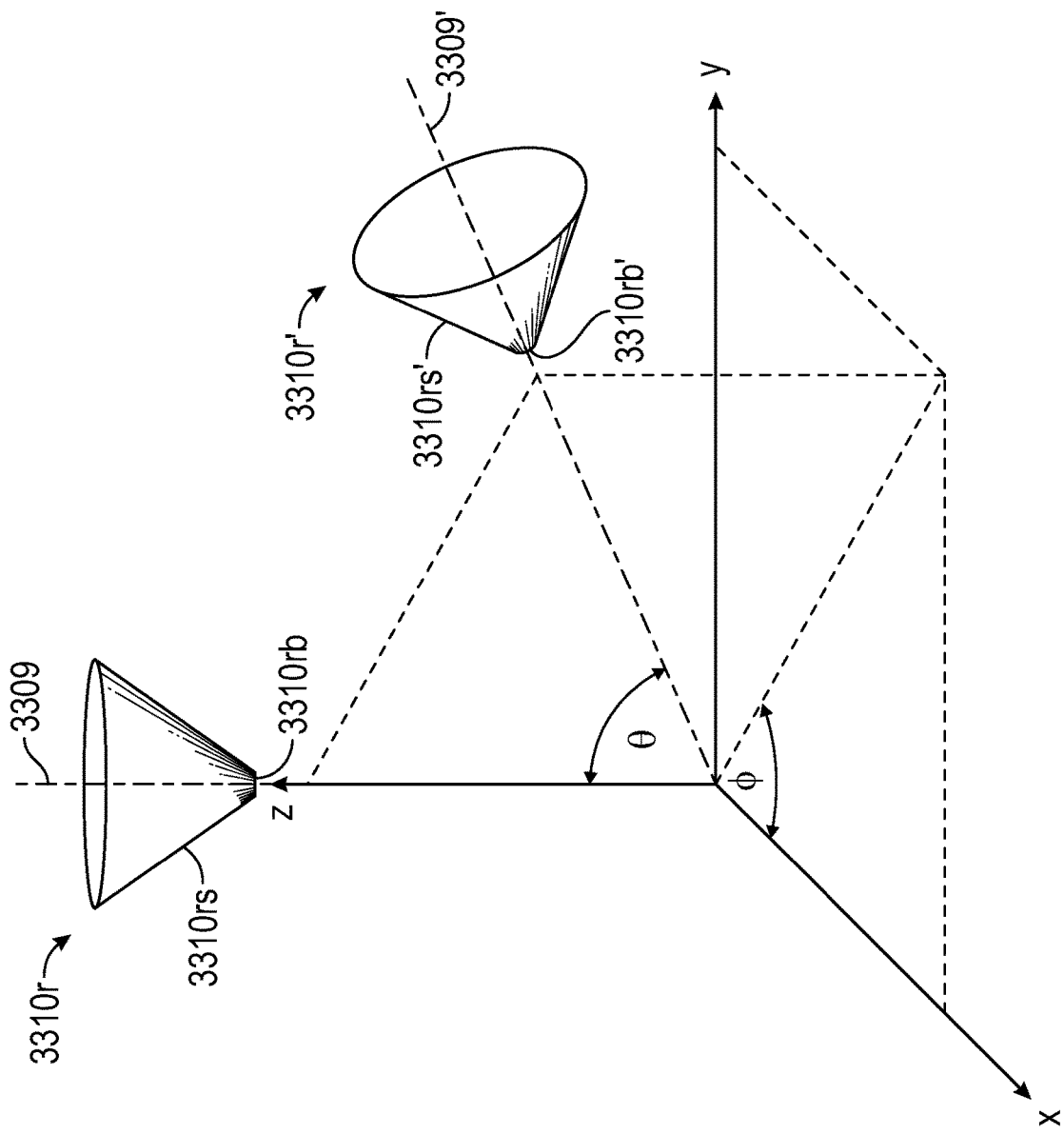
FIG. 33 is a schematic perspective view of a non-tilted and a tilted cutting envelope of a rotating cutting tool in the context of a coordinate system, illustrating a polar angle θ and an azimuthal angle φ.

The orientation of the cutting tool rotational axis can be expressed in terms of a polar angle θ and an azimuthal angle φ as shown in the schematic diagram of FIG. 33. In that figure, a cutting envelope 3310r is shown that may be the same as or similar to any of the end mill cutting envelopes described above. Thus, the cutting envelope 3310r includes a cone-shaped side 3310rs, a truncated end or bottom 3310rb, and a rotational axis 3309. The cutting envelope 3310r is shown in the context of a Cartesian xyz coordinate system, in similar fashion to other figures herein. For purposes of FIG. 33, we assume the z-axis corresponds to a normal vector of the working surface or structured surface being cut by the end mill, and that such surface extends parallel to the x-y plane. We further assume that to the extent the cutting envelope moves along a path portion that is not parallel to the z-axis—i.e., either inclined to the x-y plane or parallel to the x-y plane—such path portion lies in the x-z plane. In this way, the reference by which we measure the azimuthal angle φ of a tilted cutting envelope is a vertical plane in which the path portion lies.

The cutting envelope 3310r is shown for reference purposes as having no tilt, i.e., its rotational axis 3309 is parallel to the z-axis. This can be contrasted with a generalized tilted cutting envelope 3310r' shown in the figure. Like the cutting envelope 3310r, the cutting envelope 3310r' has a cone-shaped side 3310rs', a truncated end or bottom 3310rb', and a rotational axis 3309'. The cutting envelope 3310r' however is tilted to have a nonzero polar angle θ and a nonzero azimuthal angle φ, i.e., the rotational axis 3309' makes a nonzero angle θ relative to the z-axis, and the vertical plane containing the rotational axis 3309' (which we may refer to as the rotational axis vertical plane) makes a nonzero angle φ relative to the x-z plane. FIG. 33 also shows the cutting envelope 3310r' as being separated from (located outside of) the x-z plane. This separation is only for purposes of better illustrating the nonzero polar and azimuthal angles θ, φ, and the reader will understand that the cutting envelope 3310r' (e.g. at least the bottom 3310rb' thereof) would normally reside in the x-z plane as it cuts along a path portion which we have assumed lies in the x-z plane. For purposes of some of the embodiments described below, we can assign positive or negative values to φ depending on the direction of rotation of the rotational axis vertical plane relative to the x-z plane (in which the inclined path portion resides): a counterclockwise rotation about the z-axis, as depicted in the cutting envelope orientation 3310r' shown in FIG. 33 and in accordance with the so-called right hand rule, is considered positive, whereas a clockwise rotation about the z-axis is considered negative.

For a given cutting path or path portion, the cutting envelope of the rotating end mill can be tilted as desired, whether with a nonzero polar angle θ and a zero azimuthal angle φ (i.e. tilted in the vertical plane of an inclined cutting path portion), or with nonzero polar and azimuthal angles (i.e. tilted outside the vertical plane of an inclined cutting path portion), or not tilted at all (vertically oriented in the vertical plane of an inclined cutting path portion), to achieve the desired orientation of the various curved surfaces, flat faces, or other features of a given recess. For example, for an inclined cutting path lying in the x-z plane which is used to cut flat faces of a recess, by adjusting the polar angle θ of the rotational axis of the cutting envelope, the dihedral angle between such faces can be adjusted, for a given tool half angle THA. Selecting the polar angle θ such that the rotational axis is perpendicular to the direction or axis of the cutting path produces a maximum dihedral angle (equal to 2*THA), whereas adjusting the polar angle θ to reduce the angle between the rotational axis and the axis of the cutting path produces a larger dihedral angle between the flat faces (greater than 2*THA). The azimuthal angle φ can also be adjusted (for nonzero polar angles θ), for example, to orient the flat faces in an asymmetric fashion relative to the vertical plane in which the cutting path resides. Note that nonzero values for the angles θ and φ have ramifications on the curvature characteristics of the rounded edge that connects the two flat faces. That is, changing the angles θ and φ will in general change the orientation of the cross-sectional plane in which the rounded edge exhibits a curvature of constant radius.

Figure 34:
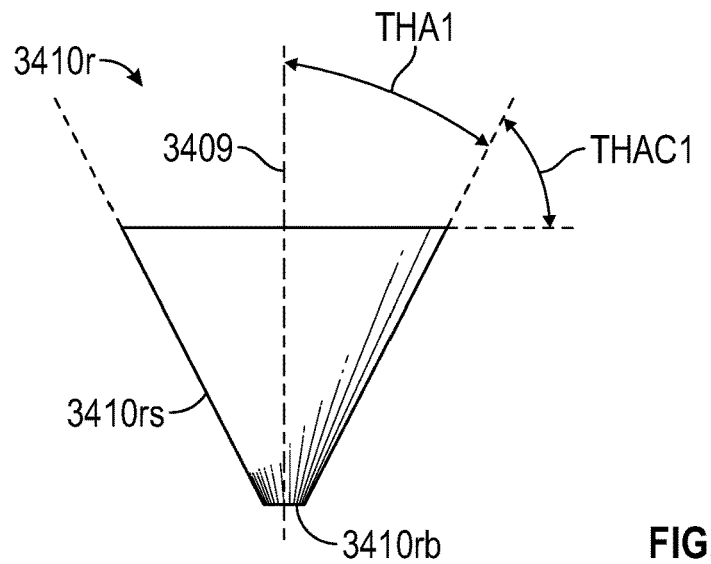
FIGS. 34, 35, and 36 are schematic side or cross-sectional views of cutting envelopes similar to that of FIG. 5C but for end mills of different design.
Figure 35:
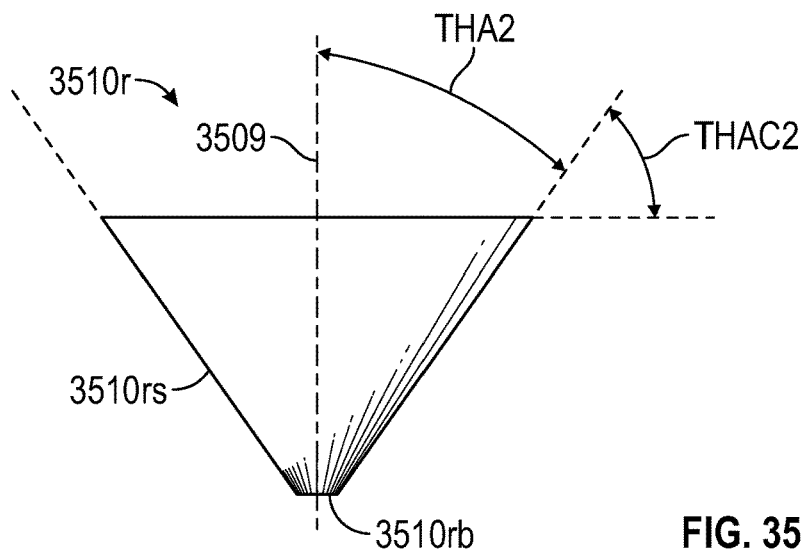
Figure 36:
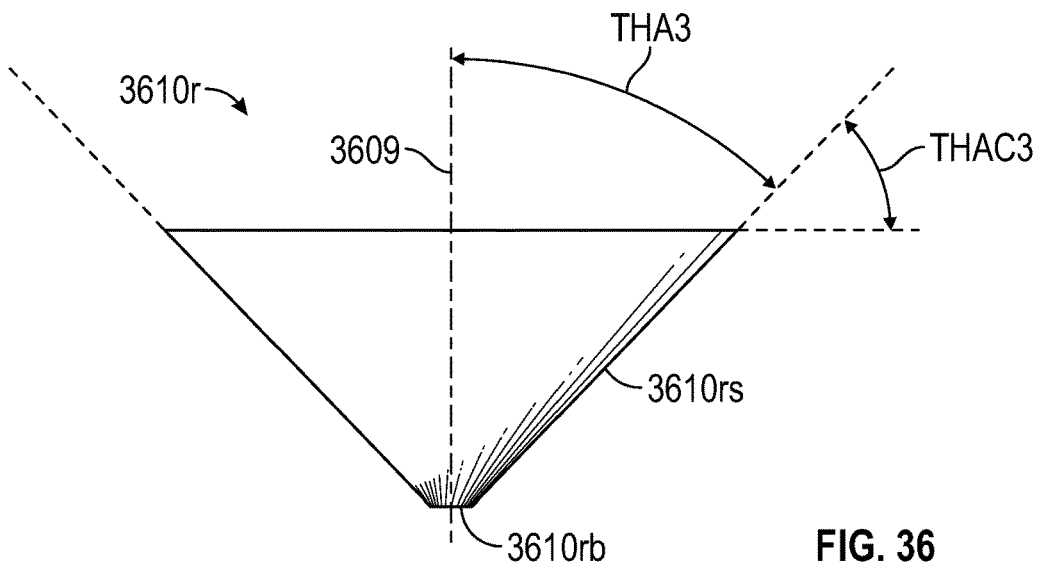

Besides tailoring the orientation of the cutting tool rotational axis, design flexibility can also be provided by appropriate selection of end mill parameters such as THA and Dbot. A comparison of different values of THA is provided in the group of FIGS. 34, 35, and 36. In FIG. 34, a first rotating end mill provides a first cutting envelope 3410r, with a conical side 3410rs, a truncated end or bottom 3410rb, and a tool half angle THA1. THAC1 is the geometric complement of THA1. In FIG. 35, a second rotating end mill provides a second cutting envelope 3510r, with a conical side 3510rs, a truncated end or bottom 3510rb, and a tool half angle THA2. THAC2 is the geometric complement of THA2. In FIG. 36, a third rotating end mill provides a third cutting envelope 3610r, with a conical side 3610rs, a truncated end or bottom 3610rb, and a tool half angle THA3. THAC3 is the geometric complement of THA3. Any one of the cutting envelopes 3410r, 3510r, or 3610r may be the same as or similar to the cutting envelope 510r discussed above, however, the cutting envelopes have different half (and full) cone angles, with THA2 being greater than THA1, and THA3 being greater than THA2. Selecting an end mill tool that provides an increased or decreased value of THA allows the designer to increase or decrease, respectively, the dihedral angle between flat faces of a recess formed by the disclosed methods, and to achieve a target dihedral angle.

Figure 37:
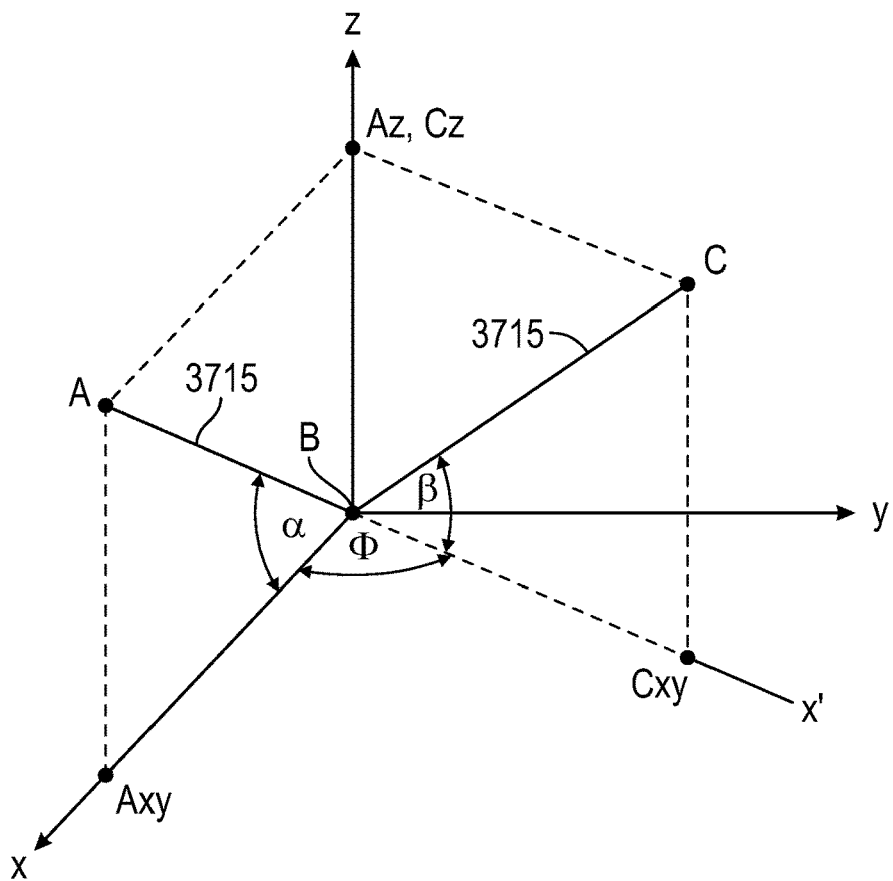
FIG. 37 is a schematic view of a path for a rotating end mill that includes two segments that lie in different vertical planes, such a path being useful for making other types of recesses.

FIG. 37 illustrates a path 3715 for a rotating end mill that is similar in most respects to the paths of FIGS. 17A, 17B, and 23-27, except that the path of FIG. 37 does not lie entirely within a single vertical plane. Instead, the path 3715 includes two segments that lie in different vertical planes. The path 3715 is shown in the context of a Cartesian xyz coordinate system, in similar fashion to other figures herein. For purposes of FIG. 37, we assume the z-axis corresponds to a normal vector of the working surface or structured surface of a substrate being cut by the end mill, and that such surface extends parallel to the x-y plane. However, in FIG. 37 we assume the actual plane of the working surface (see e.g. Σ in FIGS. 17A, 17B, and 23-27) lies above the x-y plane such that it intersects the z-axis at a point which we label as both Az and Cz. We also assume the plane of the working surface contains points A and C in FIG. 37. The point Az is the projection of point A onto the z-axis, and the point Cz (the same point as Az) is the projection of the point C onto the z-axis. A point Axy is the projection of the point A onto the x-y plane, and a point Cxy is the projection of the point C onto the x-y plane. Another point, B, is located on the path 3715 and lies beneath the plane of the working surface. The point B is in fact the deepest (within the substrate) of any point on the path 3715.

The path 3715 has two distinct segments or portions, one from point A to point B (or vice versa), and one from point B to point C (or vice versa). The point B is common to, or shared by, both segments. The A-B segment of the path 3715 lies in the x-z vertical plane, and is inclined relative to the x-y plane (and to the working surface of the substrate) at an angle α. The B-C segment of the path 3715 lies in a different vertical plane, and is inclined relative to the x-y plane (and to the working surface of the substrate) at an angle β. The vertical plane of the B-C segment contains the z-axis and point C, and it intersects the other vertical plane (the x-z plane) at an angle Φ (upper case phi). A secondary Cartesian coordinate system x'y'z' may be defined in which the z'-axis is identical to the primary z-axis, and such that the vertical plane of the B-C segment is the x'-z' plane of the secondary coordinate system. The x'-axis is shown in FIG. 37, but the y'-axis is not shown to avoid overly complicating the figure. The intersection angle Φ between non-parallel vertical planes can in general be selected as desired, but in many of the disclosed embodiments the intersection angle Φ is at least 10 degrees.

The path 3715 disregards and omits any motion of the cutting envelope of the rotating end mill that occurs above the surface of the substrate, and that therefore does not involve any cutting, such as the segments from S1 to A and from C to S2 in FIG. 17A. Rather, the path 3715 only includes segments that involve cutting of the substrate. When a cutting envelope, which has a tool half angle THA and truncated bottom as discussed above, moves along the inclined segment A-B of the path, it forms a first and second flat face. In fact, by the time the cutting envelope reaches the deepest point B, it has already formed a teardrop-shaped recess such as that shown in FIG. 21 above. If we then cause the cutting envelope to follow the other inclined segment from B to C, the cutting envelope enlarges the recess, and in doing so, forms third and fourth flat faces that are distinct from the first and second flat faces. (In general, a first end mill (and first cutting envelope) can be used for the segment A-B, and a second end mill (and second cutting envelope) can be used for the segment B-C, and the first and second end mills need not be, but in some cases can be, the same. Furthermore, such first and second end mills need not have, but in some cases can have, the same orientation in terms of polar angle θ and azimuthal angle ϕ (see FIG. 33) for each of the respective cutting paths. In some cases where the end mill cutting tool is tilted at a nonzero polar angle θ, the cutting envelope can be tilted in the same orientation relative to a fixed reference mark (or coordinate system) on the structured surface for both cutting path segments, and in that case the azimuthal angles ϕ for the different cutting paths will be different, since we assume the angles ϕ are measured relative to the vertical plane of each respective cutting path segment, rather than to a single fixed vertical plane.)

The third and fourth flat faces associated with the path segment B-C can have any desired configuration, and any degree of alignment, or misalignment, relative to the first and second flat faces associated with the path segment A-B. However, we have found that particularly useful structures, including cube corner elements, can be formed by configuring the third and fourth flat faces so that one of these faces is sufficiently aligned with one of the first and second faces such that the two aligned faces form a single compound face. Such an embodiment is shown in FIG. 38.

Figure 38:
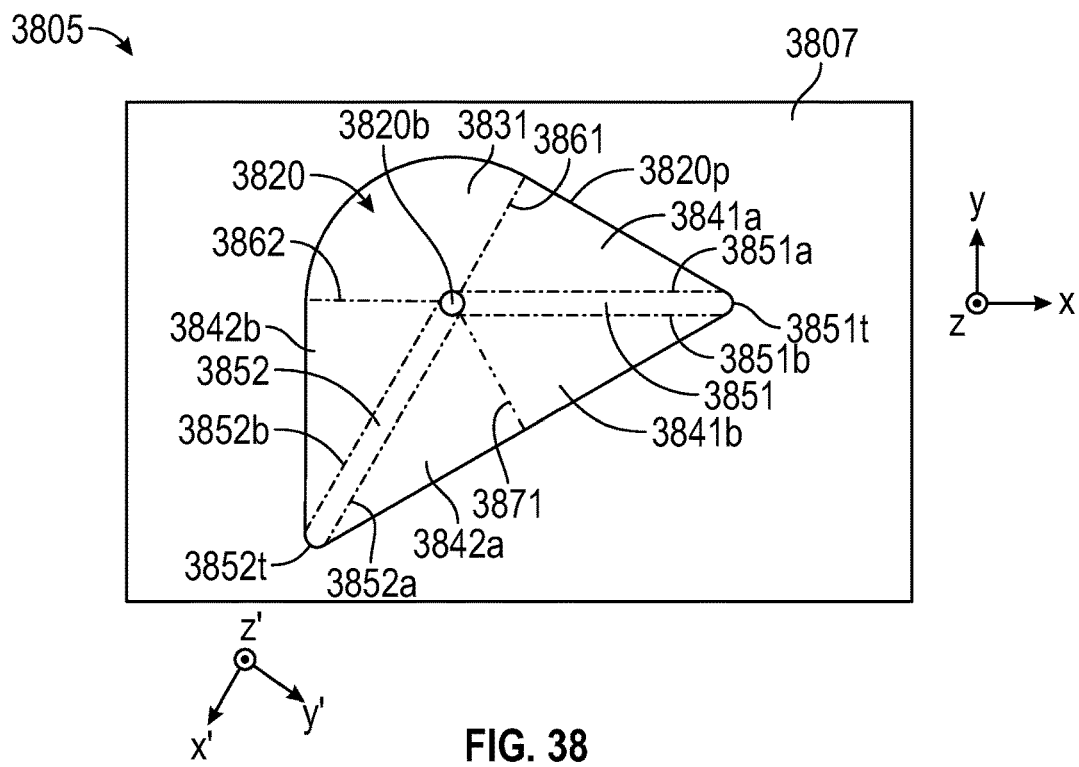
FIG. 38 is a schematic top view of a cavity that can be formed in a substrate using a path such as that of FIG. 37, the cavity including two faces that form a compound face.

FIG. 38 depicts a substrate 3805, which may be the same as or similar to substrates discussed above, having a working surface 3807 in which is formed a recess 3820, the recess being formed by a rotating end mill (or by two rotating end mills) as described above which moves along a path having two different inclined segments with a shared deepest endpoint, similar to the path 3715 of FIG. 37. (The reader is cautioned that the placement of the secondary (primed) coordinate axes relative to the primary (unprimed) coordinate axes is different in FIG. 38 than in FIG. 37; nevertheless, the recess of FIG. 38 is cut with a two-segment path very much like the path 3715 of FIG. 37, i.e., with two inclined paths or path portions that lie in different vertical planes.)

The recess 3820 has a perimeter 3820p and a base 3820b, the base corresponding to the deepest (and shared) point of the cutting path segments. The recess 3820 has a curved side surface 3831. The recess 3820 also has two flat faces 3841a, 3841b which come together or meet along a rounded edge 3851. The dihedral angle between these flat faces can be tailored as desired, but in the illustrated embodiment it is 90 degrees. The rounded edge 3851 extends along an axis that is inclined at an angle α relative to the x-y plane, see e.g. FIG. 37. In FIG. 38, α is assumed to be 35.264 degrees. At such an inclination angle, the faces 3841a, 3841b can be made to have a 90 degree dihedral angle if a cutting envelope is used in which THA=35.264 degrees, with a polar angle θ=0 and an azimuthal angle ϕ=0. The rounded edge 3851 has a terminus 3851t, and another terminus at the base 3820b.

The recess 3820 also has two other flat faces 3842a, 3842b which come together or meet along a second rounded edge 3852. The dihedral angle between these flat faces can be tailored as desired, but in the illustrated embodiment it is 90 degrees. The rounded edge 3852 extends along an axis that is inclined at an angle β relative to the x-y plane, see e.g. FIG. 37. In FIG. 38, β is assumed to be 35.264 degrees. At such an inclination angle, the faces 3842a, 3842b can be made to have a 90 degree dihedral angle if a cutting envelope is used in which THA=35.264 degrees, with a polar angle θ=0 and an azimuthal angle ϕ=0. The rounded edge 3852 has a terminus 3852t, and another terminus at the base 3820b. The base 3820b can also be considered a vertex, at least because it is located at the junction of the rounded edges 3851, 3852. Transition lines 3861, 3862 mark the boundaries between flat faces and the curved side surface 3831. Transition lines 3851*a*, 3851*b*, 3852*a*, 3852*b* mark the boundaries between the rounded edges and the flat faces. The curved side surface, flat faces, rounded edges, and transition lines have the same or similar characteristics and properties as corresponding features of cavities described in detail above.

By comparing the recess 3820 of FIG. 38 with the teardrop-shaped recess 1420 shown in FIG. 18, we can appreciate that the recess 3820 can be made in two steps, corresponding to the two inclined segments or portions of the cutting path such as are shown in FIG. 37. In a first step, the cutting envelope of the rotating end mill cuts into the substrate while moving along an inclined cutting path located in the x-z plane (see e.g. segment A-B in FIG. 37). At the end of this first step, a teardrop-shaped recess is formed similar to, or the same as, that of FIG. 18. In a second step, the same cutting envelope withdraws from the substrate not vertically, but along a second inclined cutting path that is located in a different vertical plane, see the x'-z' plane of FIG. 38. During the second step the cutting envelope enlarges the recess and forms two additional flat faces, resulting in the recess 3820 of FIG. 38. In an alternative embodiment, the first cutting envelope can be withdrawn from the teardrop-shaped cavity in such a way as to preserve the teardrop-shaped cavity, and then in an alternative second step, a different second cutting envelope (e.g. having a different THA) can be moved along the second inclined cutting path so as to form two alternative flat faces.

The two different inclined cutting paths or path segments lie in different vertical planes, namely: the x-z plane of FIG. 38, which is responsible for forming the rounded edge 3851 and the flat faces 3841*a* and 3841*b*; and the x'-z' plane of FIG. 38, which is responsible for forming the rounded edge 3852 and the flat faces 3842*a* and 3842*b*. These different vertical planes intersect at an angle Φ (not labeled in FIG. 38 but analogous to the angle Φ shown in FIG. 37). The maker of the recess may control the motion of the rotating end mill in any desired way, and may thus make the intersection angle Φ any desired value. In the embodiment of FIG. 38 we have selected an intersection angle Φ=120 degrees. Given our selected geometry for the faces 3842*a*, 3842*b*, this intersection angle ensures that the face 3842*a* is in substantial alignment with the face 3841*b*, such that these faces together form a compound face. By this we mean that the individual faces are so closely aligned, and so near each other, that the structure of which they are a part functions in a manner that is the same as or similar to that of a replacement structure, the replacement structure being otherwise identical to the first structure except that the two faces of the first structure are replaced by a single, unitary face. The two constituent faces of the compound face thus function substantially as a single face. In general, the constituent faces, having been formed in different machining steps, are distinguishable from each other, and they meet along a feature referred to herein as a break line. The break line in a given embodiment may be easily detected, if the constituent faces have a slight misalignment, or, where alignment is perfect or nearly perfect, the break line may be difficult to detect, e.g., detectable only with advanced inspection equipment such as an electron microscope. In the case of the recess 3820, the constituent faces 3842*a*, 3841*b* of the compound face meet along a break line 3871. The break line 3871 extends from the base 3820*b* to the perimeter 3820*p* of the recess 3820. In FIG. 38 and the other figures below, break lines are distinguished from transition lines by use of a different broken line pattern.

Figure 39:
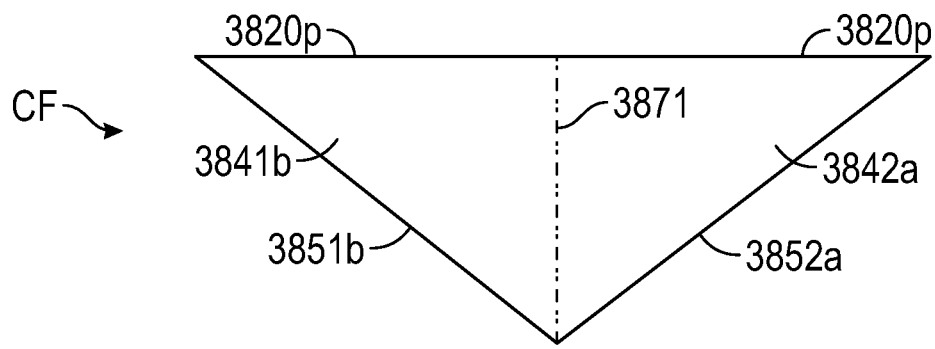
FIG. 39 is an isolated front view of the compound face of FIG. 38.

An isolated front view of the compound face of FIG. 38 is shown in FIG. 39. The compound face is labeled CF in FIG. 39. Other reference labels in FIG. 39 are the same as those of FIG. 38, requiring no further explanation.

Figure 40:
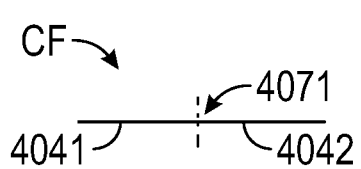
FIGS. 40-42 are side or edge views of different compound faces, illustrating different degrees of alignment between the constituent faces of the compound face, and the resulting different break lines between such constituent faces.
Figure 41:
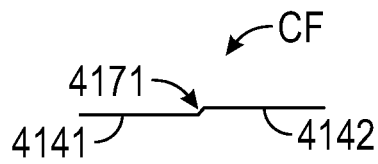
Figure 42:
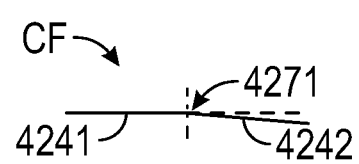

FIGS. 40-42 illustrate different degrees of alignment or misalignment that may be realized between the two constituent faces of a compound face. These figures are drawn in side or edge view, such that the flat faces appear as line segments. In FIG. 40, constituent faces 4041, 4042 of a compound face CF are in perfect or near perfect alignment, such that they come together or meet along a break line 4071 that is difficult to detect, e.g., detectable only with advanced inspection equipment. In FIG. 41, constituent faces 4141, 4142 of a compound face CF have a small translational misalignment, such that they come together or meet along a small step-like break line 4171, which is less difficult to detect than the break line 4071. In FIG. 42, constituent faces 4241, 4242 of a compound face CF have a small angular misalignment, such that they come together or meet along a subtle edge-like break line 4271, which is also less difficult to detect than the break line 4071.

Figure 43:
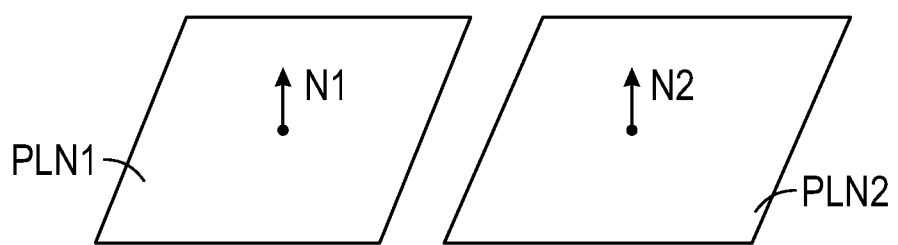
FIG. 43 is a schematic perspective view of two planes with respective surface normal vectors, the planes representing two constituent faces of a compound face.

Further in regard to the angular misalignment of FIG. 42, FIG. 43 schematically illustrates two planes PLN1, PLN2, which may represent the constituent faces of a compound face such as that of FIG. 42. The planes have respective normal vectors, N1 and N2, which are perpendicular to the respective plane. Angular misalignment as depicted schematically in FIG. 42 occurs when N1 and N2 deviate slightly from perfect parallelism. The angular deviation may occur along any direction or plane. In exemplary embodiments, precision machining techniques can be used to ensure the angular deviation is small, e.g., less than 10 degrees, or less than 5 degrees, or less than 1 degree.

Figure 44:
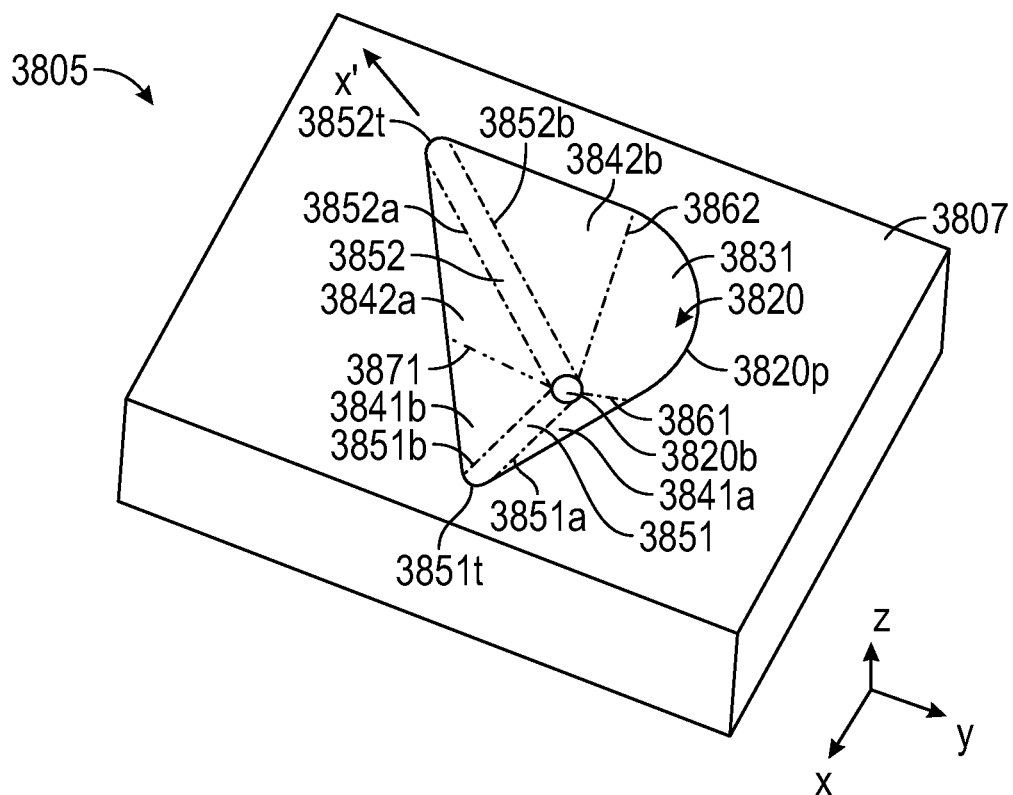
FIG. 44 is a perspective view of the substrate and recess of FIG. 38.

A perspective view of the substrate 3805 and recess 3820 of FIG. 38 is shown in FIG. 44. Like reference numbers designate like elements, with no further explanation being necessary.

Figure 45:
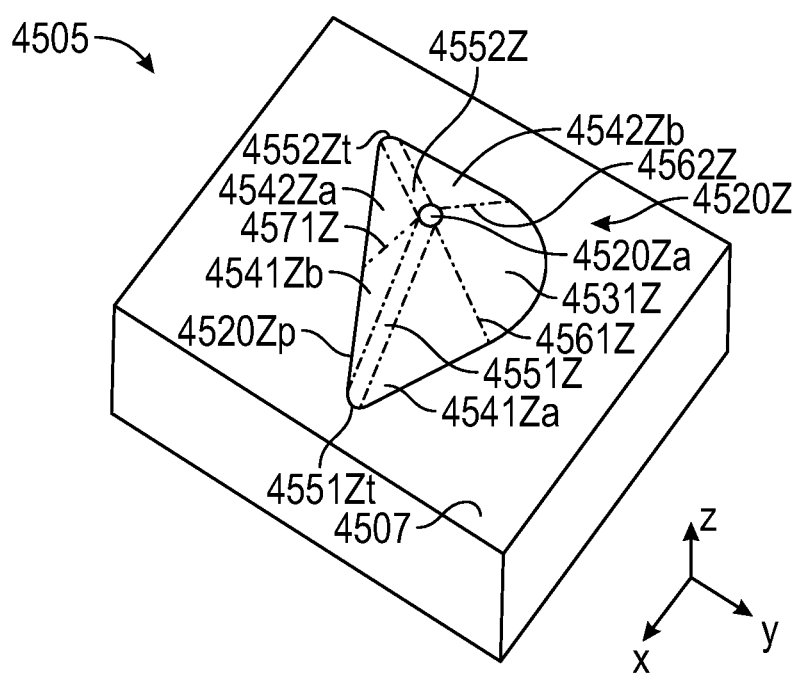
FIG. 45 is a perspective view of a substrate whose structured surface is a negative replica of that of FIG. 44, thus providing a structure that is a protrusion rather than a cavity.

In FIG. 45, a substrate 4505 is shown that has a structured surface 4507 which is a negative replica of the working surface (structured surface) 3807 of the substrate 3805 of FIGS. 38 and 44. The substrate 4505 may thus be made by replication from the substrate 3805. The structured surface 4507 therefore comprises a protrusion 4520Z, which juts out of the structured surface 4507, in place of the recess 3820 of substrate 3805. We introduce a Cartesian coordinate system in FIG. 45 such that the x-y plane corresponds to the plane along which the structured surface 4507 generally extends, the z-axis represents a normal vector of the surface 4507, and the x-axis is oriented so that a rounded edge 4551Z, which corresponds inversely to a rounded edge of the recess 3820, lies in the x-z plane.

Features of the protrusion 4520Z have a one-to-one (and inverted) relationship with corresponding features of the recess 3820. The reader will appreciate that aspects and characteristics disclosed in connection with the recess 3820 apply in corresponding fashion to the protrusion 4520Z. With that understanding, and wishing to avoid unnecessary repetition, we now briefly summarize the following features associated with the protrusion 4520Z: peak or apex 4520Z*a*; curved side surface 4531Z; flat faces 4541Z*a*, 4541Z*b*, 4542Z*a*, and 4542Z*b*; break line 4571Z between the constituent flat faces 4541Z*b* and 4542Z*a* of the compound face; transition lines 4561Z, 4562Z; rounded edges 4551Z, and 4552Z; terminus 4551Z*t* of one rounded edge and terminus 4552Z*t* of the other rounded edge; and a periphery or perimeter 4520Zp. (Transition lines that mark the boundaries between the rounded edges and the adjacent flat surfaces are shown in the figure but not labeled.)

The peak or apex 4520Za of the protrusion 4520Z has a small, flat, and round shape, and it lies in a plane parallel to the x-y plane. The apex 4520Za can be considered a vertex of the protrusion, at least because it is located at the junction of the rounded edges 4551Z, 4552Z.

The curved side surface 4531Z of the protrusion 4520Z has a conical shape.

The flat faces 4541Za and 4541Zb come together or meet along a rounded edge 4551Z. The dihedral angle between the faces 4541Za, 4541Zb (which we may refer to as 180-2*Ω1) can be measured in any cross-sectional plane that is perpendicular to both faces, and therefore also perpendicular to the edge 4551Z. The faces 4541Za, 4541Zb can be made to have any desired dihedral angle 180-2*Ω1, within practical limits. In cases involving cube corner elements, the dihedral angle 180-2*Ω1 between the faces equals 90 degrees. The faces 4541Za, 4541Zb can be said to define respective reference planes that intersect along a line that is inclined relative to the structured surface 4507, such line being inclined at an angle α.

The flat faces 4542Za and 4542Zb come together or meet along a rounded edge 4552Z. The dihedral angle between the faces 4542Za, 4542Zb (which we may refer to as 180-2*Ω2) can be measured in any cross-sectional plane that is perpendicular to both faces, and therefore also perpendicular to the edge 4552Z. The faces 4542Za, 4542Zb can be made to have any desired dihedral angle 180-2*Ω2, within practical limits. In cases involving cube corner elements, the dihedral angle 180-2*Ω2 between the faces equals 90 degrees. The faces 4542Za, 4542Zb can be said to define respective reference planes that intersect along a line that is inclined relative to the structured surface 4507, such line being inclined at an angle β.

Transition lines 4561Z, 4562Z are not physical edges, but are provided in the figure to show where the transitions from the curved side surface 4531Z to the flat faces 4541Za, 4542Zb occur.

The rounded edge 4551Z is located at the place where faces 4541Za, 4541Zb come together. The rounded edge 4551Z extends along an axis that is inclined at the angle α relative to the x-y plane. The rounded edge 4551Z is not rounded or curved in an arbitrary fashion, but in a particular manner as described above in connection with FIGS. 21 and 22. Thus, a cross-section of the rounded edge 4551Z in a plane parallel to the x-y plane is a circular arc, i.e., it exhibits a curvature of constant radius in that plane. In other cross-sectional planes, including a plane perpendicular to both faces 4541Za, 4541Zb, the shape of the rounded edge 4551Z is elliptical, thus having a variable curvature rather than a constant curvature. The radius of curvature of the rounded edge 4551 is generally at least 10 micrometers. The rounded edge 4551Z is also an artifact of a rotating end mill.

Similarly, the rounded edge 4552Z is located at the place where faces 4542Za, 4542Zb come together. The rounded edge 4552Z extends along an axis that is inclined at the angle β relative to the x-y plane. The rounded edge 4552Z is not rounded or curved in an arbitrary fashion, but in a particular manner as described above in connection with FIGS. 21 and 22. Thus, a cross-section of the rounded edge 4552Z in a plane parallel to the x-y plane is a circular arc, i.e., it exhibits a curvature of constant radius in that plane. In other cross-sectional planes, including a plane perpendicular to both faces 4542Za, 4542Zb, the shape of the rounded edge 4552Z is elliptical, thus having a variable curvature rather than a constant curvature. The radius of curvature of the rounded edge 4552 is generally at least 10 micrometers. The rounded edge 4552Z is also an artifact of a rotating end mill.

The terminus 4551Zt is one of two ends of the rounded edge 4551Z. The other end or terminus of the rounded edge 4551Z is disposed at the apex 4520Za. Similarly, the terminus 4552Zt is one of two ends of the rounded edge 4552Z, the other end being disposed at the apex 4520Za. Both the terminus 4551Zt and the terminus 4552Zt form part of the larger periphery or perimeter 4520Zp of the protrusion 4520Z. The perimeter 4520Zp includes straight portions at the lower edges of the faces 4541Za, 4541Zb, 4542Za, 4542Zb, and a curved portion (circular arc of large radius of curvature) at the lower edge of the curved surface 4531Z, and other curved portions (circular arcs of small radius of curvature) corresponding to the terminus 4551Zt and the terminus 4552Zt.

The recess 3820 and protrusion 4520Z both bear characteristic marks of being made, directly or indirectly, by an end milling method. Each of these structures may be useful—whether individually or as one member of an array or group of identical or different recesses or protrusions—when incorporated into the structured surfaces of films, sheeting, or other articles in optical, mechanical, or other applications.

Figure 46:
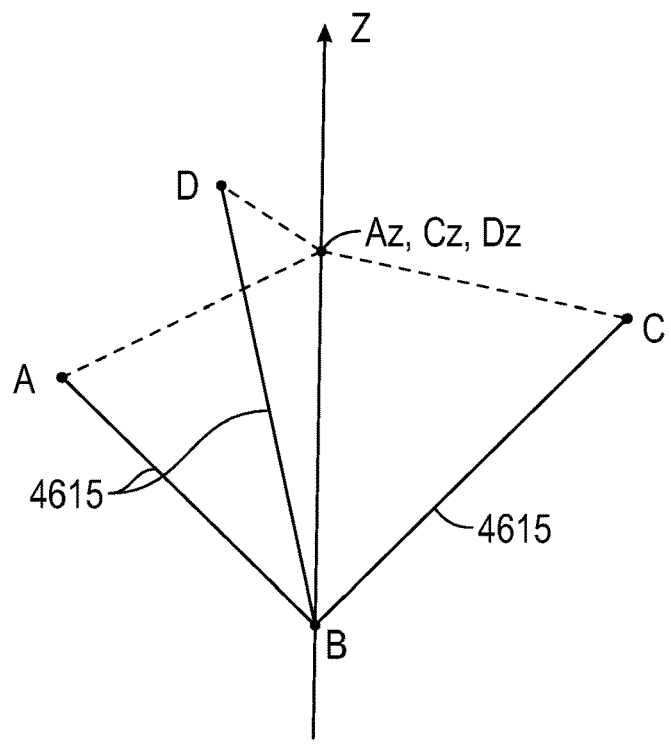
FIG. 46 is a schematic view of a path for a rotating end mill that includes three segments that lie in different vertical planes, such a path being useful for making still other types of recesses, including cube corner recesses.

FIG. 46 illustrates a path 4615 for a rotating end mill that is similar in most respects to the path of FIG. 37, except that the path of FIG. 46 is not limited to only two different vertical planes. Instead, the path 4615 includes three segments, each of which lies in its own, different, vertical plane. The path 4615 may be considered in the context of one or more Cartesian coordinate systems, in similar fashion to other figures herein. However, for simplicity and ease of illustration, only one z-axis is included in the figure. We assume the z-axis corresponds to a normal vector of the working surface or structured surface of a substrate being cut by the end mill, and that such surface extends parallel to an x-y plane. The actual plane of the working surface (see e.g. Σ in FIGS. 17A, 17B, and 23-27) is assumed to intersect the z-axis at a point which we label alternatively as Az, Cz, or Dz. We also assume the plane of the working surface contains points A, C, and D in FIG. 46. The point Az, Cz, Dz is the projection of point A onto the z-axis, and also the projection of the point C onto the z-axis, and also the projection of the point D onto the z-axis. Another point, B, is located on the path 4615 and lies beneath the plane of the working surface. The point B is in fact the deepest (within the substrate) of any point on the path 4615.

The path 4615 has three distinct segments or portions, one from point A to point B (or vice versa), one from point B to point C (or vice versa), and one from point B to point D (or vice versa). The point B is common to, or shared by, all three segments. The A-B segment of the path 4615 lies in a first vertical plane, and is inclined relative to the working surface of the substrate at an angle α (alpha, not shown in FIG. 46). The first vertical plane contains the point A and the z-axis. A primary xyz coordinate system may be defined in which the z-axis is as shown in FIG. 46, and the x-axis is oriented so that the x-z plane is the first vertical plane.

The B-C segment of the path 4615 lies in a different second vertical plane, and is inclined relative to the working surface of the substrate at an angle β (beta, not shown in FIG. 46). The second vertical plane contains the point C and the z-axis. A secondary x'y'z' coordinate system may be defined in which the z'-axis is the same as the z-axis, and the x'-axis is oriented so that the x'-z' plane is the second vertical plane.

The B-D segment of the path 4615 lies in a different third vertical plane, and is inclined relative to the working surface of the substrate at an angle γ (gamma, not shown in FIG. 46). The third vertical plane contains the point D and the z-axis. A tertiary x"y"z" coordinate system may be defined in which the z"-axis is the same as the z-axis, and the x"-axis is oriented so that the x"-z" plane is the third vertical plane.

The first and second vertical planes intersect at an angle Φ1 (not shown in FIG. 46). The second and third vertical planes intersect at an angle Φ2 (also not shown in FIG. 46). The first and third vertical planes intersect at an angle Φ3 (also not shown in FIG. 46). The intersection angles Φ1, Φ2, Φ3 can in general be selected as desired, but in many of the disclosed embodiments the intersection angle Φ is at least 10 degrees. In some cases, all three angles Φ1, Φ2, Φ3 are the same, while in other cases only two of the three angles are the same, while in still other cases all of the three angles are different from each other.

The path 4615 disregards and omits any motion of the cutting envelope of the rotating end mill that occurs above the surface of the substrate. Rather, the path 4615 only includes segments that involve cutting of the substrate. When a cutting envelope, which has a tool half angle THA and truncated bottom as discussed above, moves along the inclined segment A-B of the path, it forms a first and second flat face. In fact, by the time the cutting envelope reaches the deepest point B, it has already formed a teardrop-shaped recess such as that shown in FIG. 21 above. If we then cause the cutting envelope to follow the inclined segment from B to C, the cutting envelope enlarges the recess, and in doing so, forms third and fourth flat faces that are distinct from the first and second flat faces, such as to provide a cavity like that of FIG. 38 above. We may then further enlarge the substrate by causing the cutting envelope to follow the remaining segment B-D, and in doing so, the cutting envelope forms fifth and sixth flat faces that are distinct from the first through fourth faces. (In general, a first end mill (and first cutting envelope) can be used for the segment A-B, and a second end mill (and second cutting envelope) can be used for the segment B-C, and a third end mill (and third cutting envelope) can be used for the segment B-D, and the first, second and third end mills need not be, but in some cases can be, the same. Furthermore, such first, second, and third end mills need not have, but in some cases can have, the same orientation in terms of polar angle θ and azimuthal angle φ for each of the respective cutting paths. In some cases where the end mill cutting tool is tilted at a nonzero polar angle θ, the cutting envelope can be tilted in the same orientation relative to a fixed reference mark (or coordinate system) on the structured surface for all three cutting path segments, and in that case the azimuthal angles φ for the different cutting paths will be different, since we assume the angles φ are measured relative to the vertical plane of each respective cutting path segment, rather than to a single fixed vertical plane.)

The third and fourth flat faces associated with the path segment B-C can have any desired configuration, and any degree of alignment, or misalignment, relative to the first and second flat faces associated with the path segment A-B, and furthermore, the fifth and sixth flat faces associated with the path segment B-D can have any desired configuration, and any degree of alignment or misalignment, relative to any of the first through fourth flat faces. However, we have found that particularly useful structures, including cube corner elements, can be formed by configuring the faces such that two of the faces (e.g. the second face and the third face) form a nominally flat first compound face, and two other faces (e.g. the fourth face and the fifth face) form a nominally flat second compound face, and the remaining two faces (e.g. the first face and the sixth face) form a nominally flat third compound face. Such an embodiment is shown in FIG. 47.

Figure 47:
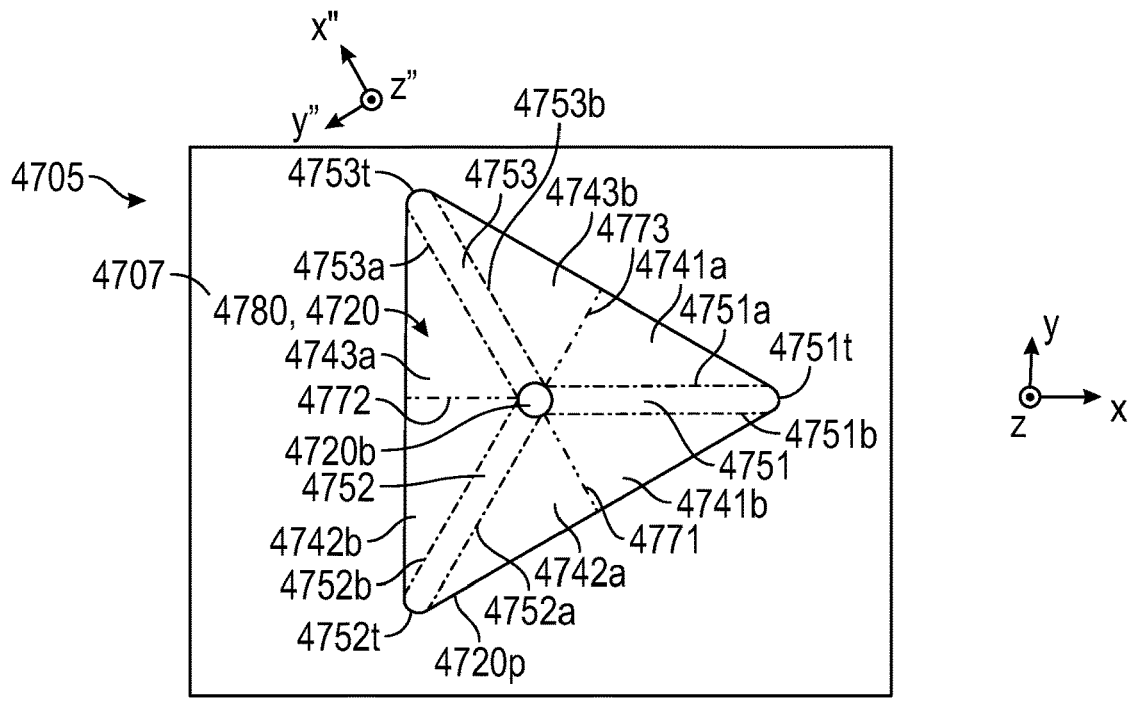
FIG. 47 is a schematic top view of a cavity that can be formed in a substrate using a path such as that of FIG. 46, the cavity including three pairs of faces that form three compound face, the cavity being configured as a truncated cube corner cavity.

FIG. 47 depicts a substrate 4705, which may be the same as or similar to substrates discussed above, having a working surface 4707 in which is formed a recess 4720, the recess being formed by a rotating end mill (or by two or three different rotating end mills) as described above which moves along a path having three different inclined segments with a shared deepest endpoint, similar to the path 4615 of FIG. 46. (The reader is cautioned that the schematic depiction of FIG. 46 may not correspond exactly to features of the recess 4720 in FIG. 47; nevertheless, the recess of FIG. 47 is cut with a three-segment path very much like the path 4615 of FIG. 46, i.e., with three inclined paths or path portions that lie in different vertical planes.)

The recess 4720 has a perimeter 4720p and a base 4720b, the base corresponding to the deepest (and shared) point of the cutting path segments. The recess 4720 has two flat faces 4741a, 4741b which come together or meet along a rounded edge 4751. The dihedral angle between these flat faces can be tailored as desired, but in the illustrated embodiment it is 90 degrees. The rounded edge 4751 extends along an axis that is inclined at an angle α relative to the x-y plane. In FIG. 47, α is assumed to be 35.264 degrees. At such an inclination angle, the faces 4741a, 4741b can be made to have a 90 degree dihedral angle if a cutting envelope is used in which THA=35.264 degrees, with a polar angle θ=0 and an azimuthal angle φ=0. The rounded edge 4751 has a terminus 4751t, and another terminus at the base 4720b.

The recess 4720 also has two other flat faces 4742a, 4742b which come together or meet along a second rounded edge 4752. The dihedral angle between these flat faces can be tailored as desired, but in the illustrated embodiment it is 90 degrees. The rounded edge 4752 extends along an axis that is inclined at an angle β relative to the x-y plane. In FIG. 47, β is assumed to be 35.264 degrees. At such an inclination angle, the faces 4742a, 4742b can be made to have a 90 degree dihedral angle if a cutting envelope is used in which THA=35.264 degrees, with a polar angle θ=0 and an azimuthal angle φ=0. The rounded edge 4752 has a terminus 4752t, and another terminus at the base 4720b.

The recess 4720 also has two other flat faces 4743a, 4743b which come together or meet along a second rounded edge 4753. The dihedral angle between these flat faces can be tailored as desired, but in the illustrated embodiment it is 90 degrees. The rounded edge 4753 extends along an axis that is inclined at an angle γ relative to the x-y plane. In FIG. 47, γ is assumed to be 35.264 degrees. At such an inclination angle, the faces 4743a, 4743b can be made to have a 90 degree dihedral angle if a cutting envelope is used in which THA=35.264 degrees, with a polar angle θ=0 and an azimuthal angle φ=0. The rounded edge 4753 has a terminus 4753t, and another terminus at the base 4720b. The base 4720 can also be considered a vertex, at least because it is located at the junction of the rounded edges 4751, 4752, 4753. Transition lines 4751a, 4751b, 4752a, 4752b, 4753a, 4753b mark the boundaries between the rounded edges and the flat faces. The flat faces, rounded edges, and transition lines have the same or similar characteristics and properties as corresponding features of cavities described in detail above.

By comparing the recess 4720 of FIG. 47 with the teardrop-shaped recess 1420 shown in FIG. 18, we can appreciate that the recess 4720 can be made in three steps, corresponding to three inclined segments or portions of the cutting path such as are shown in FIG. 46. In a first step, the cutting envelope of the rotating end mill cuts into the substrate while moving along an inclined cutting path located in the x-z plane (see e.g. segment A-B in FIG. 46). At the end of this first step, a teardrop-shaped recess is formed similar to, or the same as, that of FIG. 18. In a second step, the same cutting envelope withdraws from the substrate not vertically, but along a second inclined cutting path that is located in a different vertical plane, see e.g. the segment B-C in FIG. 46. During the second step, the cutting envelope enlarges the recess and forms two additional flat faces, resulting in an enlarged recess that may be the same as or similar to the recess 3820 of FIG. 38. In a third step, the same cutting envelope may cut through some remaining portions of the substrate by moving the cutting envelope along a third inclined cutting path located in still another vertical plane, see e.g. the segment B-D in FIG. 46. During the third step the cutting envelope further enlarges the recess, and forms two additional flat faces, resulting in a further enlarged recess such as the one shown in FIG. 47. In an alternative embodiment, the first cutting envelope can be withdrawn from the teardrop-shaped cavity in such a way as to preserve the teardrop-shaped cavity, and then in an alternative second step, a different second cutting envelope (e.g. having a different THA) can be moved along the second inclined cutting path so as to form two more (third and fourth) flat faces, and in an alternative third step, a different third cutting envelope (e.g. having still another THA) can be moved along the third inclined cutting path so as to form the two final (fifth and sixth) flat faces.

The three different inclined cutting paths or path segments lie in different vertical planes, namely: the x-z plane of FIG. 47, which is responsible for forming the rounded edge 4751 and the flat faces 4741*a* and 4741*b*; the x'-z' plane of FIG. 47, which is responsible for forming the rounded edge 4752 and the flat faces 4742*a* and 4742*b*; and the x"-z" plane of FIG. 47, which is responsible for forming the rounded edge 4753 and the flat faces 4743*a* and 4743*b*. The x-z plane intersects the x'-z' plane at an angle $\Phi 1$, the x'-z' plane intersects the x"-z" plane at an angle $\Phi 2$, and the x"-z" plane intersects the x-z plane at an angle $\Phi 3$ (these angles not labeled in FIG. 47). The maker of the recess may control the motion of the rotating end mill in any desired way, and may thus make the intersection angles $\Phi 1$, $\Phi 2$, $\Phi 3$ any desired values, with the constraint that $\Phi 1+\Phi 2+\Phi 3=360$ degrees. In the embodiment of FIG. 47 we have selected $\Phi 1=\Phi 2=\Phi 3=120$ degrees. Given our selected geometries for the various flat faces 4741*a*, 4741*b*, 4742*a*, 4742*b*, 4743*a*, 4743*b*, these intersection angles ensure that: the face 4742*a* is in substantial alignment with the face 4741*b* to form a first compound face; the face 4742*b* is in substantial alignment with the face 4743*a* to form a second compound face; and the face 4743*b* is in substantial alignment with the face 4741*a* to form a third compound face, where each of these compound faces is similar to or the same as the compound face described above in connection with FIGS. 39-43. The constituent faces 4742*a* and 4741*b* of the first compound face meet along a first break line 4771, the faces 4742*b* and 4743*a* of the second compound face meet along a second break line 4772, and the faces 4743*b* and 4741*a* of the third compound face meet along a third break line 4773. Each of the break lines 4771, 4772, and 4773 extends from the base 4720*b* to the perimeter 4720*p* of the recess 4720.

Figure 48:
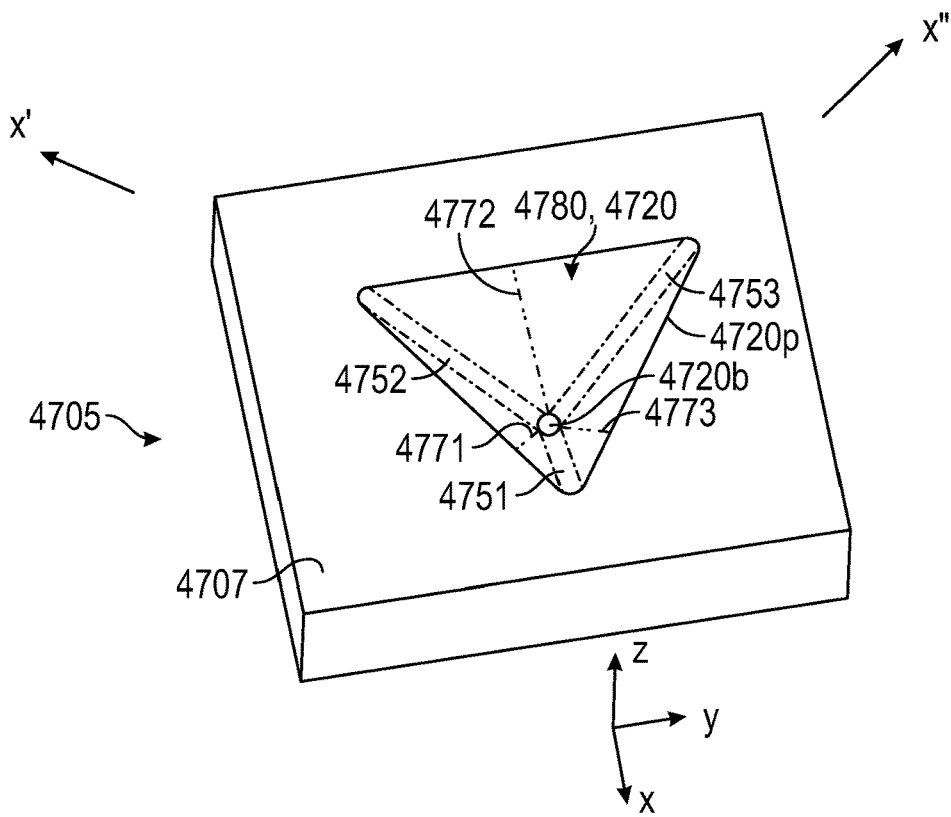
FIG. 48 is a perspective view of the substrate and recess of FIG. 47.

A perspective view of the substrate and recess of FIG. 47 is provided in FIG. 48, where like reference numbers designate like elements, and no further explanation being necessary.

The reader who is familiar with cube corner literature will immediately recognize that the recess 4720 is substantially similar in appearance to an uncanted, truncated cube corner element. And since in the embodiment of FIGS. 47-48 we have designed the various pairs of flat faces to intersect each other at 90 degree dihedral angles, the first, second, and third compound faces are mutually perpendicular, and the recess 4720 is therefore also a cube corner element 4780. The first, second, and third compound faces are the optical faces of the cube corner element 4780. The rounded edges 4751, 4752, 4753 are the dihedral edges of the cube corner element, and the non-dihedral edges are the three sides of the triangular-shaped perimeter 4720*p*, which constitutes the base triangle of the cube corner element 4780. Note that the interior angles of the base triangle are all 60 degrees, in accordance with an uncanted cube corner element.

We have thus demonstrated a technique for forming a cube corner element in a substrate using nothing more than a rotating end mill having a conical cutting envelope. Moreover, all flat faces (both the constituent faces and the compound faces) of the cube corner element can be made with a single end mill cutting tool, and with cutting steps in which the rotational axis of the end mill is at all times perpendicular to the working surface of the substrate. Of course, these statements should not be interpreted in an unduly restrictive manner, since other embodiments disclosed herein may have only some, or only one flat face of the cube corner element being made with a rotating end mill, and some embodiments may have one or some flat faces formed with a first rotating end mill (having a first cutting envelope), and another or other flat faces formed with a different second rotating end mill (having a different second cutting envelope), and so forth, and some embodiments can use rotating end mills in which the axis of rotation is tilted relative to the working surface of the substrate.

The fact that the dihedral edges of the cube corner element 4780 are rounded rather than sharp, and that the vertex or base 4720*b* is truncated rather than pointed, will have ramifications on the optical performance of the cube corner element. In particular, these deviations from sharpness will reduce the total light return of the cube corner element 4780 compared to another cube corner element that is the same except for the deviations from sharpness. However, the reduction in total light return can be managed by keeping the dimension Dbot (see FIG. 5C), and the associated radius of curvature of the rounded edges, as small as possible relative to the other dimensions of the cube corner element. Furthermore, as shown further below, the same end milling techniques used to make the cube corner element 4780 can be used to make alternative cube corner elements, including PG cube corner elements, in which the rounded edges occur at the non-dihedral edges, rather than at the dihedral edges, of the cube corner element.

The reader will appreciate that the cube corner element 4780 can be made in any desired size (e.g. as measured by the depth of the base 4720*b*, or by a lateral dimension such as a diameter of the perimeter 4720*p*), limited only by the size or thickness of the substrate, and the size of available end mill cutting tools. The reader will also appreciate that numerous cube corner elements, whether of the same size or different sizes, can easily be made in the same working surface or substrate, simply by executing additional cutting operations with the rotating end mill. Furthermore, any one, or some, or all of the additional cube corner elements formed in the same substrate may have the same orientation as cube corner element 4780 relative to the xyz coordinate system of FIGS. 47-48, or they may be oriented differently, e.g. as associated with any arbitrary amount of rotation about the z-axis in FIGS. 47-48. Stated differently, the disclosed techniques give the designer the freedom to form additional cube corner elements that are adjacent to the cube corner element 4780, but at different orientations (e.g. by selecting vertical planes that are different from the set of vertical planes used to make the element 4780), such that none of the optical faces (compound faces) of the cube corner element 4780 are coplanar (not even nominally coplanar) with any of the optical faces of its adjacent or neighboring cube corner element(s). Furthermore, it will be apparent from the teachings herein that one, some, or all of the recesses or structures need not have triangular base perimeters, and need not be cube corner elements. The base of a given structure may for example have a square, hexagonal, or pentagonal shape, or a more complex shape such as a star shape.

The reader will also appreciate that by changing one or some of the cutting parameters, e.g., by changing the THA of the cutting envelope, or by changing the inclination angle of the cutting path segments, the same technique that is used to make the cube corner element 4780 can be used to make other prismatic structures that are not cube corner elements but that may resemble cube corner elements, insofar as they may comprise a triangular base perimeter and three triangular compound faces, but whose compound faces deviate greatly from being mutually perpendicular. Such alternative prismatic structures may be useful in light management films other than cube corner sheeting, or in mechanical applications such as abrasive or non-stick films, for example.

Figure 49:
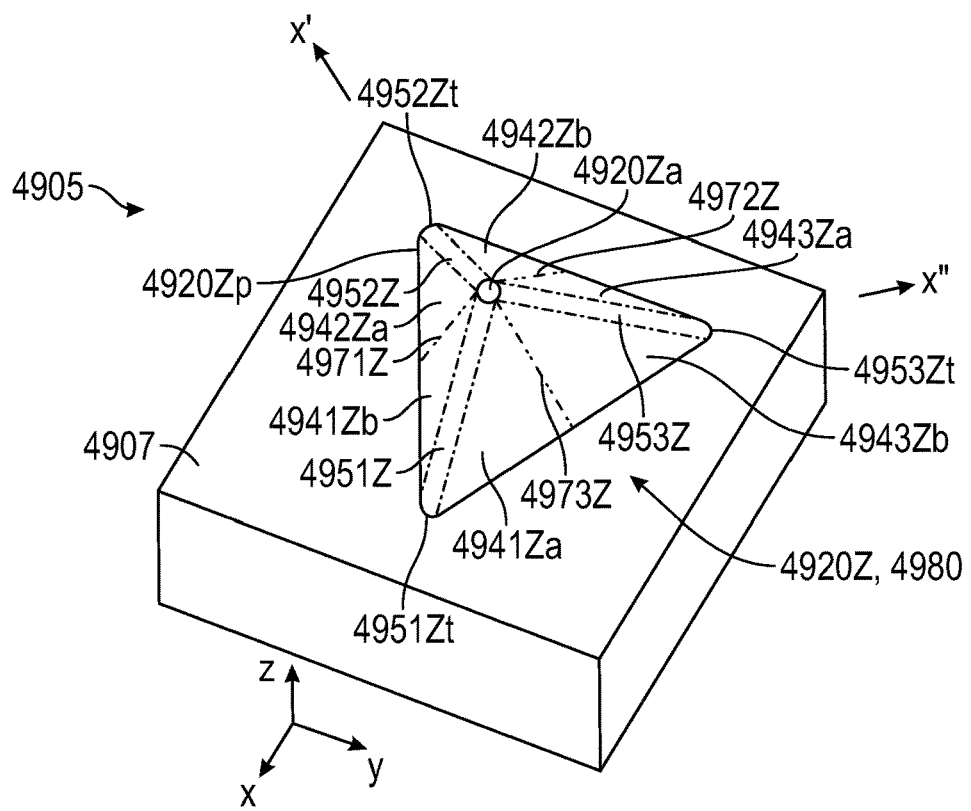
FIG. 49 is a perspective view of a substrate whose structured surface is a negative replica of that of FIG. 48, thus providing a structure that is a protrusion rather than a cavity.

A perspective view of a substrate 4905 whose structured surface 4907 is a negative replica of that of FIG. 48 is shown in FIG. 49. The substrate 4905 may thus be made by replication from the substrate 4705. The structured surface 4907 therefore comprises a protrusion 4920Z, which juts out of the structured surface 4907, in place of the recess 4720 of substrate 4705. Since the recess 4720 is a cube corner element (cavity) 4780, the protrusion 4920Z is also a cube corner element (protrusion) 4980.

We introduce a Cartesian coordinate system in FIG. 49 such that the x-y plane corresponds to the plane along which the structured surface 4907 generally extends, the z-axis represents a normal vector of the surface 4907, and the x-axis is oriented so that a rounded edge 4951Z, which corresponds inversely to a rounded edge of the recess 4720, lies in the x-z plane.

Features of the protrusion 4920Z have a one-to-one (and inverted) relationship with corresponding features of the recess 4720. The reader will appreciate that aspects and characteristics disclosed in connection with the recess 4720 apply in corresponding fashion to the protrusion 4920Z. With that understanding, and wishing to avoid unnecessary repetition, we now briefly summarize the following features associated with the protrusion 4920Z: peak or apex 4920Za; flat faces 4941Zb and 4942Za (which form a first compound face), 4942Zb and 4943Za (which form a second compound face), and 4943Zb and 4941Za (which form a third compound face); break lines 4971Z, 4972Z, and 4973Z between the constituent flat faces of the three compound faces; rounded edges 4951Z, 4952Z, and 4953Z; terminuses 4951Zt, 4952Zt, and 4953Zt of the respective rounded edges; and a periphery or perimeter 4920Zp. Transition lines that mark the boundaries between the rounded edges and the adjacent flat surfaces are shown in the figure but not labeled.

The peak or apex 4920Za of the protrusion 4920Z has a small, flat, and round shape, and it lies in a plane parallel to the x-y plane. The apex 4920Za can be considered a vertex of the protrusion, at least because it is located at the junction of the rounded edges 4951Z, 4952Z, 4953Z.

The flat faces 4941Za and 4941Zb come together or meet along a rounded edge 4951Z. The dihedral angle between the faces 4941Za, 4941Zb (which we may refer to as 180-2*Ω1) can be measured in any cross-sectional plane that is perpendicular to both faces. The faces 4941Za, 4941Zb can be made to have any desired dihedral angle 180-2*Ω1, but in the depicted embodiment in which the protrusion 4920z is a cube corner element, the dihedral angle equals 90 degrees. The faces 4941Za, 4941Zb can be said to define respective reference planes that intersect along a line that is inclined relative to the structured surface 4907, such line being inclined at an angle α.

The flat faces 4942Za and 4942Zb come together or meet along a rounded edge 4952Z. The dihedral angle between the faces 4942Za, 4942Zb (which we may refer to as 180-2*Ω2) can be measured in any cross-sectional plane that is perpendicular to both faces. The faces 4942Za, 4942Zb can be made to have any desired dihedral angle 180-2*Ω2, but in the depicted embodiment in which the protrusion 4920z is a cube corner element, the dihedral angle equals 90 degrees. The faces 4942Za, 4942Zb can be said to define respective reference planes that intersect along a line that is inclined relative to the structured surface 4907, such line being inclined at an angle β.

The flat faces 4943Za and 4943Zb come together or meet along a rounded edge 4953Z. The dihedral angle between the faces 4943Za, 4943Zb (which we may refer to as 180-2*Ω3) can be measured in any cross-sectional plane that is perpendicular to both faces. The faces 4943Za, 4943Zb can be made to have any desired dihedral angle 180-2*Ω3, but in the depicted embodiment in which the protrusion 4920z is a cube corner element, the dihedral angle equals 90 degrees. The faces 4943Za, 4943Zb can be said to define respective reference planes that intersect along a line that is inclined relative to the structured surface 4907, such line being inclined at an angle γ.

The rounded edge 4951Z is located at the place where faces 4941Za, 4941Zb come together. The rounded edge 4951Z extends along an axis that is inclined at the angle α relative to the x-y plane. The rounded edge 4951Z is not rounded or curved in an arbitrary fashion, but in a particular manner as described above in connection with FIGS. 21 and 22. The radius of curvature of the rounded edge 4951 is generally at least 10 micrometers. The rounded edge 4951Z is also an artifact of a rotating end mill.

Similarly, the rounded edge 4952Z is located at the place where faces 4942Za, 4942Zb come together. The rounded edge 4952Z extends along an axis that is inclined at the angle β relative to the x-y plane. The rounded edge 4952Z is not rounded or curved in an arbitrary fashion, but in a particular manner as described above in connection with FIGS. 21 and 22. The radius of curvature of the rounded edge 4952 is generally at least 10 micrometers. The rounded edge 4952Z is also an artifact of a rotating end mill.

Similarly, the rounded edge 4953Z is located at the place where faces 4943Za, 4943Zb come together. The rounded edge 4953Z extends along an axis that is inclined at the angle γ relative to the x-y plane. The rounded edge 4953Z is not rounded or curved in an arbitrary fashion, but in a particular manner as described above in connection with FIGS. 21 and 22. The radius of curvature of the rounded edge 4953 is generally at least 2 micrometers. The rounded edge 4953Z is also an artifact of a rotating end mill.

The terminus 4951Zt is one of two ends of the rounded edge 4951Z, the other end being disposed at the apex 4920Za. The terminus 4952Zt is similarly one of two ends of the rounded edge 4952Z, the other end being disposed at the apex 4920Za. The terminus 4953Zt is one of two ends of the rounded edge 4953Z, the other end being disposed at the apex 4920Za. All three terminuses 4951Zt, 4952Zt, and 4953Zt form part of the larger periphery or perimeter 4920Zp of the protrusion 4920Z. The perimeter 4920Zp includes straight portions at the lower edges of the compound faces, and curved portions (circular arcs of small radius of curvature) at the terminuses of the rounded edges.

The recess 4720 and protrusion 4920Z both bear characteristic marks of being made, directly or indirectly, by an end milling method. Each of these structures may be useful—whether individually or as one member of an array or group of identical or different recesses or protrusions—when incorporated into the structured surfaces of films, sheeting, or other articles in optical, mechanical, or other applications.

Figure 50:
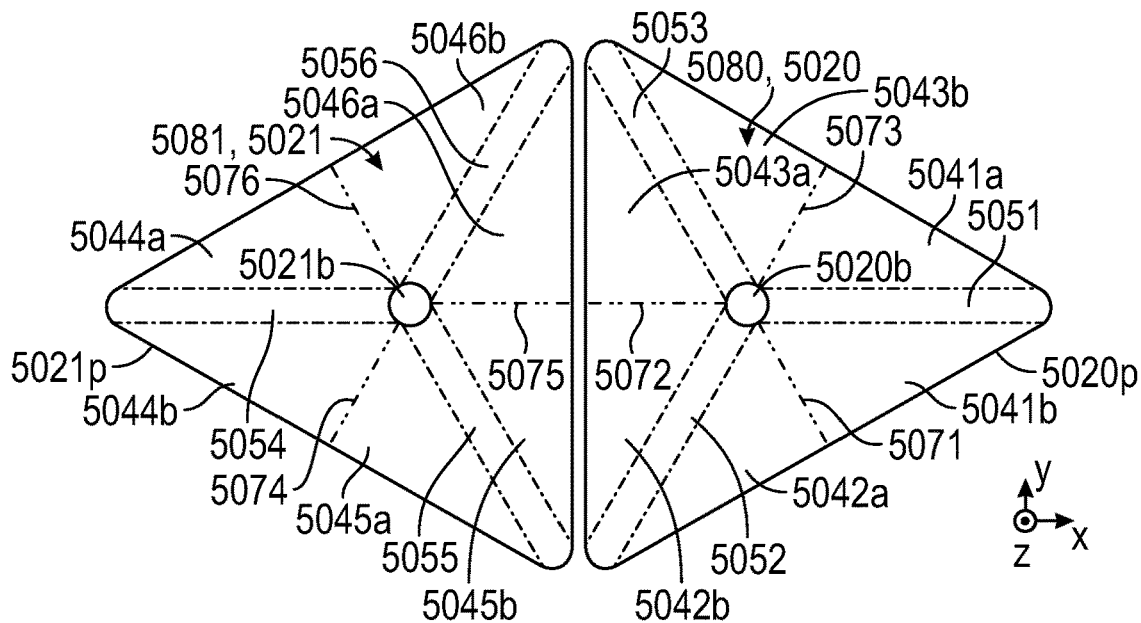
FIG. 50 is a schematic plan view of a structured surface comprising two recesses that form a matched pair of truncated cube corner elements, such recesses being made using the disclosed end milling techniques.

As mentioned above, the disclosed end milling techniques can be used to form numerous cube corner elements and other structures in the working surface of a substrate. FIG. 50 is a view of a structured surface in which two recesses 5020, 5021 have been formed adjacent to each other using the disclosed techniques. We assume the faces of these recesses are configured to be mutually perpendicular to each other such that the recess 5020 is a cube corner element 5080 and the recess 5021 is a cube corner element 5081, but alternative embodiments are also contemplated in which the mutual perpendicularity condition is not satisfied, and the recesses are not cube corner elements. The structured surface extends along an x-y plane, and has a normal vector which we can associate with a z-axis of a coordinate system.

The cube corner element 5080 is assumed to be the same as, or similar to, the cube corner element 4780. A direct comparison can be made, for example, between the plan view of element 5080 in FIG. 50 and the plan view of element 4780 in FIG. 47. The labeled elements of the cube corner element 5080—the perimeter 5020p, vertex or base 5020b, flat faces 5041a, 5041b, 5042a, 5042b, 5043a, 5043b which form compound faces with break lines 5071, 5072, and 5073, and rounded edges 5051, 5052, 5053—all have direct counterparts in the cube corner element 4780, and need no further explanation.

The cube corner element 5081 is assumed to be a cube corner element that is substantially the same as cube corner element 5080, but having an orientation that is rotated 180 degrees about the z-axis. Stated differently, the cube corner elements 5080, 5081 have corresponding features, and those features are related to each other by a 180 degree rotation about an axis parallel to the z-axis. Such structures are referred to as a matched pair of cube corner elements. Therefore, the labeled elements of the cube corner element 5081—the perimeter 5021p, vertex or base 5021b, flat faces 5044a, 5044b, 5045a, 5045b, 5046a, 5046b which form compound faces with break lines 5074, 5075, and 5076, and rounded edges 5054, 5055, 5056—all have direct counterparts in the cube corner element 5080 (and cube corner element 4780), and need no further explanation.

The cube corner elements 5080, 5081 are shown to be spaced apart slightly such that a small narrow strip (flat area) appears between two straight sides of their respective perimeters. In alternative embodiments, the elements 5080, 5081 can be formed closer together such that the compound face formed by faces 5042b, 5043a (in cube corner element 5080) and the compound face formed by the faces 5045b, 5046a (in cube corner element 5081) intersect each other to form a sharp edge.

Figure 51:
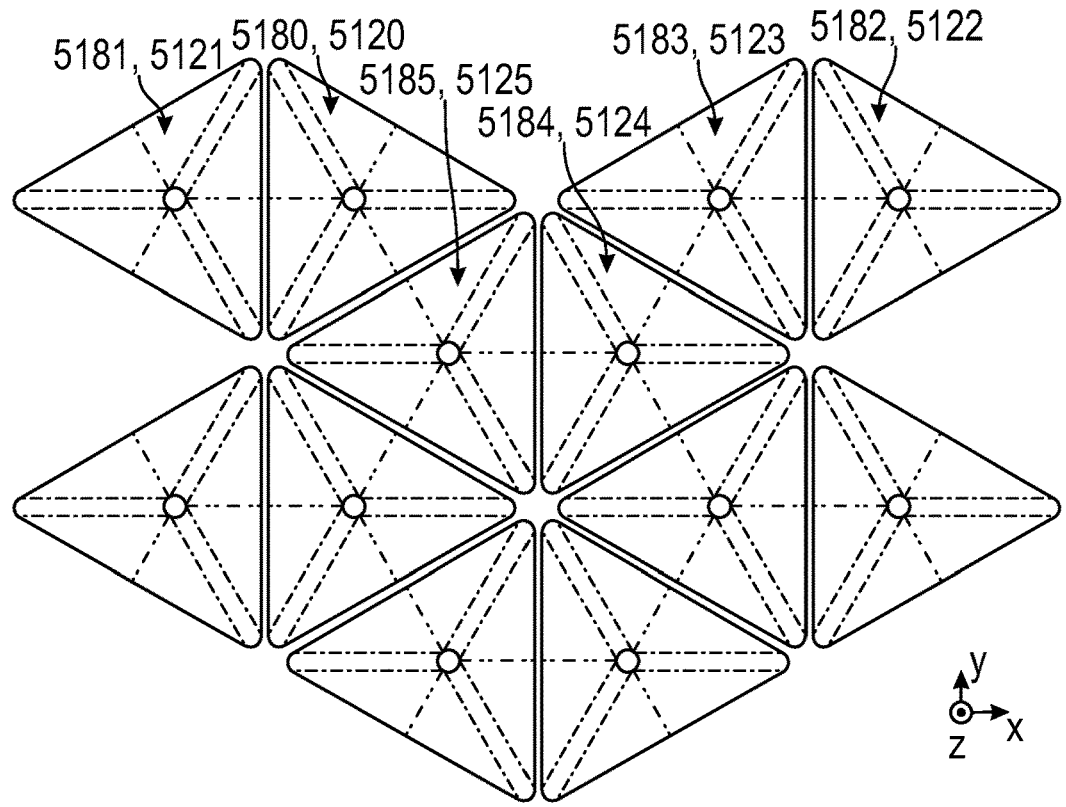
FIG. 51 is a schematic plan view of a structured surface comprising a plurality of matched pairs of truncated cube corner elements.

FIG. 51 is a view of a structured surface in which numerous recesses 5120, 5121, 5122, 5123, 5124, 5125, and so forth have been formed adjacent to each other using the disclosed techniques, e.g., as describe in connection with FIG. 47. The structured surface extends along an x-y plane, and has a normal vector which we can associate with a z-axis of a coordinate system. We assume the faces of the recesses are configured to be mutually perpendicular to each other such that the recesses form respective cube corner elements 5180, 5181, 5182, 5183, 5184, 5185, and so forth, but alternative embodiments are also contemplated in which the mutual perpendicularity condition is not satisfied, and the recesses are not cube corner elements. The cube corner elements can be configured as matched pairs of cube corner elements as described in connection with FIG. 50, e.g. with cube corner elements 5180, 5181 forming a first matched pair, cube corner elements 5182, 5183 forming a second matched pair, cube corner elements 5184, 5185 forming a third matched pair, and so forth. Adjacent cube corner elements are shown to be spaced apart slightly such that a small narrow strip (flat area) appears between two straight sides of their respective perimeters. In alternative embodiments, some or all adjacent pairs of the cube corner elements can be formed closer together such that the compound faces of adjacent cube corner elements intersect each other to form sharp edges.

The disclosed techniques for forming cube corner elements and similar structures are readily amenable to tailoring the shapes and orientations of the various flat faces—by tailoring the shape of the cutting envelope of the rotating end mill, or the geometry of the inclined cutting paths, or both—so as to produce reconfigured or modified structures. We can use such design tools to create canted cube corner elements, and PG cube corner elements.

Figure 52:
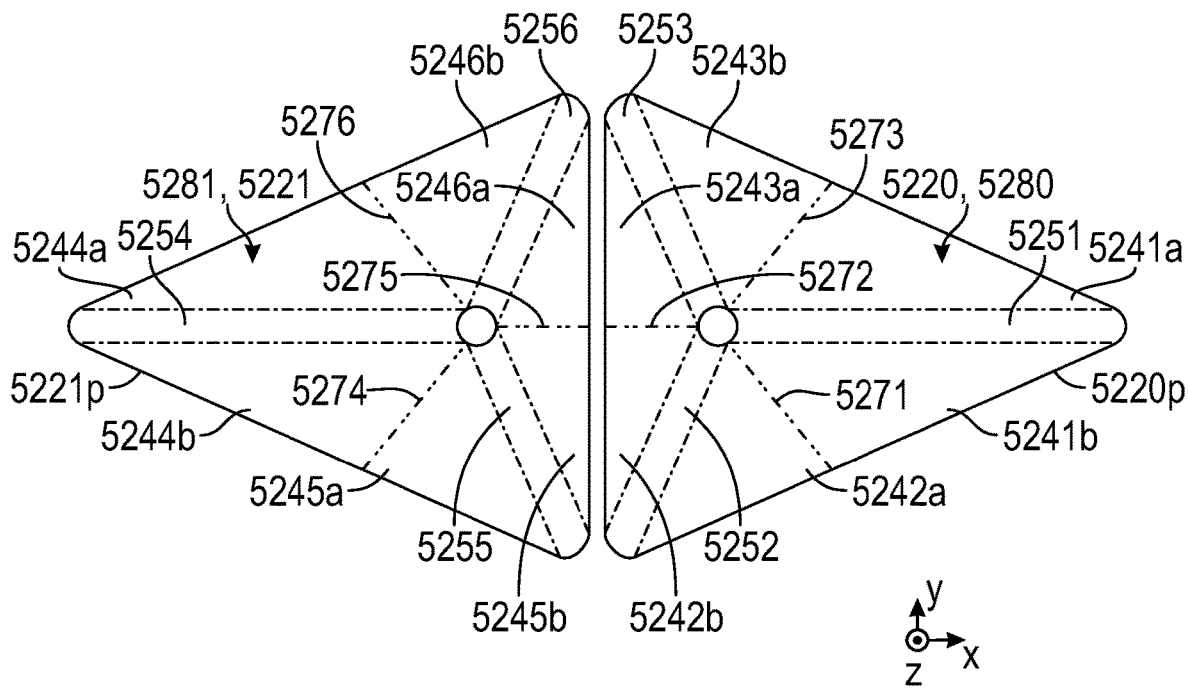
FIG. 52 is a schematic plan view of a structured surface made using the disclosed end milling techniques, the structured surface comprising two recesses that form a matched pair of truncated, backward canted cube corner elements.

FIG. 52 is a schematic plan view of some recesses 5220, 5221 formed in a structured surface using the disclosed end milling techniques, the recesses being a matched pair of backward canted, truncated cube corner elements 5280, 5281. The structured surface extends along an x-y plane, and has a normal vector which we can associate with a z-axis of a coordinate system.

By comparing FIG. 52 with FIG. 50, and with the benefit of knowing how the cube corner elements of FIG. 50 are made using as a basic building block the teardrop-shaped structure shown in FIG. 18, we can immediately understand the process by which the modified configuration of FIG. 52 can be made using the disclosed end milling techniques.

The cube corner element 5280 of FIG. 52 has the following labeled elements: a perimeter 5220p; a vertex or base 5220b; flat faces 5241a, 5241b, 5242a, 5242b, 5243a, 5243b, which form first, second, and third compound faces with respective break lines 5271, 5272, and 5273; and rounded edges 5251, 5252, 5253. All of these elements have counterparts in the cube corner element 5080 of FIG. 50, even though the counterpart elements are not identical. Having the benefit of the prior description, the reader will recognize that the rounded edge 5251 and the faces 5241a, 5241b are formed in a first cutting step by moving a first end mill cutting envelope along a first inclined path segment (disposed in a first vertical plane) at an inclination angle α, and the rounded edge 5252 and the faces 5242a, 5242b are formed in a second cutting step by moving a second end mill cutting envelope along a second inclined path segment (disposed in a second vertical plane) at an inclination angle β, and the rounded edge 5253 and the faces 5243a, 5243b are formed in a third cutting step by moving a third end mill cutting envelope along a third inclined path segment (disposed in a third vertical plane) at an inclination angle γ, where the first, second, and third inclined path segments share a common deepest point as illustrated in FIG. 46, the deepest point corresponding to the base 5220b.

The only remaining question is to determine what values to assign to the various cutting parameters that will cause the first, second, and third compound faces to form a cube corner element in which the symmetry axis of the cube is tilted in the backward direction, i.e., such that the base triangle or perimeter of the cube corner element has two interior angles greater than 60 degrees. This is a straight-forward geometrical exercise. We arrive at the following answers to provide the cube corner element 5280 with an 8.826 degree cant in the backward direction, such a cube corner element having a base triangle with interior angles of (66, 66, 48) degrees:

First cutting step in the first vertical plane:
THA=35.264 degrees;
Cutting envelope tilt: θ=8.826 degrees, φ=0 degrees;
Inclination angle α=26.438 degrees;
Second cutting step in the second vertical plane:
THA=35.264 degrees;
Cutting envelope tilt: θ=8.826 degrees, φ=114 degrees;
Inclination angle β=39.284 degrees;
Intersection angle Φ1 between $1^{st}$ and $2^{nd}$ vertical planes: 114 degrees;
Third cutting step in the third vertical plane:
THA=35.264 degrees;
Cutting envelope tilt: θ=8.826 degrees, φ=−114 degrees;
Inclination angle γ=39.284 degrees;
Intersection angle Φ2 between $2^{nd}$ and $3^{rd}$ vertical planes: 132 degrees;

Consistent with the discussion in relation to FIG. 33, the values given for the polar and azimuthal angles (θ, φ), for each of these three cutting steps used to form the cube corner element 5280, are measured relative to the local vertical plane (e.g. an x-y plane, or an x'-y' plane, or an x"-y" plane, similar to those of FIG. 47) for that particular cutting step. Despite the fact that different azimuthal angles are given for the three cutting steps, the reader can verify based on the other angles involved (Φ1, Φ2), and inspection of the figures, that the orientation of the cutting envelope is in this case the same relative to a fixed reference mark (or coordinate system) on the structured surface for all three cutting steps and their associated inclined cutting paths.

Using these cutting parameters, we produce the backward canted cube corner element 5280 as described. The same cutting steps, but carried out with a 180 degree rotation about the z-axis, produces the other backward canted cube corner element 5281 along with its labeled elements: a perimeter 5221p; a vertex or base 5221b; flat faces 5244a, 5244b, 5245a, 5245b, 5246a, 5246b, which form fourth, fifth, and sixth compound faces with respective break lines 5274, 5275, and 5276; and rounded edges 5254, 5255, 5256. The cube corner element 5281 is a matched pair to the cube corner element 5280, which means the element 5281 has the same degree of cant in the backward direction and a base triangle having the same set of interior angles as those mentioned above for element 5280.

Figure 53:
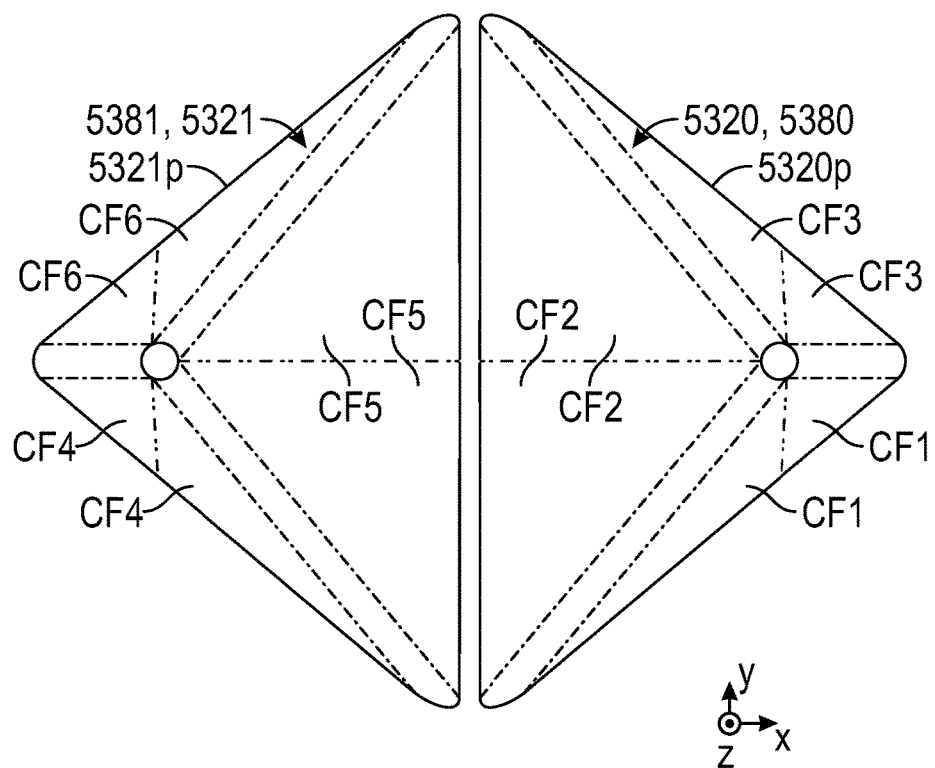
FIG. 53 is a schematic plan view of a structured surface similar to that of FIG. 52, but where the matched pair of truncated canted cube corner elements are forward canted.

FIG. 53 is a schematic plan view of some recesses 5320, 5321 formed in a structured surface using the disclosed end milling techniques, the recesses being a matched pair of cube corner elements 5380, 5381 similar to those of FIG. 52 except that they are forward canted, rather than backward canted. The structured surface extends along an x-y plane, and has a normal vector which we can associate with a z-axis of a coordinate system.

Similar to FIG. 52, upon inspection of FIG. 53, and with the benefit of the above teachings, we can immediately understand the process by which the modified configuration of FIG. 53 can be made using the disclosed end milling techniques.

The cube corner element 5380 of FIG. 53 has the following elements: a perimeter 5320p; a vertex or base (not labeled); flat faces (not labeled) that form first, second, and third compound faces CF1, CF2, CF3 with respective break lines (not labeled); and rounded edges (not labeled). All of these elements have counterparts in the cube corner element 5080 of FIG. 50, and in the cube corner element 5280 of FIG. 52, even though the counterpart elements are not identical. Having the benefit of the prior description, the reader will recognize that a first rounded edge and associated faces are formed in a first cutting step by moving a first end mill cutting envelope along a first inclined path segment (disposed in a first vertical plane) at an inclination angle α, and a second rounded edge and associated faces are formed in a second cutting step by moving a second end mill cutting envelope along a second inclined path segment (disposed in a second vertical plane) at an inclination angle β, and a third rounded edge and associated faces are formed in a third cutting step by moving a third end mill cutting envelope along a third inclined path segment (disposed in a third vertical plane) at an inclination angle γ, where the first, second, and third inclined path segments share a common deepest point as illustrated in FIG. 46, the deepest point corresponding to the base of the cube corner element 5380. Faces from the first, second, and third cutting steps meet to form the first, second, and third compound faces CF1, CF2, CF3.

The only remaining question is to determine what values to assign to the various cutting parameters that will cause the first, second, and third compound faces to form a cube corner element in which the symmetry axis of the cube is tilted in the forward direction, i.e., such that the base triangle or perimeter of the cube corner element has only one interior angle greater than 60 degrees. This is a straightforward geometrical exercise. We arrive at the following answers to provide the cube corner element 5380 with a 21.781 degree cant in the forward direction, such a cube corner element having a base triangle with interior angles of (50, 50, 80) degrees:

First cutting step in the first vertical plane:
THA=35.264 degrees;
Cutting envelope tilt: θ=21.781 degrees, φ=180 degrees;
Inclination angle α=57.045 degrees;
Second cutting step in the second vertical plane:
THA=35.264 degrees;
Cutting envelope tilt: θ=21.781 degrees, φ=−50 degrees;
Inclination angle β=22.622 degrees;
Intersection angle Φ1 between $1^{st}$ and $2^{nd}$ vertical planes: 130 degrees;
Third cutting step in the third vertical plane:
THA=35.264 degrees;
Cutting envelope tilt: θ=21.781 degrees, φ=50 degrees;
Inclination angle γ=22.622 degrees;
Intersection angle Φ2 between $2^{nd}$ and $3^{rd}$ vertical planes: 100 degrees;

Consistent with the discussion in relation to FIG. 33, the values given for the polar and azimuthal angles (θ, φ), for each of these three cutting steps used to form the cube corner element 5380, are measured relative to the local vertical plane (e.g. an x-y plane, or an x'-y' plane, or an x"-y" plane, similar to those of FIG. 47) for that particular cutting step. Despite the fact that different azimuthal angles are given for the three cutting steps, the reader can verify based on the other angles involved (Φ1, Φ2), and inspection of the figures, that the orientation of the cutting envelope is in this case the same relative to a fixed reference mark (or coordinate system) on the structured surface for all three cutting steps and their associated inclined cutting paths.

Using these cutting parameters, we produce the forward canted cube corner element 5380 as described. The same cutting steps, but carried out with a 180 degree rotation about the z-axis, produces the other forward canted cube corner element 5381 along with the following elements: a perimeter 5321p; a vertex or base (not labeled); flat faces (not labeled) that form fourth, fifth, and sixth compound faces CF4, CF5, CF6 with respective break lines (not labeled); and rounded edges (not labeled). The cube corner element 5381 is a matched pair to the cube corner element 5380, which means the element 5381 has the same degree of cant in the forward direction and a base triangle having the same set of interior angles as those mentioned above for element 5380.

The cube corner elements of FIGS. 47-53 are all truncated cube corner elements. The disclosed end milling techniques can be extended to fabricate PG cube corner elements, and similar structures. The group of FIGS. 54-56A demonstrates one way this can be done.

Figure 54:
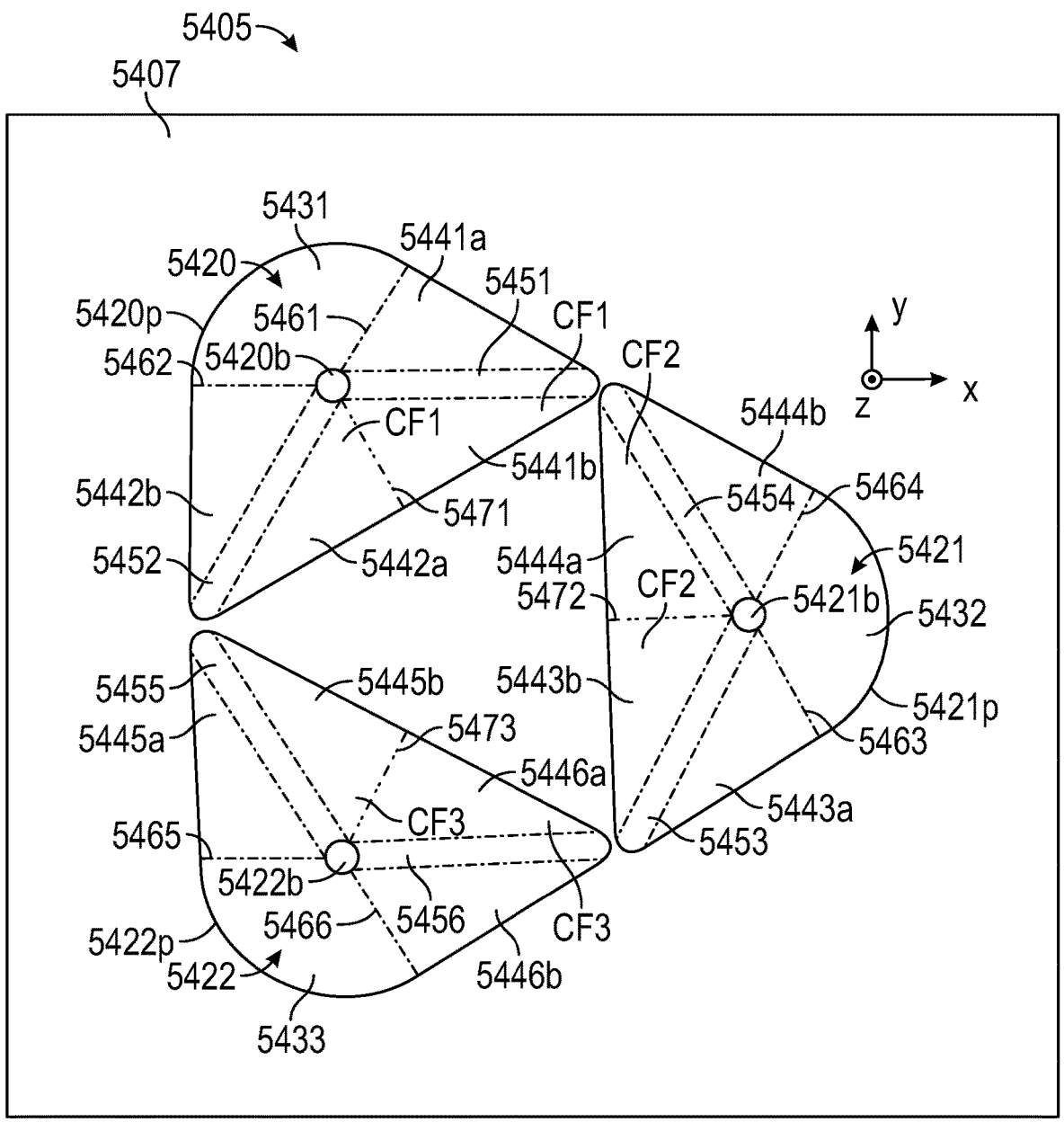

We begin with FIG. 54, which illustrates a substrate 5405 having a working or structured surface 5407 that extends parallel to an x-y plane, the working surface also having a normal vector corresponding to the z-axis of the coordinate system. Three distinct recesses 5420, 5421, and 5422 are already formed in the working surface by the disclosed end milling cutting steps.

The recess 5420 may be the same as or similar to the recess 3820 described previously, as can be appreciated by a comparison of FIG. 38 to the recess 5420 of FIG. 54. Thus, we need only point out selected elements of recess 5420—a perimeter 5420p, a vertex or base 5420b, a curved side surface 5431, flat faces 5441a, 5441b, 5442a, 5442b, rounded edges 5451, 5452 inclined at respective inclination angles α1, β1, transition lines 5461, 5462, and a break line 5471 along which the faces 5441b, 5442a meet to form a compound face CF1—and note that they have direct counterparts in the elements of the previously described recess 3820.

Two other recesses 5421, 5422, which are identical to the recess 5420 except for rotations about the z-axis, are also provided. Elements of recess 5421 include: a perimeter 5421p, a vertex or base 5421b, a curved side surface 5432, flat faces 5443a, 5443b, 5444a, 5444b, rounded edges 5453, 5454 inclined at respective inclination angles α2, β2, transition lines 5463, 5464, and a break line 5472 along which the faces 5443b, 5444a meet to form a compound face CF2. Elements of recess 5422 include: a perimeter 5422p, a vertex or base 5422b, a curved side surface 5433, flat faces 5445a, 5445b, 5446a, 5446b, rounded edges 5455, 5456 inclined at respective inclination angles α3, β3, transition lines 5465, 5466, and a break line 5473 along which the faces 5445b, 5446a meet to form a compound face CF3. All of these elements have direct counterparts to elements in the recess 5420 (as well as to elements in the recess 3820 of FIG. 38), and thus no further explanation of these elements is necessary.

The recesses 5420, 5421, 5422 are substantially identical to each other except for their relative rotations about the z-axis. The recess 5421 is rotated 120 degrees clockwise relative to recess 5420, and the recess 5422 is rotated 120 degrees clockwise relative to recess 5421. With these relative orientations, the compound faces CF1, CF2, and CF3 are mutually orthogonal to each other, but are separated from each other by a central triangular region bounded by straight portions of the three perimeters 5420p, 5421p, 5422p. The three compound faces can be used to form a PG cube corner element if the three recesses are brought closer together.

Figure 55:
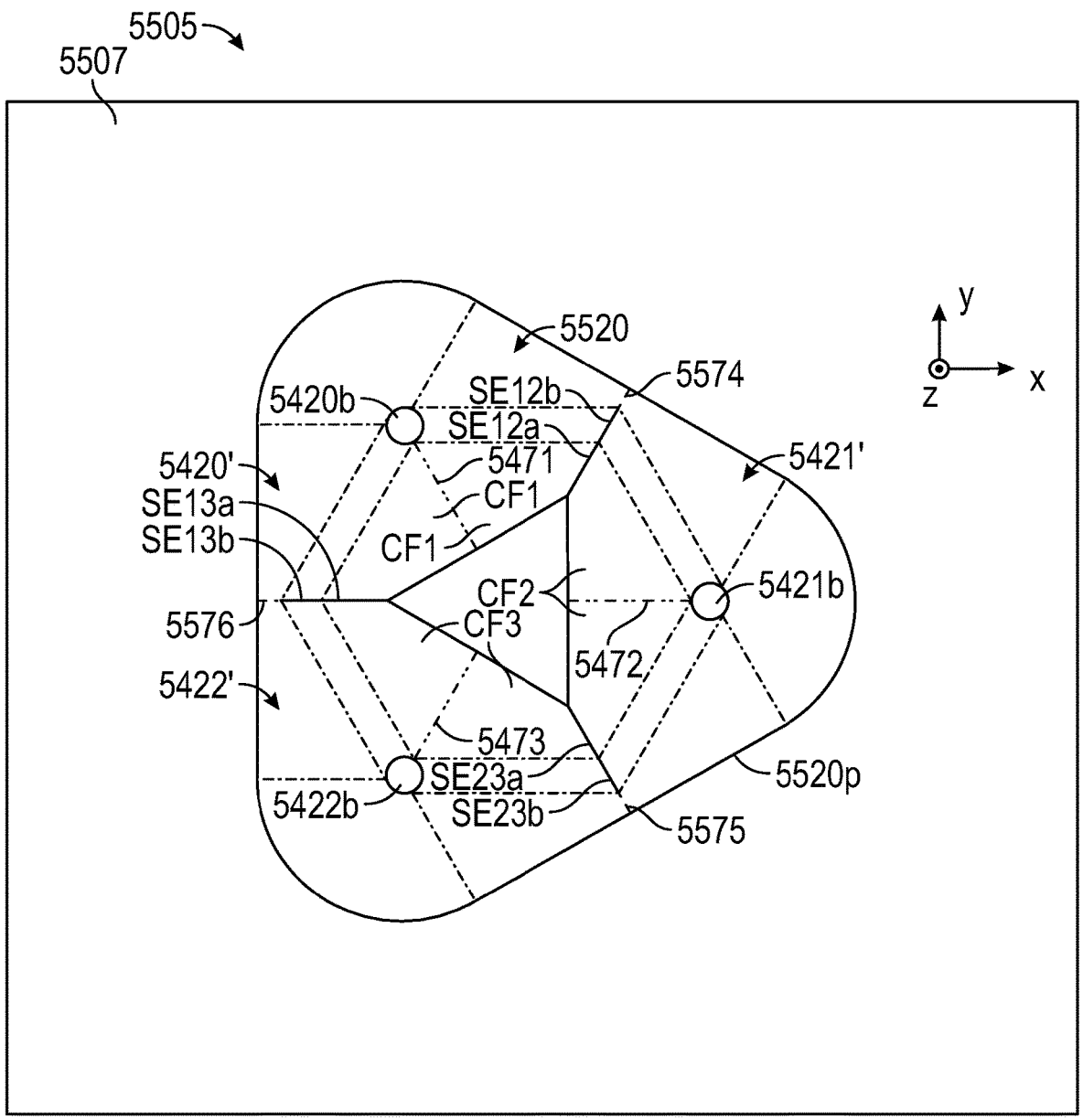

The substrate 5505 of FIG. 55 has a working surface 5507 similar to that of the substrate 5405, but where the recesses have been brought closer together so the compound faces contact each other in some places, but are separated from each other in other places by a (smaller) central triangular region. The working surface 5507 extends parallel to an x-y plane, and has a normal vector corresponding to the z-axis of the coordinate system. The same three recesses 5420, 5421, and 5422 that were formed as distinct in FIG. 54 have been formed again in the substrate 5505 by the end milling technique, except that the recesses have been brought or formed closer together such that they partially overlap, while maintaining their relative rotational orientations.

When the three recesses are formed closer to each other, the cutting of the end mill partially destroys or obliterates some features of a first recess as it moves along cutting paths to form a later second recess, and other portions of the first and second recesses are destroyed or obliterated as the rotating end mill moves along still other cutting paths to form the third and final recess. The destruction or obliteration results in the formation of new, sharp edges at places where the overlapping recesses intersect.

This can be seen in FIG. 55. The recesses have been formed closer together such that the bases 5420b, 5421b, 5422b are closer together, and the central triangular region of separation is smaller. A remnant of the recess 5420, labeled 5420', is still intact, as is a remnant of the recess 5421, labeled 5421', and a remnant of the recess 5422, labeled 5422'. These partial recesses 5420', 5421', and 5422' combine to form a single larger recess 5520. Portions of the compound faces CF1, CF2, CF3 have been destroyed. At some places, the compound faces now intersect each other to form sharp edges SE12a, SE23a, and SE13a. The rounded edges also intersect each other to form sharp edges SE12b, SE23b, and SE13b. Break lines 5574, 5575, 5576 also form as outer compound faces (not separately labeled) are created from other faces of the now-overlapping recesses.

Figure 56A:
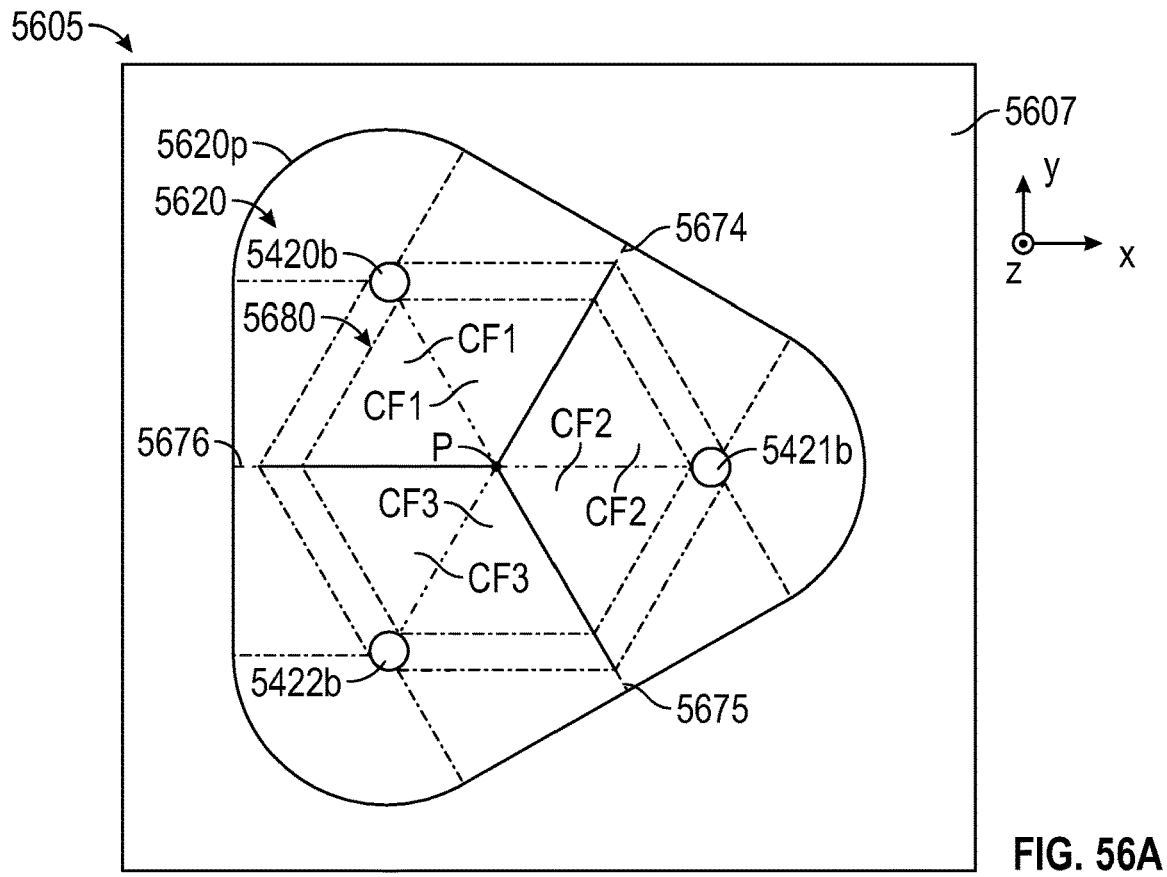

The substrate of FIG. 56A represents the final stage of bringing the previously separate recesses together. The substrate 5605 of FIG. 56A has a working surface 5607 similar to those of the substrates 5405 and 5505, the working surface 5607 extending parallel to the x-y plane, and having a normal vector corresponding to the z-axis. The same three recesses 5420, 5421, and 5422 that were formed as distinct in FIG. 54, and partially overlapping in FIG. 55, have been formed again in the substrate 5605 by the end milling technique, except that the recesses have been brought or formed even closer together so they partially overlap even more, while still maintaining their relative rotational orientations.

In the working surface 5607, by bringing the recesses even closer together, the compound faces CF1, CF2, CF3 come into full contact with each other, with no longer any central triangular region of separation between them. Instead, the three compound faces, and their respective break lines 5471, 5472, 5473 (see e.g. FIG. 54 or 55), come together at a central point P, the point P being a local maxima of the structured surface. The compound faces CF1, CF2, CF3 also intersect each other along three sharp edges, which also come together at the point P.

The bases 5420b, 5421b, 5422b are closer together in FIG. 56A than in FIG. 54 or 55. Remnants of the recesses 5420, 5421, and 5422 combine to form a single larger recess 5620. Break lines 5674, 5675, 5676 appear in outer compound faces (not separately labeled) that are created from other faces of the original three recesses. Portions of the original compound faces have been destroyed, but the compound faces CF1, CF2, CF3 that remain are each 4-sided (quadrilateral), are mutually orthogonal, and intersect each other along sharp, dihedral edges. Together, the compound faces CF1, CF2, CF3 of FIG. 56A form a cube corner element 5680. The six inclined rounded edges form non-dihedral edges of the cube corner element, and form a boundary or perimeter in plan view that is hexagonal, as seen in the figure. Such a cube corner element 5680 is a PG cube corner element. The cube corner element has a symmetry axis that passes through the point P and is parallel to the z-axis, i.e., the cube corner element 5680 is uncanted. Given that the point P is a relative maximum in the structured surface, i.e., it is a peak or apex relative to its immediate surroundings, the cube corner element 5680 is thus a cube corner protrusion, despite the fact that it resides at the center of a recess 5620, and despite the fact that it can be formed entirely by material removal steps of the rotating end mill, without any replication, or any negative or inverted copies.

Figure 56B:
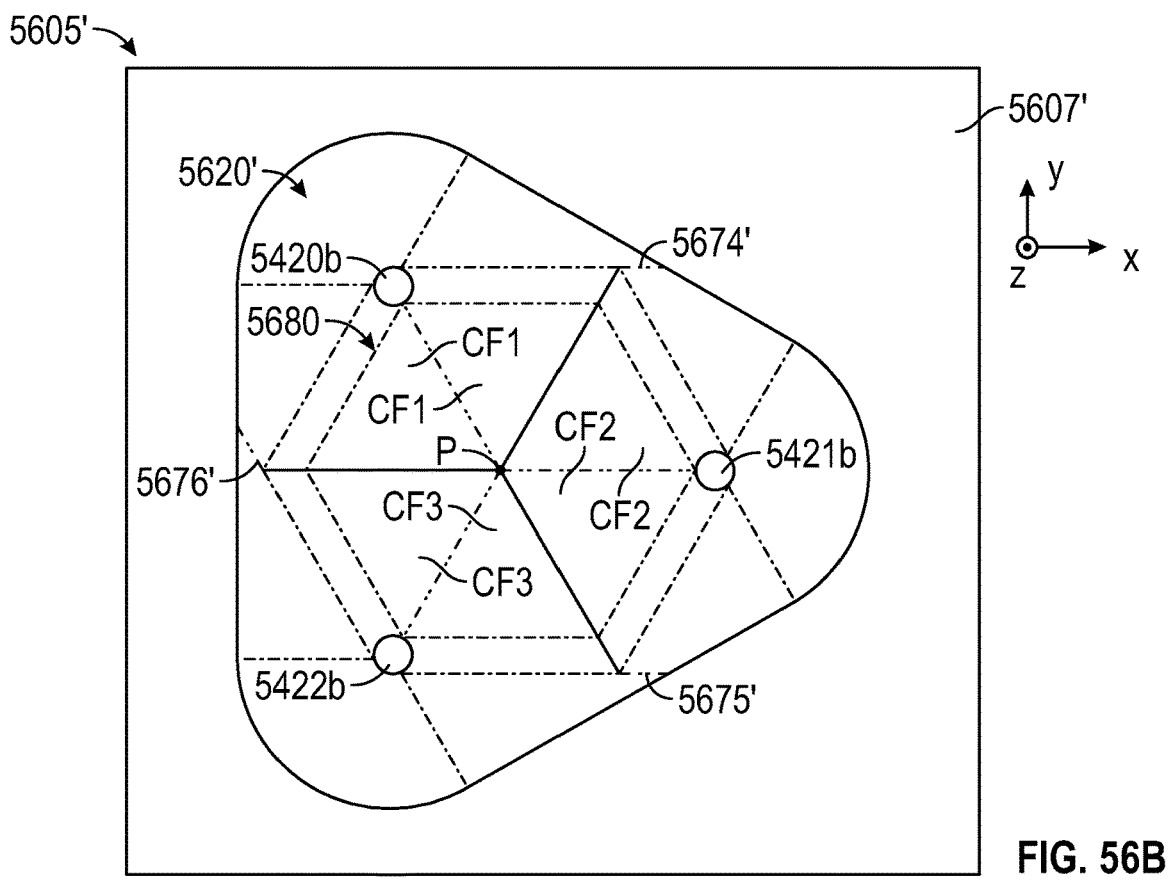
FIG. 56B is a schematic plan view of a substrate similar to that of FIG. 56A, and in which the same PG cube corner element is formed.

The substrate 5605' of FIG. 56B has a working surface 5607' that is the same as or similar to that of the substrate 5605 of FIG. 56A, except for the orientation of three break lines located between the perimeter of the recess and the perimeter of the cube corner element 5680. In FIG. 56A, the recess is labeled 5620, and the break lines are labeled 5674, 5675, 5676. These break lines assume the rotating cutting tool does not completely withdraw from the substrate as it moves along the inclined cutting paths used to form the rounded edges. In contrast, the alternative break lines 5674', 5675', 5676' of FIG. 56B (which provide an alternative recess 5620') do assume the rotating cutting tool completely withdraws from the substrate as it moves along the inclined cutting paths used to form the rounded edges. In all other respects, the working surfaces 5607, 5607' are the same.

Figure 57:
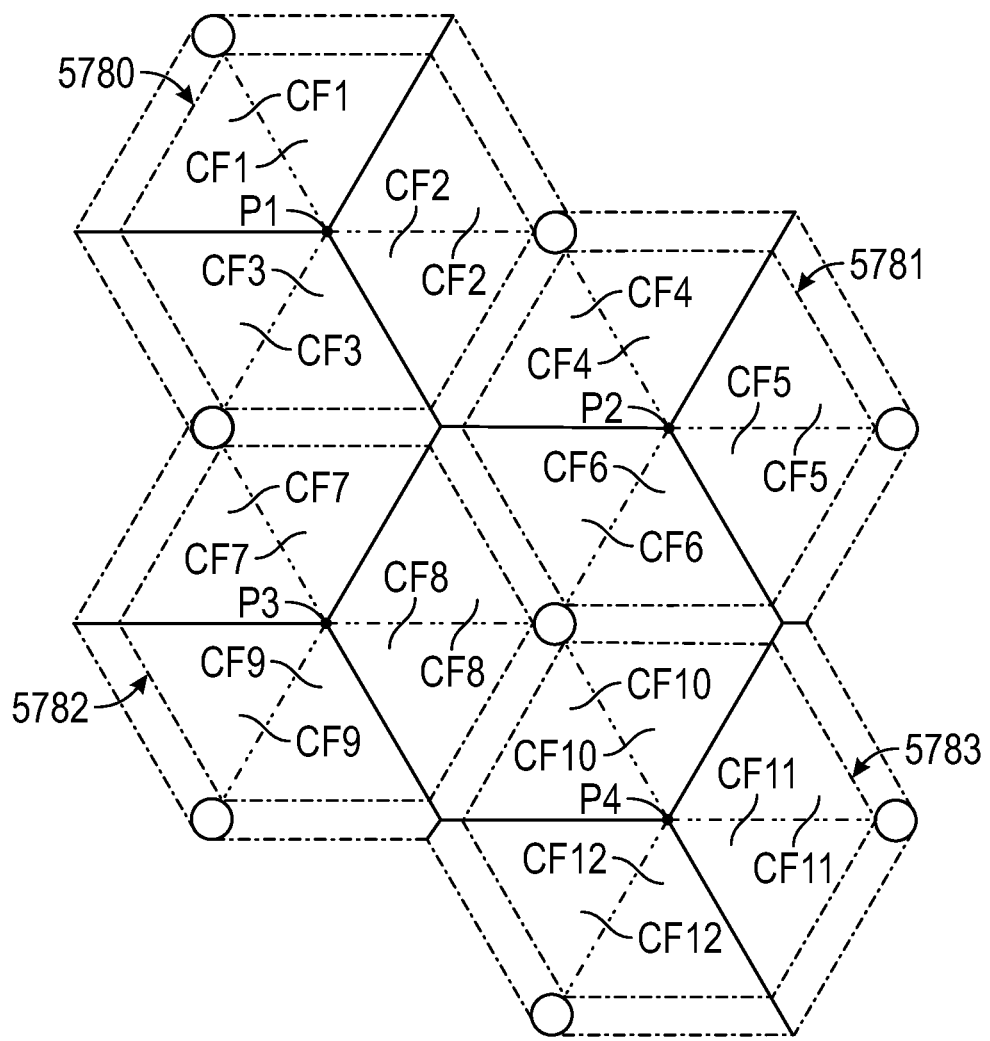
FIG. 57 is a schematic plan view of a structured surface in which resides a plurality or array of PG cube corner elements made by the disclosed end milling techniques.

In a straightforward fashion, the end mill cutting steps used to form the PG cube corner element 5680 of FIG. 56A or 56B can be stepped and repeated in a given substrate to form a structured surface comprising an array of closely-packed PG cube corner elements. Such a structured surface is shown in FIG. 57. In that figure, rounded edges and flat faces have been formed by the disclosed end milling techniques in the same manner as described in connection with FIGS. 54-56A, but where the cutting steps are repeated in an orderly fashion to form an array of the resulting PG cube corner elements. Thus, the structured surface includes a PG cube corner element 5780 comprising compound faces CF1, CF2, CF3 which meet at a point P1 (an apex), another PG cube corner element 5781 comprising compound faces CF4, CF5, CF6 which meet at a point P2 (an apex), another PG cube corner element 5782 comprising compound faces CF7, CF8, CF9 which meet at a point P3 (an apex), and another PG cube corner element 5783 comprising compound faces CF10, CF11, CF12 which meet at a point P4 (an apex). The number of such PG cube corner elements that can be combined in an array is not limited.

The PG cube corner elements of FIGS. 54-57 are all uncanted PG cube corner elements. The disclosed end milling techniques can be extended to fabricate canted PG cube corner elements, and similar structures. The pair of FIGS. 58-59 demonstrates one way this can be done.

Figure 58:
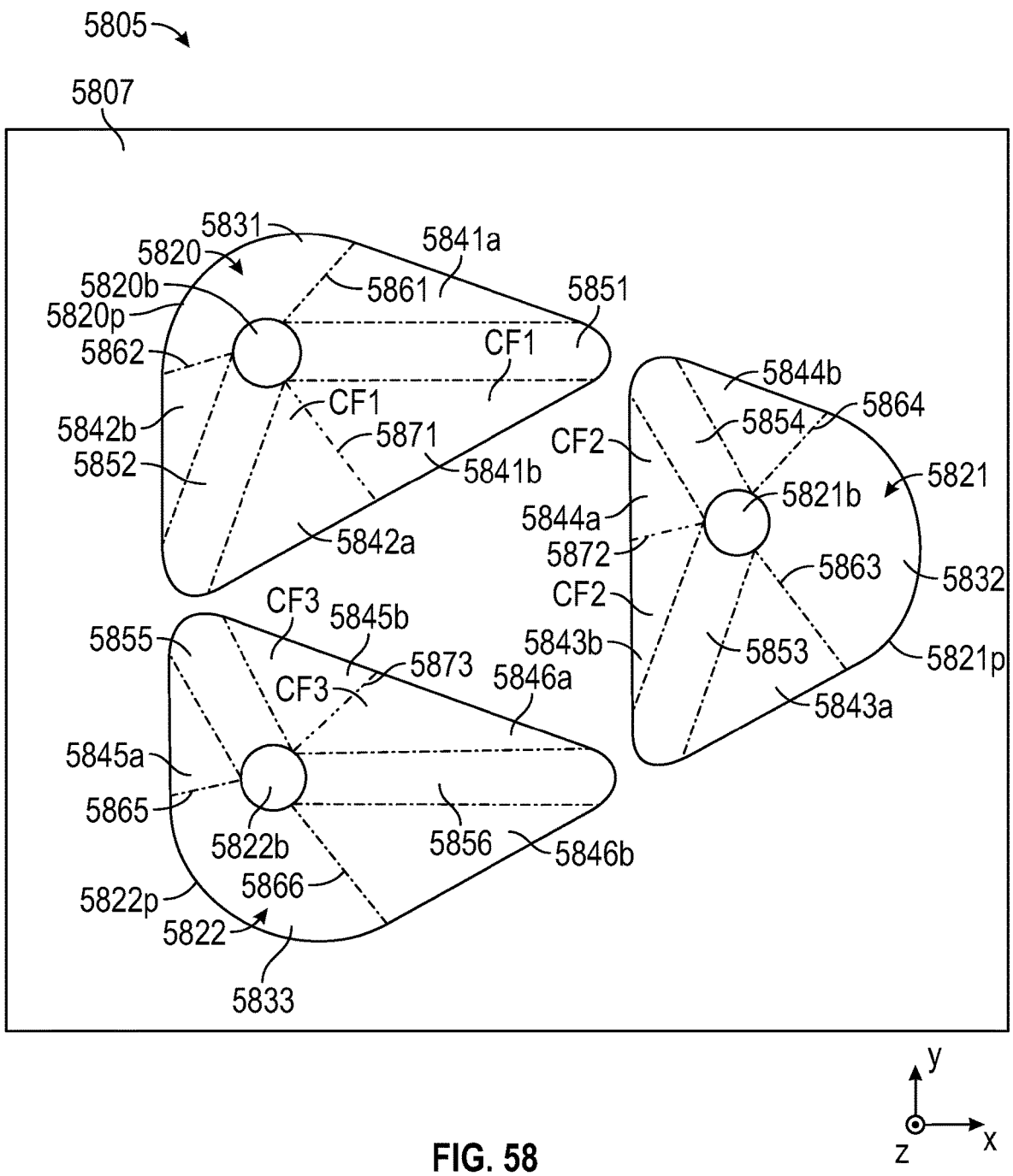
FIGS. 58-59 are a pair of schematic plan views similar to those of FIGS. 54-56A, but demonstrating how to make a canted PG cube corner element.
Figure 59:
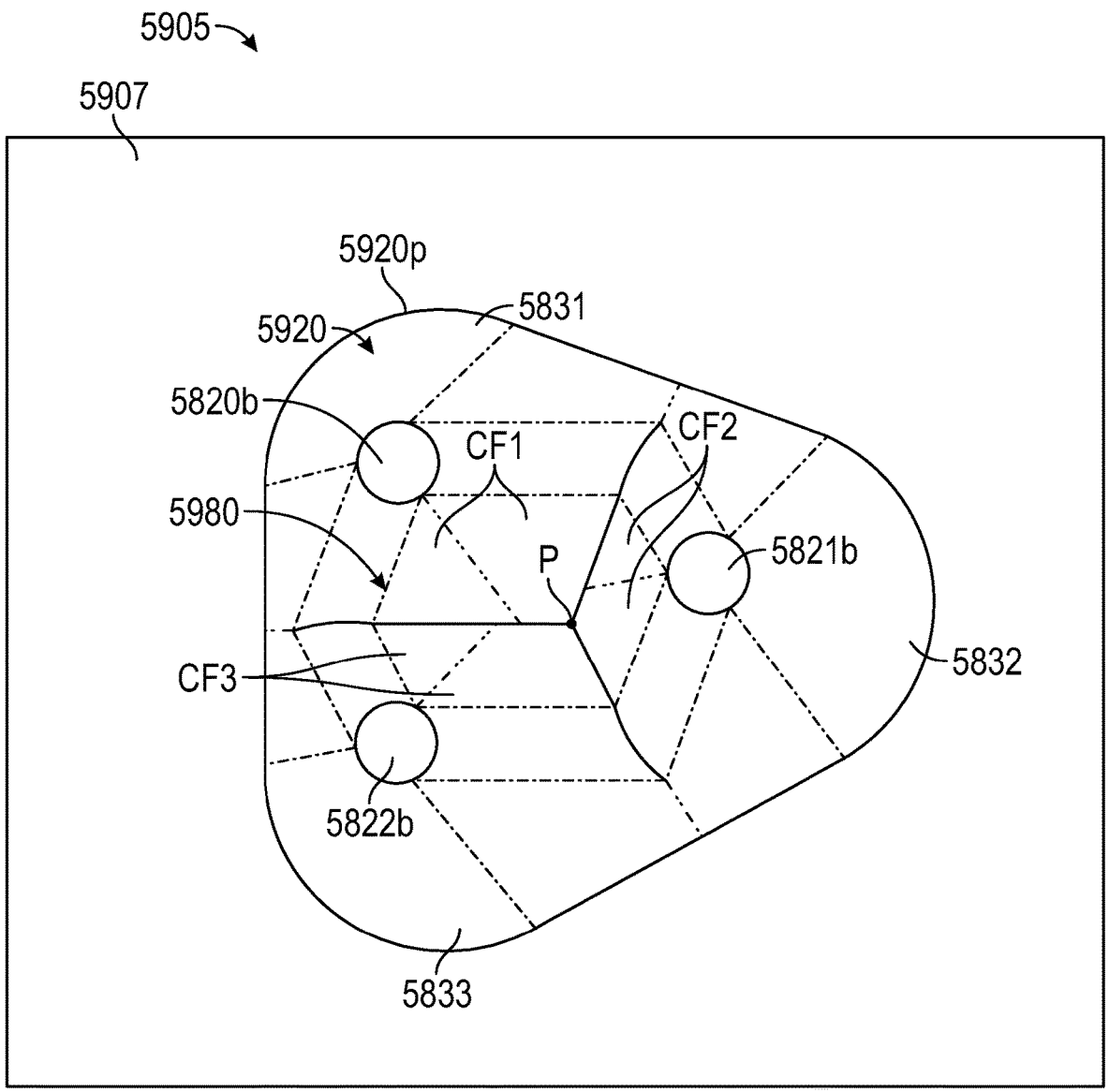

FIG. 58 illustrates a substrate 5805 having a working or structured surface 5807 that extends parallel to an x-y plane, the working surface also having a normal vector corresponding to the z-axis of the coordinate system. Three distinct recesses 5820, 5821, and 5822 are formed in the working surface by the disclosed end milling cutting steps. In a similar manner to the way in which the individual recesses of FIG. 54 were brought closer together to form the PG cube corner element of FIG. 56A, the recesses 5820, 5821, and 5822 of FIG. 58 are configured with compound faces, rounded edges, and other elements in such a way that, when the recesses are brought together and made to overlap as was done in FIG. 56A, the overlapping (and interfering) features produce a canted PG cube corner element.

The recess 5820 of FIG. 58 includes: a perimeter 5820p; a vertex or base 5820b; a curved side surface 5831; flat faces 5841a, 5841b, 5842a, 5842b; rounded edges 5851, 5852 inclined at respective inclination angles $\alpha 1$, $\beta 1$; transition lines 5861, 5862; and a break line 5871 along which the faces 5841b, 5842a meet to form a compound face CF1.

The recess 5821 of FIG. 58 includes: a perimeter 5821p; a vertex or base 5821b; a curved side surface 5832; flat faces 5843a, 5843b, 5844a, 5844b; rounded edges 5853, 5854 inclined at respective inclination angles $\alpha 2$, $\beta 2$; transition lines 5863, 5864; and a break line 5872 along which the faces 5843b, 5844a meet to form a compound face CF2.

The recess 5822 of FIG. 58 includes: a perimeter 5822p; a vertex or base 5822b; a curved side surface 5833; flat faces 5845a, 5845b, 5846a, 5846b; rounded edges 5855, 5856 inclined at respective inclination angles $\alpha 3$, $\beta 3$; transition lines 5865, 5866; and a break line 5873 along which the faces 5845b, 5846a meet to form a compound face CF3.

The recesses 5820, 5821, and 5822 are similar to the recesses 5420, 5421, 5422, respectively, and have elements that are counterparts, even though the counterpart elements are not identical. The reader will recognize that it is a straightforward geometrical problem to determine how to modify the cutting parameters of the recesses so as to reorient the compound faces appropriately to form a (PG) cube corner element that is suitably canted. We have determined the following cutting parameters will provide compound faces and other features of the recesses such that when they are brought together, they form a PG cube corner element with a 9.985 degree cant (which cant angle would produce a base triangle of (49, 61, 70) in a corresponding truncated cube corner element):

Recess 5820—first cutting step in a first vertical plane to form rounded edge 5851:
  THA=35.264 degrees;
  Cutting envelope tilt: $\theta$=9.985 degrees, $\phi$=29.386 degrees; and
  Inclination angle $\alpha$=26.690 degrees.

Recess 5820—second cutting step in a second vertical plane to form rounded edge 5852:
  THA=35.264 degrees;
  Cutting envelope tilt: $\theta$=9.985 degrees, $\phi$=148.386 degrees;
  Inclination angle $\beta$=43.960 degrees; and
  Intersection angle $\Phi 1$ between $1^{st}$ and $2^{nd}$ vertical planes: 119 degrees.

Recess 5821—first cutting step in a first vertical plane to form rounded edge 5853:
  THA=35.264 degrees;
  Cutting envelope tilt: $\theta$=9.985 degrees, $\phi$=148.386 degrees; and
  Inclination angle $\alpha$=43.960 degrees.

Recess 5821—second cutting step in a second vertical plane to form rounded edge 5854:
- THA=35.264 degrees;
- Cutting envelope tilt: θ=9.985 degrees, ϕ=−80.614 degrees;
- Inclination angle β=34.228 degrees; and
- Intersection angle Φ1 between $1^{st}$ and $2^{nd}$ vertical planes: 131 degrees.

The orientation of the recess 5821 relative to the recess 5820 is such that the first vertical plane of recess 5821 (in which edge 5853 resides) is parallel to the second vertical plane of recess 5820 (in which edge 5852 resides).

Recess 5822—first cutting step in a first vertical plane to form rounded edge 5856:
- THA=35.264 degrees;
- Cutting envelope tilt: θ=9.985 degrees, ϕ=29.386 degrees; and
- Inclination angle α=26.690 degrees.

Recess 5822—second cutting step in a second vertical plane to form rounded edge 5855:
- THA=35.264 degrees;
- Cutting envelope tilt: θ=9.985 degrees, ϕ=−80.614 degrees;
- Inclination angle β=34.228 degrees; and
- Intersection angle Φ1 between $1^{st}$ and $2^{nd}$ vertical planes: 110 degrees.

The orientation of the recess 5822 relative to the recess 5820 is such that the first vertical plane of recess 5822 (in which edge 5856 resides) is parallel to the first vertical plane of recess 5820 (in which edge 5851 resides).

Consistent with the discussion in relation to FIG. 33, the values given for the polar and azimuthal angles (θ, ϕ), for each of the above six cutting steps used to form the cube corner element 5980, are measured relative to the local vertical plane (e.g. an x-y plane, or an x'-y' plane, or an x"-y" plane, similar to those of FIG. 47) for that particular cutting step. Despite the fact that different azimuthal angles are given for the six cutting steps, the reader can verify based on the other angles involved, and inspection of the figures, that the orientation of the cutting envelope is in this case the same relative to a fixed reference mark (or coordinate system) on the structured surface for all six cutting steps and their associated inclined cutting paths.

These cutting parameters provide the recesses 5820, 5821, 5822 with suitably oriented compound faces such that, when combined by overlapping, the result is a canted PG cube corner element. The substrate 5905 of FIG. 59 has a working surface 5907 extending parallel to the x-y plane, and having a normal vector corresponding to the z-axis. The same three recesses 5820, 5821, and 5822 that were formed as distinct in FIG. 58 have been formed again in the substrate 5905 by the end milling technique, except that the recesses have been brought or formed closer together so they partially overlap, while maintaining their relative rotational orientations. Remnants of the recesses 5820, 5821, and 5822 combine to form a single larger recess 5920.

In the working surface 5907, the compound faces CF1, CF2, CF3 come into full contact with each other. The three compound faces come together at a point P, the point P being a local maxima of the structured surface. The compound faces CF1, CF2, CF3 also intersect each other along three sharp edges, which also come together at the point P.

Portions of the original compound faces have been destroyed, but the compound faces CF1, CF2, CF3 that remain are each 4-sided (quadrilateral), are mutually orthogonal, and intersect each other along sharp, dihedral edges. Together, the compound faces CF1, CF2, CF3 of FIG. 59 form a cube corner element 5980. The six inclined rounded edges form non-dihedral edges of the cube corner element, and form a boundary or perimeter in plan view that is hexagonal, as seen in the figure. Such a cube corner element 5980 is a PG cube corner element. The cube corner element has a symmetry axis that passes through the point P and is tilted to the z-axis, i.e., the cube corner element 5980 is canted. Given that the point P is a relative maximum in the structured surface, i.e., it is a peak or apex relative to its immediate surroundings, the cube corner element 5980 is thus a cube corner protrusion, despite the fact that it resides at the center of a recess 5920, and despite the fact that it can be formed entirely by material removal steps of the rotating end mill, without any replication, or any negative or inverted copies.

Figure 60:
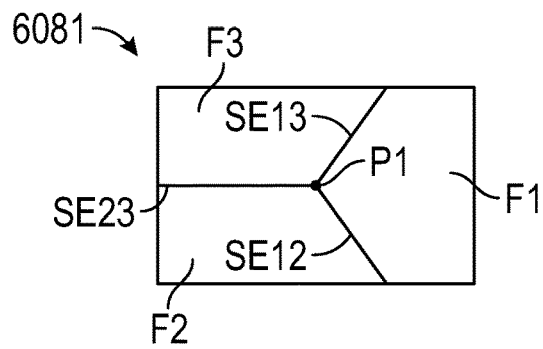
FIG. 60 is a schematic plan view of another PG cube corner element.
Figure 61:
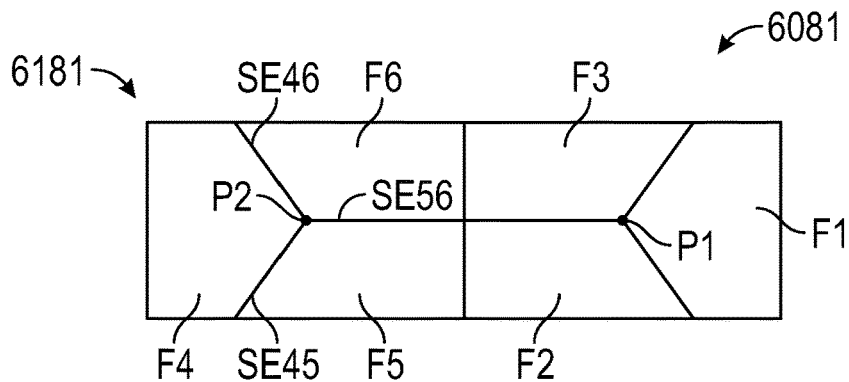
FIG. 61 is a schematic plan view of a matched pair of PG cube corner elements like that of FIG. 60.
Figure 62:
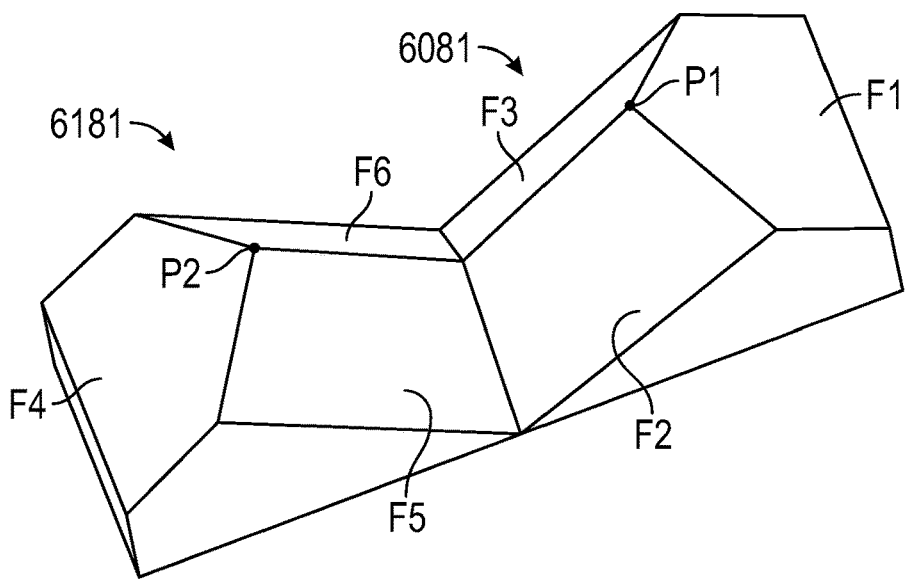
FIG. 62 is a perspective view thereof.

FIGS. 60-62 illustrate other types of PG cube corner elements. In FIG. 60, a PG cube corner element 6081 has first, second, and third optical faces F1, F2, F3, the faces intersecting along sharp edges SE12, SE23, SE13 as shown. The sharp edges intersect at a point P1, which is a local peak or apex.

In FIG. 61, the cube corner element 6081 is combined with a similar PG cube corner element 6181 to form a matched pair of cube corner elements. The cube corner element 6181 has fourth, fifth, and sixth optical faces F4, F5, F6, the faces intersecting along sharp edges SE45, SE56, SE46 as shown. The sharp edges intersect at a point P2, which is a local peak or apex.

FIG. 62 shows a perspective view of the matched pair of FIG. 61. In the view of FIG. 62, some non-optical faces of the cube corner elements 6081, 6181 can also be seen.

Figure 63:
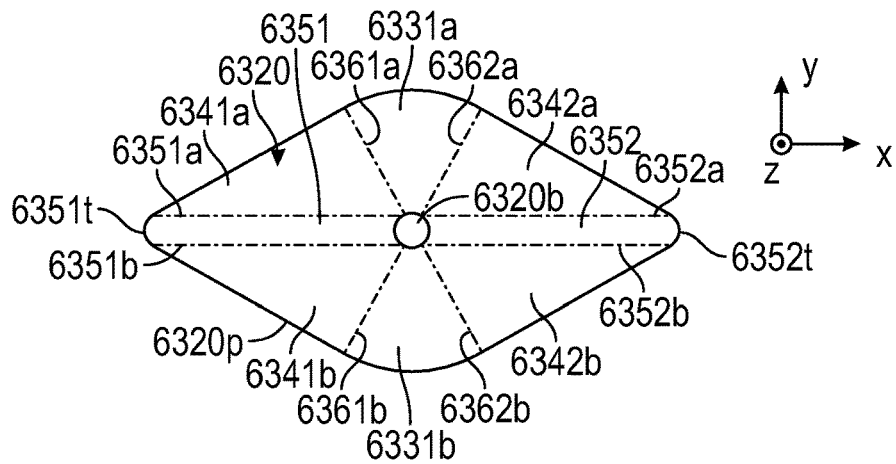
FIGS. 63-67B are a group of schematic plan views that demonstrate how to make PG cube corner elements like those of FIGS. 60-62.

FIGS. 63 through 67B illustrate how PG cube corner elements such as those of FIGS. 60-62 can be made with the disclosed end milling techniques. We begin with a recess 6320 as shown in FIG. 63. The recess 6320 includes: a perimeter 6320p; and a base 6320b; curved side surfaces 6331a, 6331b; flat faces 6341a, 6341b which meet along a rounded edge 6351, and flat faces 6342a, 6342b which meet along a rounded edge 6352; a terminus 6351t of the rounded edge 6351, and a terminus 6352t of the rounded edge 6352; transition lines 6361a, 6361b, 6362a, 6362b; and transition lines 6351a, 6351b, 6352a, 6352b. These features may be the same as or similar to corresponding features of the recess 3120 of FIG. 31, with no further explanation being necessary. The inclination angle of the rounded edge 6351 is 35.264 degrees, and the inclination angle of the rounded edge 6352 is 35.264 degrees. These are the same inclination angles of the inclined cutting paths followed by the cutting envelope, which is assumed to have a THA=35.264 degrees and no tilt (θ=0). The dihedral angle between the faces 6341a, 6341b is 90 degrees, and the dihedral angle between the faces 6342a, 6342b is also 90 degrees.

Figure 64:
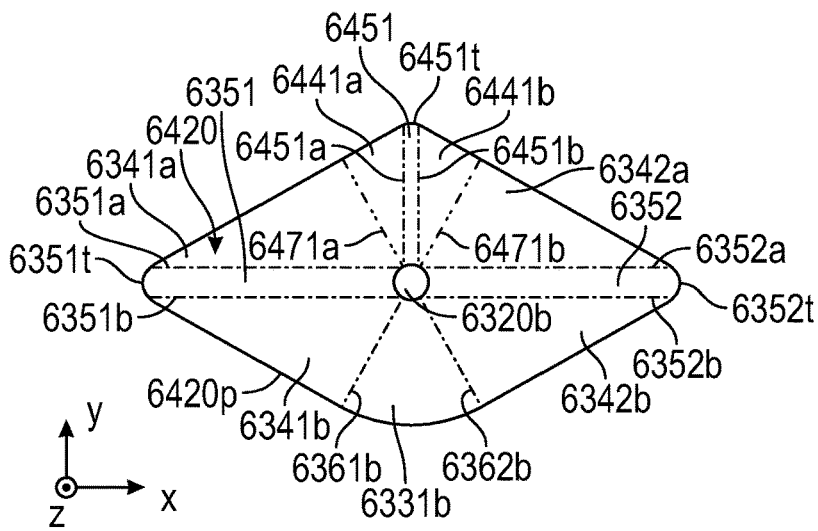

Next, we perform another cutting operation with another rotating end mill, as shown in FIG. 64. We follow an inclined cutting path that corresponds to the rounded edge 6451, at an inclination angle of 50.768 degrees, with a cutting envelope having THA=35.264 degrees and no tilt (θ=0). This cutting operation forms, in addition to the rounded edge 6451, flat faces 6441a, 6441b, transition lines 6451a, 6451b, and terminus 6451t. The flat face 6441a forms a compound face CF1 (labeled in FIG. 65) with face 6341a, meeting at a break line 6471a. The flat face 6441b forms a compound face CF2 (labeled in FIG. 65) with face 6342a, meeting at a break line 6471b. The dihedral angle between the faces 6441a, 6441b is 131.808 degrees.

Figure 65:
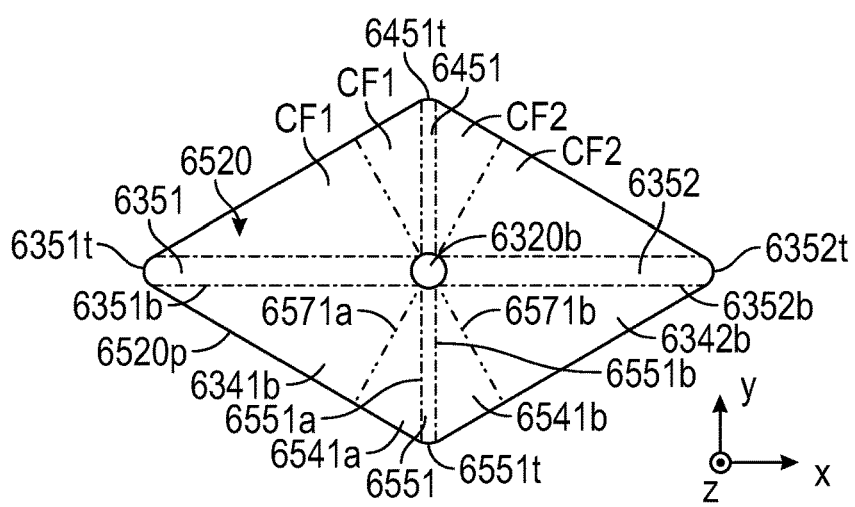

Next, we perform another cutting operation with another rotating end mill, as shown in FIG. 65. We follow an inclined cutting path that corresponds to the rounded edge 6551, at an inclination angle of 50.768 degrees, with a cutting envelope having THA=35.264 degrees and no tilt (θ=0). This cutting operation forms, in addition to the rounded edge 6551, flat faces 6541a, 6541b, transition lines 6551a, 6551b, and terminus 6551t. The flat face 6541a forms a compound face CF3 with face 6341b, meeting at a break line 6571a. The flat face 6541b forms a compound face CF4 with face 6342b, meeting at a break line 6571b. The dihedral angle between the faces 6541a, 6541b is 131.808 degrees.

Figure 66:
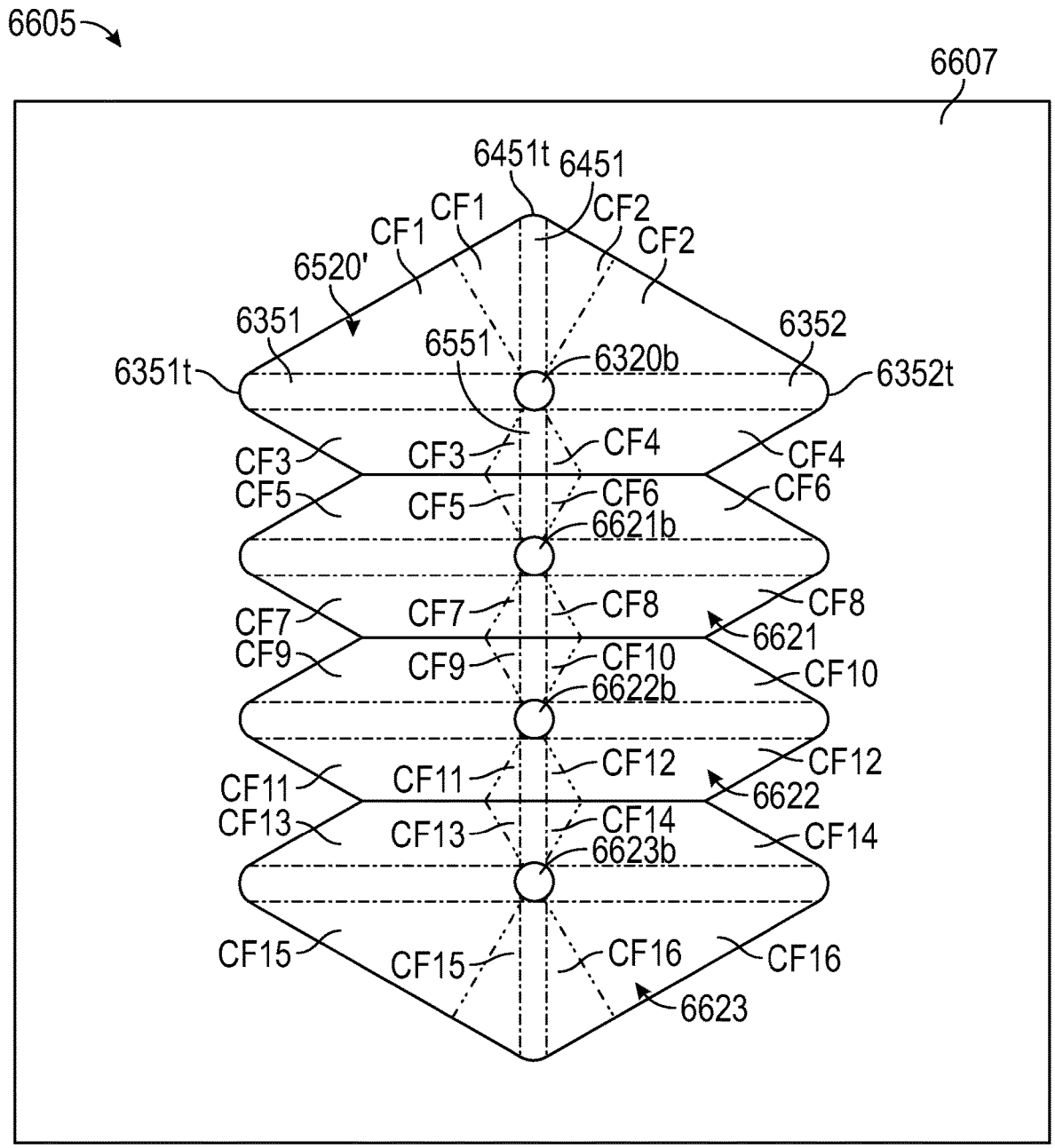

Next, we repeat these operations to form overlapping recesses of the same design, as shown in FIG. 66. In that figure, a substrate 6605 has a working surface 6607 in the context of an xyz coordinate system. First, the recess 6520 is cut into the working surface, just as in FIG. 65. Next, substantially similar recesses 6621, 6622, and 6623 are cut so as to overlap with each other and with the recess 6520, as shown in FIG. 66. The cutting of the recess 6621 obliterates part of the original recess 6520 (see e.g. FIG. 65), to provide the modified recess 6520' seen in FIG. 66. Sharp edges are formed at the intersection of adjacent compound faces. The recess 6621 has a base 6621b and compound faces CF5, CF6, CF7, CF8. The recess 6622 has a base 6622b and compound faces CF9, CF10, CF11, CF12. The recess 6623 has a base 6623b and compound faces CF13, CF14, CF15, CF16.

Figure 67A:
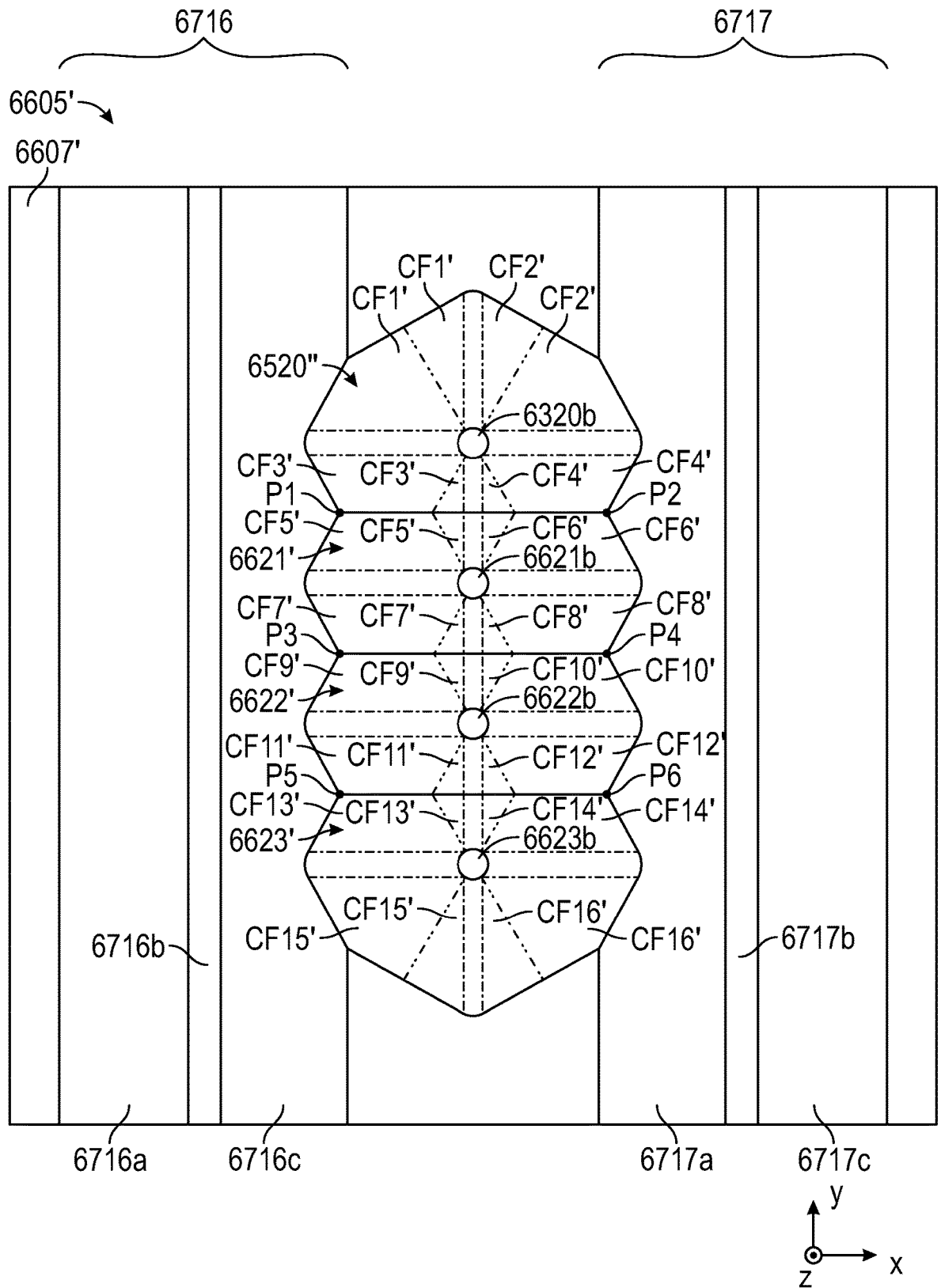
Figure 67B:
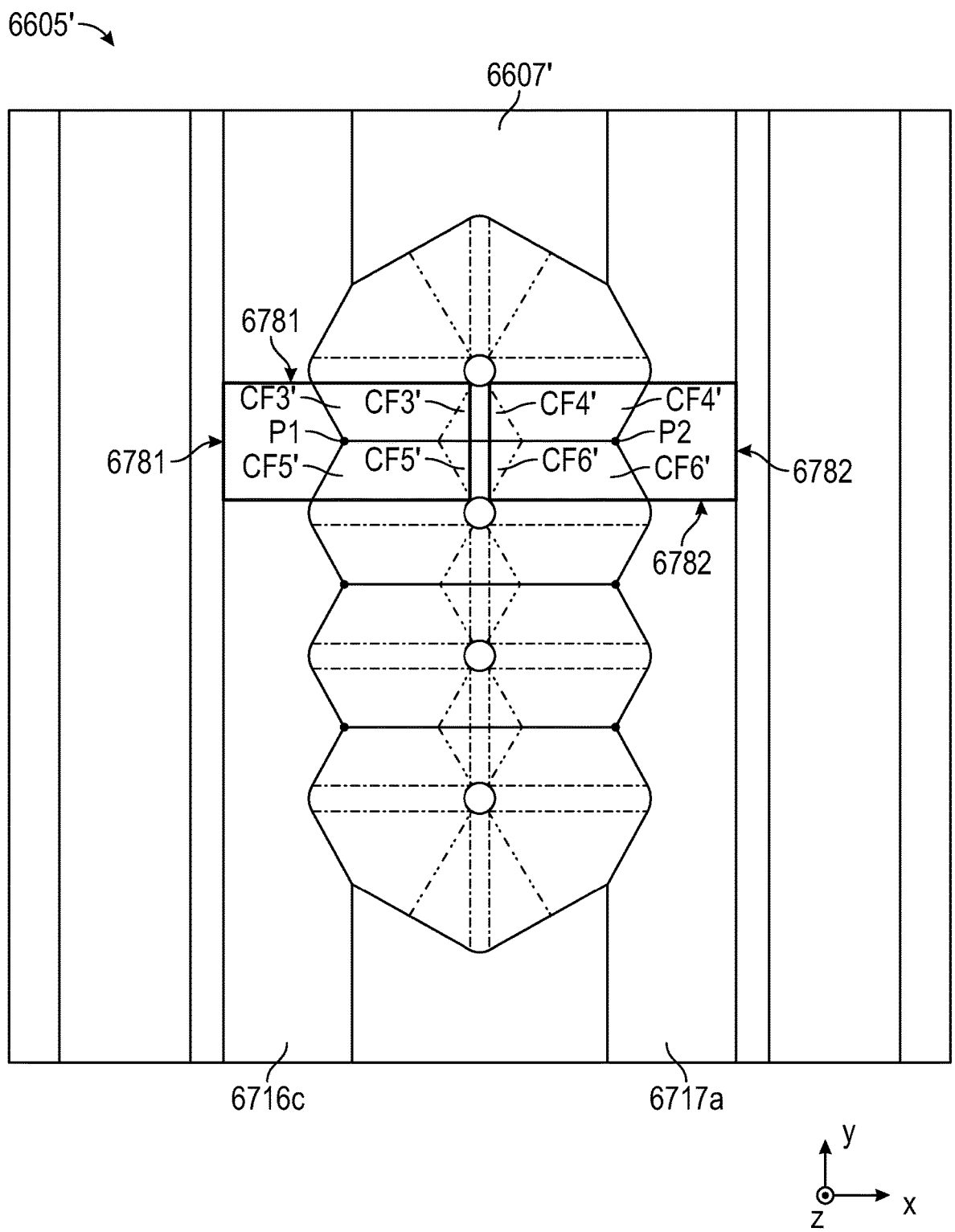

Finally, we machine straight, constant depth V-grooves into the substrate as shown in FIG. 67A. In the figure, the substrate is labeled 6605' and the working surface is labeled 6607' to reflect the changes made by the new V-grooves. Primes are also added to the cavity labels and to the compound face labels to reflect their modifications by the V-grooves. A V-groove 6716 has a flat bottom 6716b and angled side surfaces 6716a, 6716c. Another V-groove 6717, parallel to the groove 6716 and to the y-axis, has a flat bottom 6717b and angled side surfaces 6717a, 6717c. (In alternative embodiments, the flat bottom of either or both of V-grooves 6716, 6717 may be omitted and replaced with a sharp vertex. One or both of the V-grooves 6716, 6717 may in this regard be made by fly cutting rather than by end milling.) The V-groove 6716 is cut with a THA=35.264 degrees such that the side surface 6716c is perpendicular to the compound faces CF3', CF5', and so forth, and forms sharp edges with such compound faces. The V-groove 6717 is cut with a THA=35.264 degrees such that the side surface 6717a is perpendicular to the compound faces CF4', CF6', and so forth, and forms sharp edges with such compound faces. The structured surface of FIG. 67A provides PG cube corner elements of the type shown in FIGS. 60-62, the vertexes or peaks of such cube corner elements labeled in FIG. 67A as P1, P2, P3, . . . P6. For clarity, FIG. 67B reproduces the substrate 6605' and working surface 6607' with fewer reference labels, and with dark outlines to identify a matched pair of PG cube corner elements 6781, 6782.

Figure 68B:
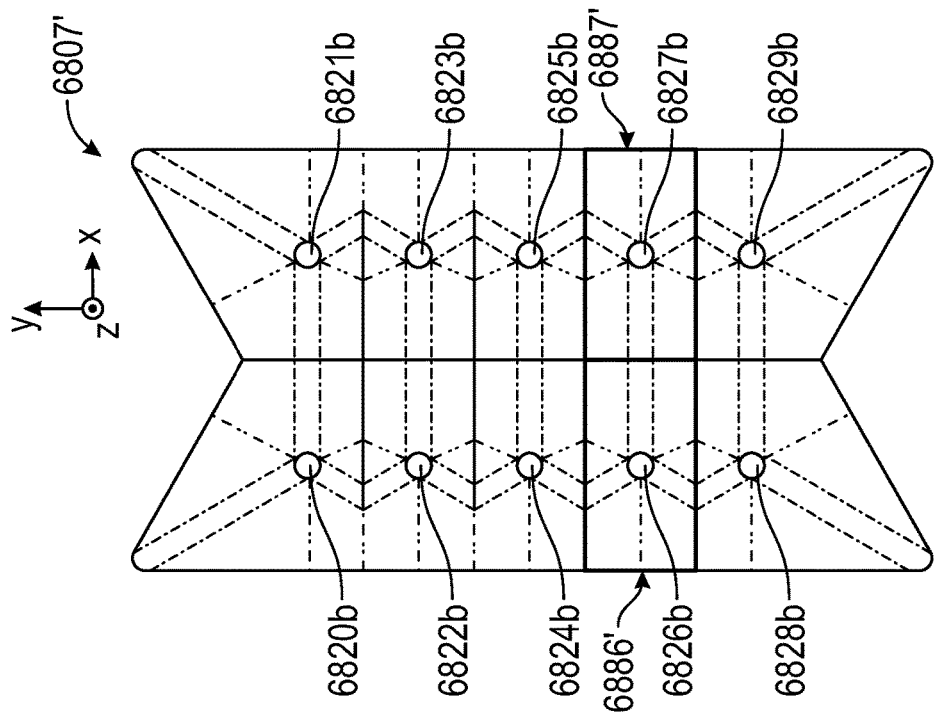
FIGS. 68A, 68B are schematic plan views of structured surfaces, the figures demonstrating how to make PG cube corner elements similar to those of FIGS. 60-62, 67A, and 67B (but in the form of cavities rather than protrusions) by judiciously rearranging the positions of truncated cube corner elements made by end milling.
Figure 68A:
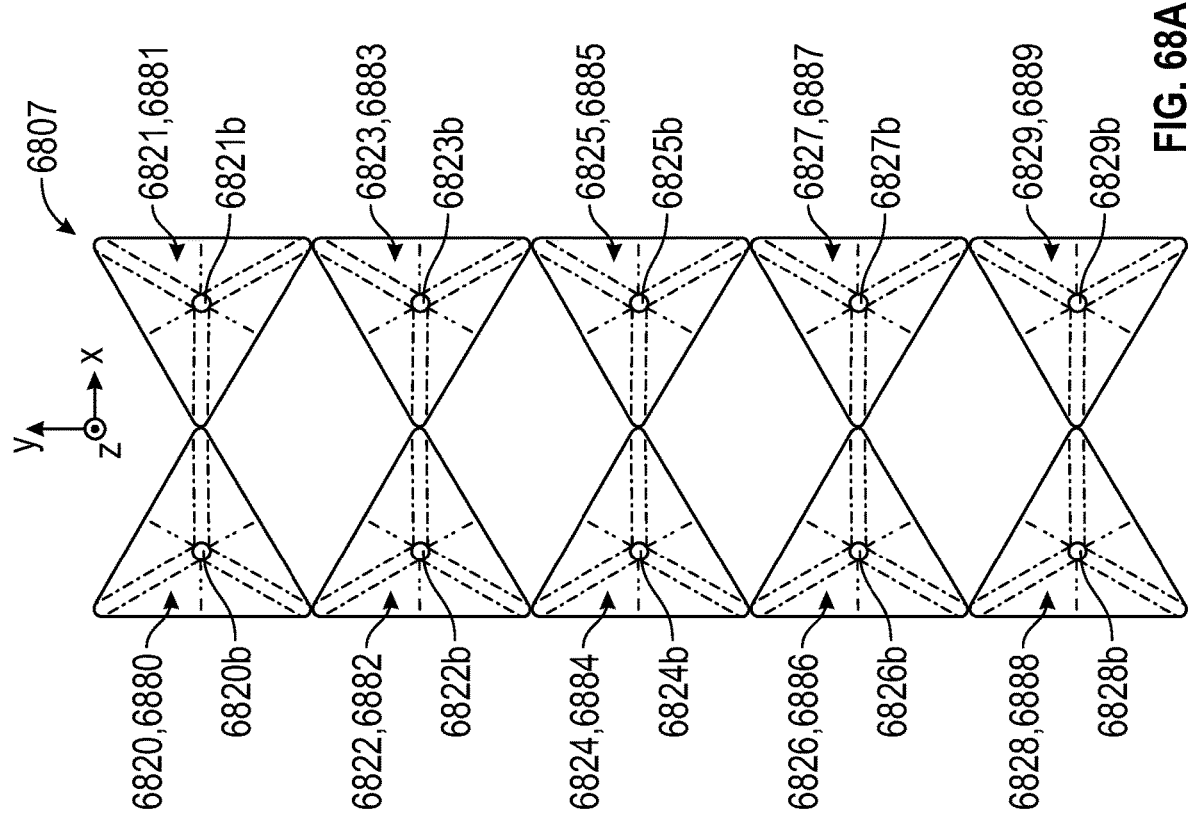

Another way to make PG cube corner elements having rectangular (or square) perimeters like those of FIGS. 60-62, 67A, and 67B is illustrated by the pair of FIGS. 68A, 68B, except that the PG cube corner elements are in the form of cavities or recesses rather than protrusions as in FIGS. 60-62, etc., and the rounded edges are located at dihedral edges rather than non-dihedral edges of the cube corner elements. Thus, in FIG. 68A, a structured surface 6807 has a plurality of recesses 6820 through 6829 formed therein which correspond respectively to (truncated) cube corner elements 6880 through 6889. Each of the recesses 6820, 6822, 6824, 6826, 6828 may be the same as or similar to the recess 4720 described above in connection with FIG. 47. To avoid unnecessary repetition, reference numbers for all the various transition lines, break lines, terminuses, and faces of such recesses are not provided in FIG. 68A, and descriptions are also omitted as unnecessary. Recesses 6821, 6823, 6825, 6827, and 6829 (corresponding respectively to cube corner elements 6881, 6883, 6885, 6887, and 6889) are formed in similar fashion such that cube corner elements 6880, 6881 form a matched pair, and cube corner elements 6882, 6883 form a matched pair, and so forth. The bases of the various cavities, 6820b, 6821b, . . . , 6829b are labeled for convenience to allow us to describe the arrangement or locations of the illustrated cube corner elements. The cube corner elements 6880, 6882, etc., and their bases, are arranged in one row parallel to the y-axis, and the cube corner elements 6881, 6883, etc., and their bases, are arranged in another row parallel to the y-axis, as shown.

Using the cube corner array of FIG. 68A as a reference point, PG cube corner elements having rectangular perimeters in plan view may be made by a combination of (1) reducing the spacing between cube corner elements in each row an appropriate amount (and the same amount), and (2) reducing the spacing between the two rows of cube corner elements an appropriate amount. When these guidelines are followed to form a new (but related) structured surface 6807', the cutting of the end mill partially destroys or obliterates some features of previously formed recess(es) as it moves along cutting paths to form new recess(es). The destruction or obliteration results in the formation of new, sharp edges at places where the overlapping recesses intersect. The result can be seen in the structured surface 6807' of FIG. 68B, where corresponding features to those in FIG. 68A can be seen. The bases 6820b, 6821b, 6822b, etc. of the cavities can be seen to be more closely spaced in both the x- and y-directions, and new sharp edges and new break lines can be seen to define the rectangular perimeter of each cube corner element. Two of the cube corner elements 6886', 6887' are outlined in bold, and can be seen to form a matched pair of PG cube corner elements. One, some, or all of the cube corner elements in an array such as is shown in FIG. 68B may be uncanted, or forward canted, or backwards canted, or symmetrical about the x-z plane, or asymmetrical about such plane.

Additional Discussion

The inclined cutting paths and cutting path segments and portions that produce the rounded edges and flat faces discussed herein can have any number of different configurations. As illustrated and discussed above, such an inclined cutting path can be straight, and can be segmented, with different inclined segments lying in the same vertical plane in some cases, and lying in different vertical planes in other cases. The inclined cutting path can also be curved. Such a curved, inclined cutting path may have a curvature that lies in a single vertical plane, or it may not, e.g. as in the case of a corkscrew-shaped path or portion thereof, and the curvature may be of constant radius or variable radius. In most cases, redesigning an initially straight inclined cutting path by adding a controlled amount of curvature to the path has the effect of causing the associated surfaces formed by the cutting envelope—which surfaces would otherwise be flat faces if a straight cutting path were followed—to deviate from perfect flatness and have a controlled amount of curvature, the curvature of the surfaces being a function of how strongly or weakly curved the inclined cutting path is.

When substantially flat surfaces are desired to be formed, any curvature of the inclined cutting path is preferably small, i.e., having a large radius of curvature. Any given one of the disclosed inclined straight, segmented, or curved cutting paths can be approximated by, and replaced with, a multitude of small individual straight or curved pieces strung together, the collection of which approximates the given cutting path and produces a structure having the same or similar optical, mechanical, or other relevant properties as the original structure. Combinations of all the foregoing inclined cutting paths, whether curved, straight, segmented, or otherwise, are also contemplated herein.

Further in this regard, any or all of the cube corner elements or other structures or microstructures disclosed herein may be modified (by appropriate modification of the cutting paths) to have one or more edges (whether dihedral edges, non-dihedral edges, or both) that are curved, segmented, or both. For purposes of classifying a cube corner element that incorporates such modification(s) as a truncated, or PG, or full cube corner element, the deviation(s) of the edge(s) from straightness may be overlooked or ignored (e.g., a curved edge may be approximated as a straight edge) if the deviations from straightness have a small or minimal effect on the relevant performance characteristics of the cube corner element.

The angles of inclination relative to the plane of the working surface that are discussed herein, e.g., $\alpha$, $\beta$, $\gamma$, $\alpha 1$, $\alpha 2$, etc., may be in any suitable range, e.g. from 1 to 89 degrees, or 10 to 70 degrees, or from 20 to 60 degrees. The polar angle of tilt $\theta$ of the rotational axis of the cutting envelope relative to the z-axis may in many cases be zero. A particularly useful range of $\theta$ when designing and fabricating cube corner elements, ranging from uncanted to canted, is from 0 to 55 degrees.

It is understood that the disclosed end milling process is typically used to make master tooling with the structured surface on the working surface of the substrate of the master tooling. The structured surface corresponding either to the desired microstructured geometry in the finished article or to a negative (inverted) copy thereof, depending upon whether the finished article is to have protrusions or cavities (or both). It is understood that the end mill process may be used along with other direct machining processes to form the various microstructures on the substrate.

To form a master tool of suitable size for forming an article such as retroreflective sheeting, a plurality of toolings (also referred to as tiles) are formed by electroplating the surface of the master tool to form negative copies, subsequently electroplating the negative copies to form positive copies, electroplating the positive copies to form second generation negative copies, etc. The positive copy has the same cube corner element structure as the master tool, whereas the negative copy is the cube cavity replica. Accordingly, a negative copy tool is employed to make a positive copy (i.e., cube corner element) sheeting whereas, a positive copy tool is employed to make a negative copy (i.e., cube corner cavity) sheeting. Further, retroreflective sheeting may comprise combination of cube corner elements and cube corner cavity microstructures. Electroforming techniques such as described in U.S. Pat. No. 4,478,769 (Pricone et al.) and U.S. Pat. No. 6,159,407 (Krinke et al.) are known. Tiling such toolings together can then assemble a master tool of the desired size.

The tooling is then used in an embossing, molding, extruding, cast-and-curing process to form articles. The formed tooling may be desired, or an inverse of the formed tooling. The articles made from molding processes using the tooling will result in the microstructures from the tooling forming on to the articles.

With the disclosed end milling technique, microstructures having edges can be formed into substrates. In particular, microstructures with sharp edges meeting at a corner can be formed. Microstructures with three edges meeting at a corner to form a cube corner element are useful in making retroreflective materials. The end milling techniques described herein demonstrate the ability to make truncated and PG cube corner elements.

Using the techniques described, numerous types of microstructures, including both truncated and non-truncated cube corner elements, can be fabricated with a variety of other shapes and configurations. The microstructures may have outer perimeter shapes in plan view selected from, for example, triangles, rhombuses, trapezoids, rectangles, parallelograms, pentagons, and hexagons, and combinations of these shapes. Many other perimeter shapes, including but not limited to N-pointed star shapes, where N may be 3, 4, 5, 6, etc., are also contemplated.

The term "sheeting" may refer to a thin piece of polymeric (e.g., synthetic) material upon which microstructures have been formed. Sheeting with cube-corner microstructure is used as a retroreflective sheeting. A retroreflective sheeting is useful for a variety of uses such as traffic signs, pavement markings, vehicle markings, and personal safety articles, in view of its high retroreflected brightness.

The sheeting may be of any width and length, such dimensions only being limited by the equipment (e.g., width of the tool, width of the slot die orifice, etc.) from which the sheeting was made. The thickness of sheeting typically ranges from about 0.004 inches (0.1016 mm) to about 0.10 inches (2.54 mm). Preferably the thickness of sheeting is less than about 0.020 inches (0.508 mm) and more preferably less than about 0.014 inches (0.3556 mm). The sheeting may further include surface layers such as seal films or overlays. In the case of retroreflective sheeting, the width is typically at least 30 inches (122 cm) and preferably at least 48 inches (76 cm). The sheeting is typically continuous in its length for up to about 50 yards (45.5 m) to 100 yards (91 m) such that the sheeting is provided in a conveniently handled roll-good. Alternatively, however, the sheeting may be manufactured as individual sheets rather than as a roll-good. In such embodiments, the sheets preferably correspond in dimensions to the finished article. For example, the retroreflective sheeting may have the dimensions of a standard U.S. sign (e.g., 30 inches by 30 inches (76 cm by 76 cm)) and thus the microstructured tool employed to prepare the sheeting may have about the same dimensions. Smaller articles such as license plates or reflective buttons may employ sheeting having correspondingly smaller dimensions.

The retroreflective sheet is preferably manufactured as an integral material, i.e., wherein the cube-corner microstructure elements are interconnected in a continuous layer throughout the dimension of the mold, the individual elements and connections therebetween comprising the same material. The surface of the sheeting opposing the microprismatic surface is typically smooth and planar, also being referred to as the "land layer". The thickness of the land layer (i.e., the thickness excluding that portion resulting from the replicated microstructure) is between 0.001 and 0.100 inches and preferably between 0.003 and 0.010 inches. Manufacture of such sheeting is typically achieved by casting a fluid resin composition onto the tool and allowing the composition to harden to form a sheet. A preferred method for casting fluid resin onto the tool is described in U.S. Pat. No. 7,410,604 (Erickson et al.).

Optionally, however, the tool can be employed as an embossing tool to form retroreflective articles, such as described in U.S. Pat. No. 4,601,861 (Pricone et al.). Alternatively, the sheeting can be manufactured as a layered product by casting the cube-corner elements against a preformed film as taught in PCT publication WO95/11464 (Benson Jr. et al.) and U.S. Pat. No. 3,684,348 (Rowland), or by laminating a preformed film to preformed cube-corner elements. In doing so the individual cube-corner elements are interconnected by the preformed film. Further, the elements and film are typically comprised of different materials.

In the manufacture of the sheeting, it is preferred that the channels of the tool are roughly aligned with the direction of the advancing tool as further described in U.S. Pat. No. 6,884,371 (Smith). Accordingly, prior to any further manufacturing steps, the primary groove of the sheeting would be substantially parallel to the edge of the roll of the sheeting.

A variety of suitable resin compositions for the sheeting can be used so long as the resin can be formable into the desired configuration. For retroreflective sheeting that will be used outdoors, the resin is typically a transparent material that is dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers, or other additives.

When making a retroreflective sheeting, a specular reflective coating such as a metallic coating can be placed on the backside of the cube-corner elements. The metallic coating can be applied by known techniques such as vapor depositing or chemically depositing a metal such as aluminum, silver, or nickel. A primer layer may be applied to the backside of the cube-corner elements to promote the adherence of the metallic coating. In addition to or in lieu of a metallic coating, a seal film can be applied to the backside of the cube-corner elements; see, for example, U.S. Pat. No. 4,025,159 (McGrath) and U.S. Pat. No. 5,117,304 (Huang et al.). The seal film maintains an air interface at the backside of the cubes that enables total internal reflection at the interface and inhibits the entry of contaminants such as soil and/or moisture. A layer of barrier elements may be used on a pressure sensitive adhesive layer to form the air interface at the backside of the cubes that enables total internal reflection at the interface and inhibits the entry of contaminants, such as disclosed in U.S. Patent Application Publication 2013/0034682 (Free et al.).

A separate overlay film may be utilized on the viewing surface of the sheeting for improved (e.g., outdoor) durability or to provide an image receptive surface. Indicative of such outdoor durability is maintaining sufficient brightness specifications such as called out in ASTM D4956-16b after extended durations of weathering (e.g., 1 year, 3 years). Further, the daytime luminance factor (CapY) is preferably greater than 30 before and after weathering.

An adhesive layer also can be disposed behind the cube-corner elements or the seal film to enable the cube-corner retroreflective sheeting to be secured to a substrate. Suitable substrates include wood, aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

For articles formed from a substrate comprising a structured surface made using the disclosed end milling process (or an inverse of structured surface), the formed article will take the shape of the structured surface of the substrate and will include the features of the structured surface of the substrate as described above.

For example, when using the end milling process where cuts of different lateral direction, thickness direction, or varying angles of the end mill axis, varying orientations of the resulting microstructure can be formed. For example, when making a cube-corner microstructure, dihedral angle errors can be introduced. It may be desirable to introduce such errors to improve the uniformity of total light return (TLR).

Therefore, it is possible to form truncated cubes that are symmetrical or are tilted, for example forward or backward canted. See U.S. Pat. No. 5,565,151 (Nilsen) and U.S. Pat. No. 4,588,258 (Hoopman). Canting of PG cube corner elements is described in U.S. Pat. No. 6,015,214 (Heenan et al.).

Therefore, it is possible to form full cube corner element or PG cube corner elements with skew and inclination. See U.S. Pat. No. 9,470,822 (Smith).

Articles containing microstructures may be used for a variety of applications where microstructures having generally planar surfaces and edges are useful. For example, articles containing microstructures can be used as abrasive materials or for directing light or noise.

Further Discussion of Non-Orthogonal Cube Corner Elements

As already explained, the above teachings can be used to make articles comprising cube corner elements, and articles comprising arrays of cube corner elements, that incorporate dihedral angle errors between at least two optical faces of a given cube corner element, or between portions of such at least two optical faces. These dihedral angle errors can be applied to any of the cube corner elements disclosed herein. In some cases, different dihedral angle errors can be applied to different constituent faces of one or more compound faces of one or more cube corner elements. In some cases, the dihedral angle errors can be applied equally to the constituent faces of one or more compound faces of one or more cube corner elements. In some cases, dihedral angle errors can be applied in patterns other than rows of cube corner elements. The angle errors of interest fall generally within a range from 1 minute of arc to 2 degrees, or from 1 or 2 minutes of arc to 70 minutes of arc, or from 1 or 2 minutes of arc to 40 minutes of arc. Since a given angle error may either add to or subtract from a nominally 90 degree dihedral angle, these ranges of course refer to the magnitude of the angle errors of interest.

Arrays of non-orthogonal cube corner elements made by the disclosed end milling method can also (if desired) be made to satisfy the condition that an optical face of a given cube corner element (or at least a portion thereof) is coplanar with at least one optical face (or portion thereof) of an adjacent cube corner element. But in general, arrays of non-orthogonal cube corner elements made by the disclosed end milling method can be made such that this condition is not satisfied for one, some, or all cube corner elements in the array.

Using the disclosed end milling techniques, non-orthogonal cube corner elements can be made by making small adjustments to the cutting parameters so that one or more of the various faces that make up the cube corner element are reoriented to deviate a small but significant amount from orthogonality relative to other faces of the cube corner element that are nominally perpendicular, the small deviation referred to as a dihedral angle error. The small adjustments to the cutting parameters can include an adjustment to one, some, or all of:

the dimensions of the cutting envelope of the rotating end mill, e.g. in terms of Dtop, Dbot, and THA of FIG. 5C, or the orientation of the cutting envelope, e.g. in terms of the polar angle $\theta$ or the azimuthal angle $\phi$ of FIG. 33, or the geometry of the inclined cutting paths, e.g. in terms of the inclination angles $\alpha$ or $\beta$, or the angle $\Phi$ between vertical cutting planes of FIG. 37, relative to sets of such parameters that produce a strictly orthogonal cube corner element, so as to produce reconfigured or modified cube corner elements, i.e., non-orthogonal cube corner elements.

Figure 69:
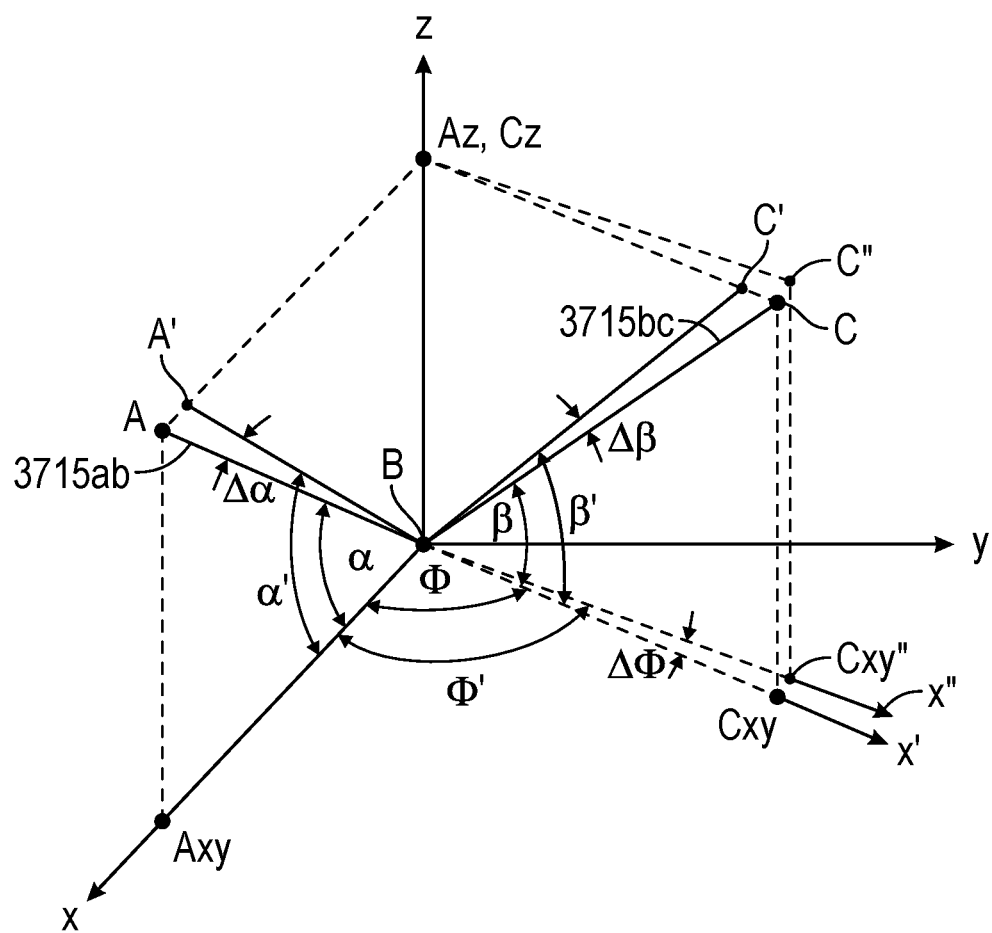
FIG. 69 is a schematic view of various paths for a rotating end mill including segments that lie in different vertical planes, in similar fashion to FIG. 37 but further illustrating small angular deviations relative to a nominal path or path segment.

Some adjustments to the geometry of inclined cutting paths are illustrated schematically in FIG. 69. This figure, which is best understood in comparison to FIG. 37, shows a nominal path having two distinct segments or portions, one from point A to point B (or vice versa), labeled 3715*ab*, and one from point B to point C (or vice versa), labeled 3715*bc*. For purposes of FIG. 69, we assume these paths 3715*ab*, 3715*bc* are two of the several cutting paths used by end milling tool(s) to form a strictly orthogonal truncated or PG cube corner element. Small deviations or adjustments are represented by alternative points A', C', and C". The point A' introduces an increment $\Delta\alpha$ to change the original inclination angle $\alpha$ to an adjusted inclination angle $\alpha'$. The point C' introduces an increment $\Delta\beta$ to change the original inclination angle $\beta$ to an adjusted inclination angle $\beta'$. The point C" introduces an increment $\Delta\Phi$ to change the original intersection angle $\Phi$ (between the vertical planes containing paths AB and BC respectively) to an adjusted inclination angle $\Phi'$, the adjusted path B-C' also defining a new or revised x"-z vertical plane. The small adjustments represented by points A', C', or C" may be suitable to reorient one or more optical faces of a truncated or PG cube corner element (or portions of such optical faces) so that they deviate from orthogonality relative to other optical faces of the cube corner element by a dihedral angle error. Of course, small adjustments to the geometry of the inclined cutting paths may also or alternatively be accomplished by shifting the position of the point B in FIG. 69 by a small amount along any desired axis or direction.

Figure 70:
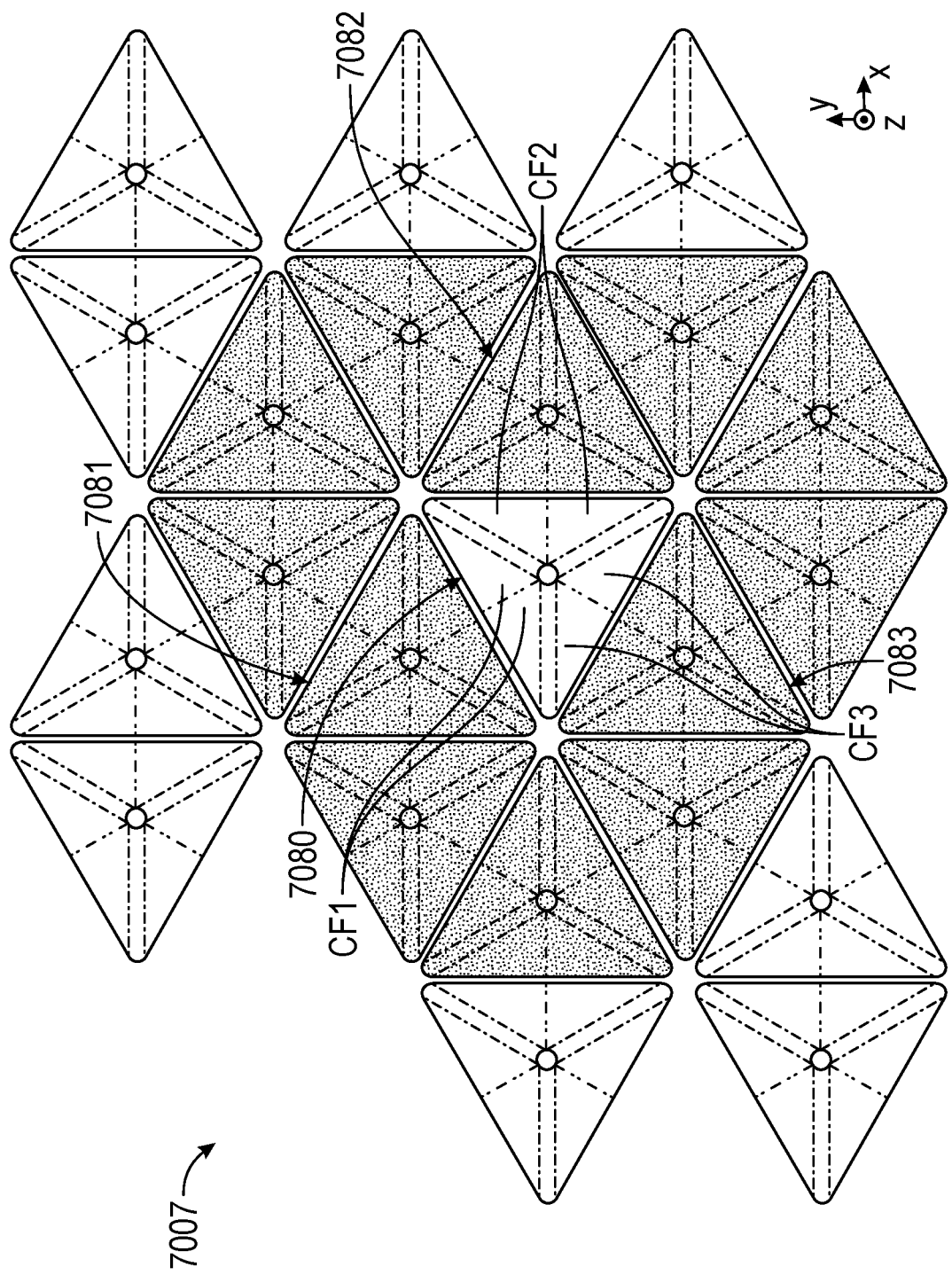
FIG. 70 is a schematic plan view of an array of cube corner elements similar to that of FIG. 51, but where a given cube corner element is made to have dihedral angle errors, and where cube corner elements that are adjacent to the given cube corner element are identified by shading.

FIG. 70 shows a structured surface 7007 in which is formed an array of cube corner elements similar to that of FIG. 51, but where a given cube corner element 7080 is made to have one or more dihedral angle errors by adjusting one or more cutting parameters as discussed above. Similar to the cube corner element 5081 (FIG. 50) and the cube corner element 5181 (FIG. 51), the cube corner element 7080 has three compound optical faces CF1, CF2, and CF3 that are nominally mutually orthogonal, all of which have been made by the end milling technique disclosed herein. However, at least one of the compound faces of cube corner element 7080 has been reoriented, by appropriate adjustment of the cutting parameters of its two constituent faces, so that such compound face deviates from orthogonality relative to one or both of the other optical faces. For example, optical face CF1 may be perpendicular to optical face CF2 but may have a dihedral angle error relative to optical face CF3. Alternatively, optical face CF1 may have a first dihedral angle error relative to optical face CF2, and a second dihedral angle error relative to optical face CF3.

Because the end milling technique allows each cube corner element in the array of FIG. 70 to be formed individually, independent of every other cube corner element in the array, it is possible to adjust the orientation of each optical face independently, not constrained by the requirement that optical faces along a row or line of cube corner elements must be coplanar with each other, or by the corollary requirement that an optical face of a given cube corner element must be coplanar with an optical face of an adjacent cube corner element. In that regard, every cube corner element that is adjacent to the cube corner element 7080 is identified in FIG. 70 by shading There are 12 such shaded, adjacent cube corner elements, with three of them— cube corner elements 7081, 7082, and 7083—being adjacent due to having a substantially common or shared non-dihedral edge with the cube corner element 7080, and the remaining nine being adjacent due to having a substantially common or shared point or corner with the cube corner element 7080.

The optical face CF1 of cube corner element 7080 may thus be reoriented to have a dihedral angle error with one or both of the optical faces CF2, CF3, without reorienting any of the optical faces of the adjacent cube corner elements. Additionally or instead, the optical face CF2 may be reoriented to have a dihedral angle error with one or both of the optical faces CF1, CF3, without reorienting any of the optical faces of the adjacent cube corner elements. Additionally or instead, the optical face CF3 may be reoriented to have a dihedral angle error with one or both of the optical faces CF1, CF2, without reorienting any of the optical faces of the adjacent cube corner elements. In all of these cases, as well as in cases where optical face(s) of the adjacent cube corner elements are reoriented in a different manner than with cube corner element 7080, the resulting non-orthogonal cube corner element 7080 will have at least one optical face that (1) deviates from orthogonality with one or both of the remaining optical faces by a dihedral angle error, and that (2) is not coplanar with (i.e., does not lie in the same plane as) any optical face of any adjacent cube corner element. In straightforward fashion, such selective, individualized reorientation of cube corner element optical face(s) can be practiced in other types of cube corner element arrays, including arrays comprising truncated cube corner elements, PG cube corner elements, full cube corner elements, or canted cube corner elements, including but not limited to the cube corner elements any of FIGS. 52, 53, 56A, 56B, 57, 59, 67A, 67B, 68A, and 68B. The foregoing conditions can be met even in cases where (1) the subject cube corner element (such as cube corner element 7080) has a base triangle or other base that is parallel to, or even coplanar with, corresponding bases of some or all of its adjacent cube corner elements, or (2) the subject cube corner element together with some or all of its adjacent cube corner elements are not fractured (i.e., they are intact) along their bases.

Cube corner elements made by the disclosed end milling technique may have at least one compound optical face, or at least two compound optical faces, and in many cases, all three of the optical faces of each cube corner element are compound in nature, i.e., made up of two distinct, constituent faces separated by a break line, as discussed above in connection with FIGS. 39-43. Furthermore, different cutting steps are used to form the constituent faces of a given compound face. In some cases, e.g. as discussed above in connection with FIG. 70, adjustments to the cutting parameters can be selected to preserve the integrity of each compound face, i.e., to maintain parallelism between the constituent faces of each compound face. In other cases, the adjustments to the cutting parameters can be selected to provide a non-orthogonal cube corner element in which the constituent faces of a given compound face deviate substantially from parallelism, e.g. by at least 1 minute of arc but no more than 2 degrees, or by at least 1 or 2 minutes of arc but no more than 70 minutes of arc, such that at least one of those constituent faces has a substantial dihedral angle error relative to other optical faces of the cube corner element, or portions thereof. One such embodiment is depicted schematically in FIG. 71. The adjustment of individual constituent faces allows for more design degrees of freedom than adjusting the compound faces as intact pairs of constituent faces. For example, in a cube corner element in which all three optical faces are compound faces (for a total of six constituent faces), at one extreme, only one of the six constituent faces may be reoriented or adjusted to produce dihedral angle errors, while at the other extreme, all six constituent faces may be reoriented or adjusted to produce dihedral angle errors. Between those extremes, other numbers of constituent faces may be reoriented. This provides greater design flexibility in tailoring the geometry of the cube corner element, and thus greater design flexibility in tailoring the divergence profile or other light return pattern created by the cube corner element(s).

FIG. 71 shows in plan view a single cube corner element in which the orientation of at least one constituent face of a compound optical face has been adjusted (relative to a strictly orthogonal cube corner element) by adjusting one or more cutting parameters to provide a non-orthogonal cube corner element. This figure is schematic, or not to scale, insofar as the actual angular deviations depicted in the figure, and reported in the description, are larger than would be suitable to make a non-orthogonal cube corner element. Stated differently, the deviations shown in the figure produces a structure that would have little or no utility as a cube corner element because the deviations from orthogonality are so large. The excessive deviations are however useful to provide a drawing that allows the reader to appreciate the changes made to the geometry of the cube corner element.

Although FIG. 71 shows only one cube corner element, the present disclosure contemplates matched pairs of such cube corner element, as well as arrays of such cube corner elements, and arrays that include different types of cube corner elements. Furthermore, although the cube corner element of FIG. 71 is described as a recess or cavity, the present disclosure also contemplates structured surfaces in which inverted counterparts of recesses are provided as protrusions, e.g. by suitable replication processes. The disclosed non-orthogonal cube corner elements, whether cavities or protrusions, may have transverse dimensions as disclosed above, and may be or comprise microstructures.

Turning then to FIG. 71, we see there a recess 7120 configured as a cube corner element 7180. The cube corner element 7180 can be made with a rotating end mill in like fashion to cube corner element 4780 (see FIG. 47) described above, except that one or more cutting parameters have been adjusted to provide at least one dihedral angle error (relative to 90 degrees) between optical faces of the cube corner element. The cube corner element 7180 includes: a base 7120b; rounded edges 7151, 7152, 7153, with associated transition lines 7151a, 7151b, 7152a, 7152b, 7153a, 7153b, and terminuses 7151t, 7152t, and 7153t; a perimeter 7120p; and faces 7141b, 7142a (forming a first compound optical face), 7142b, 7143a (forming a second compound optical face), and 7143b, 7141a (forming a third compound optical face), the three optical faces being nominally mutually orthogonal to each other. These elements all have substantial counterparts in the cube corner element 4780 (even though some counterparts may not be identical), and require no further explanation.

The three inclined cutting paths or path segments used to form the cube corner element 7180 lie in different vertical planes as shown in FIG. 71, namely: the x-z plane, responsible for forming the rounded edge 7151; the x'-z' plane, responsible for forming the rounded edge 7152; and the x"-z" plane, responsible for forming the rounded edge 7153. The x-z plane intersects the x'-z' plane at an angle $\Phi 1$, the x'-z' plane intersects the x"-z" plane at an angle $\Phi 2$, and the x"-z" plane intersects the x-z plane at an angle $\Phi 3$, these angles not labeled in FIG. 71. The cube corner element 7180 differs from cube corner element 4780 by a counterclockwise rotation of the x-z plane about the z-axis (from the point of view of FIGS. 47 and 71) by 10 degrees, while keeping all other cutting parameters the same. This adjustment results in $\Phi 1=130$ degrees, $\Phi 2=120$ degrees, $\Phi 3=110$ degrees (in comparison to FIG. 47, where $\Phi 1=\Phi 2=\Phi 3=120$ degrees).

With regard to the compound faces of the cube corner element 7180, face 7142b and face 7143a are substantially coplanar and parallel, and they meet along a break line 7172. Due to the adjusted value of the angle $\Phi 3$, the faces 7141a, 7143b deviate from parallelism but still form a compound face, and meet along a break line 7173. Due to the adjusted value of the angle $\Phi 1$, the faces 7141b, 7142a deviate from parallelism but still form a compound face and meet along a group of closely spaced features (curved side surface 7131b, transition line 7161b, and transition line 7162a), which we identify collectively as an effective break line 7171.

Table 1 below shows the various angle errors embodied in the cube corner element 7180 between its various faces. The angles reported in this table are accurate for the excessive angular deviation (10 degree rotation of the x-z plane) illustrated in the figure. The reader will understand, however, that when much smaller deviations are used (e.g., $\frac{1}{10}^{th}$ of the illustrated deviation), the magnitude of the angles in the table will be similarly reduced. All angle values in the table are given in degrees of arc, and represent angle errors relative to 90 degrees, except for values marked with an asterisk (*), which represent angle errors relative to 0 degrees (parallel condition). In the table, CF1a refers to face 7141b, CF1b refers to face 7142a, CF2a refers to face 7142b, CF2b refers to face 7143a, CF3a refers to face 7143b, and CF3b refers to face 7141a.

TABLE 1

Angle Errors for FIG. 71

|  | CF1a | CF1b | CF2a | CF2b | CF3a | CF3b |
|---|---|---|---|---|---|---|
| CF1a |  | −8.162* | −5.462 | −5.462 | 6.046 | 0 |
| CF1b |  |  | 0 | 0 | 0 | −5.462 |
| CF2a |  |  |  | 0* | 0 | 6.046 |

TABLE 1-continued

Angle Errors for FIG. 71

| | CF1a | CF1b | CF2a | CF2b | CF3a | CF3b |
|---|---|---|---|---|---|---|
| CF2b | | | | | 0 | 6.046 |
| CF3a | | | | | | 8.162* |
| CF3b | | | | | | |

Further examples or types of non-orthogonal cube corner elements (cube corner elements having at least one dihedral angle error) can be achieved in similar fashion to FIG. 71, by reorienting more or others of the six constituent faces that form the three optical faces of the cube corner element.

These same principles and techniques for forming non-orthogonal cube corner elements by adjusting one or more of the cutting parameters can also be applied in straightforward fashion to every other type of cube corner element disclosed herein, including truncated cube corner elements, full cube corner elements, PG cube corner elements, canted cube corner elements, matched pairs of cube corner elements, uniform or non-uniform arrays of cube corner elements, and so forth.

Further Discussion of Security Articles

Figure 72:
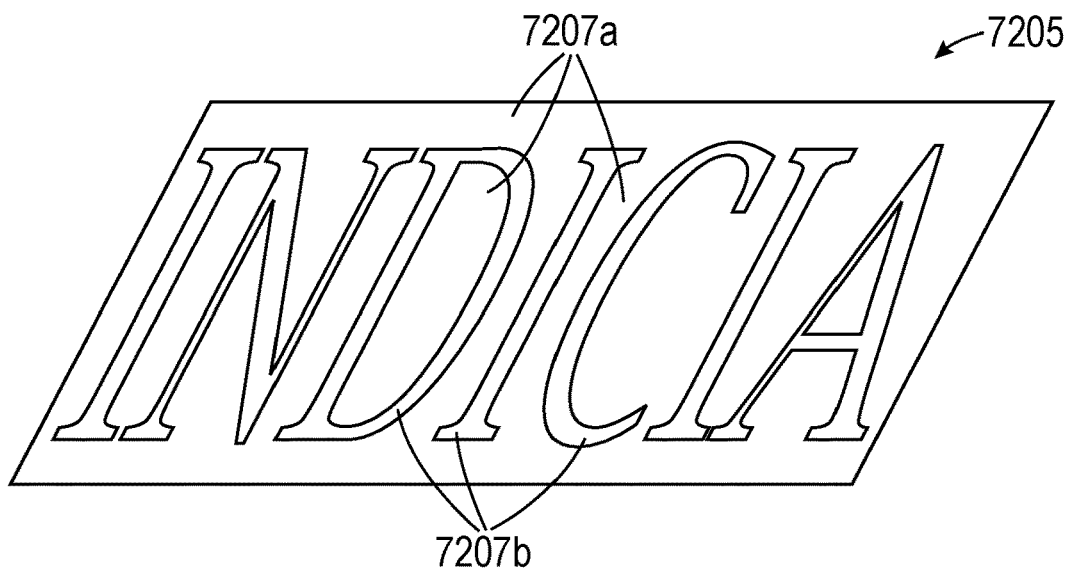
FIG. 72 is a schematic plan view of a security article in which the structured surface of a substrate has complementary or otherwise different first and second regions or zones that define an indicia.

The foregoing principles and teachings can be used to make articles that incorporate one or more security images, and articles that incorporate a detectable indicia as described above. Such a security article is depicted schematically in FIG. 72. In that figure, a substrate 7205, which may be the same as or similar to any of the other structured surface articles described herein, has a structured surface divided into at least first portions 7207*a*, in first regions or zones, and second portions 7207*b*, in second regions or zones. The first and second regions may be complementary, e.g. as a foreground and a background, or they may be otherwise non-overlapping in nature. The structured surface, which we refer to collectively with reference number 7207, may be a working surface or a replicated surface of the substrate 7205. The first and second portions 7207*a*, 7207*b* and their respective regions are configured to define an indicia. The indicia may be or comprise one or more alphanumeric characters, symbols, logos, or other discernable pattern, mark, group of marks, or portion(s) thereof that can serve e.g. as an indication of authenticity for the security article itself, or for another product to which the security article is attached or otherwise combined, or that can otherwise convey information.

The indicia is visible or otherwise detectable due to a suitable arrangement or distribution of microstructures on the structured surface 7207 in the first or second regions, which microstructures may be any of the microstructures disclosed herein, whether cube corner elements, non-cube corner elements, or combinations thereof. For example, within the boundaries of the first portions 7207*a*, the structured surface 7207 may comprise only first microstructures, while only second microstructures (different from the first microstructures) may be included within the boundaries of the second portions 7207*b*. Numerous combinations of first and second microstructures are possible, and are contemplated by the present disclosure. At least one, and preferably both, of the first and second microstructures comprise microstructures that are made directly or indirectly (e.g. via one or more replication processes) by the end milling techniques disclosed herein.

Thus, for example, each of the first microstructures may be a teardrop-shaped structure as shown in FIG. 21 or 22, or another non-cube corner structure as shown in any of FIG. 28-32, 38, 44, or 45, for example. In some cases, each of the second microstructures in the structured surface of the security article may then be the same type of structure as the first microstructures, but modified in some way that produces a visual distinction from the standpoint of the ultimate end-user of the article. For example, each second microstructure may be the same as each first microstructure, except reduced or enlarged by a uniform scaling factor, or changed in orientation e.g. by a rotation about the z-axis (surface normal direction) of the structured surface, or spaced apart from its neighboring second microstructures by a different amount (more densely packed or more sparsely packed) than the relative spacing of the first microstructures, and so forth. In other cases, the second microstructures may be different types of structures relative to the first microstructures. For example, the first microstructures may be of the teardrop type as shown in FIG. 21 or 22, while the second microstructures may be of the type shown in any of FIG. 28-32, 38, 44, or 45.

In still other cases, the first microstructures, the second microstructures, or both may be cube corner elements. Thus, for example, the first microstructures may be any of the cube corner elements disclosed herein made by the end milling technique, whether truncated or PG or full, whether canted or uncanted, whether symmetrical or asymmetrical, whether possessing any dihedral angle errors, and whether triangular, hexagonal, pentagonal, or quadrilateral in perimeter shape, for example. In some cases, each of the second microstructures in the structured surface of the security article may then be non-cube corner elements, e.g., any of the non-cube corner structures disclosed herein. In other cases, each of the second microstructures may be the same type of cube corner element as the first microstructures, but modified in some way that produces a visual distinction from the standpoint of the ultimate end-user of the article, e.g., reduced or enlarged by a uniform scaling factor, or changed in orientation e.g. by a rotation about the z-axis (surface normal direction) of the structured surface, or spaced apart from its neighboring second microstructures by a different amount (more densely packed or more sparsely packed) than the relative spacing of the first microstructures, and so forth. In still other cases, the second microstructures may be different cube corner elements than the first microstructures. For example, if the first microstructures are truncated cube corner elements, the second microstructures may be PG or full cube corner elements. Or if the first microstructures are canted cube corner elements, the second microstructures may be uncanted cube corner elements, or cube corner elements canted by a different amount or in an opposite sense (e.g. backwards versus forwards) than the first microstructures. Or if the first microstructures are cube corner elements with no dihedral angle errors, the second microstructures may be cube corner elements with one or more dihedral angle error. Or if the first microstructures are cube corner elements with one or more dihedral angle error, the second microstructures may be cube corner elements with no dihedral angle errors, or different dihedral angle errors than the first microstructures.

In many cases, the visual distinction or contrast between the first and second regions of the structured surface, as viewed by the ordinary end-user of the article, may change significantly as a function of illumination geometry, or observation geometry, or both, such that the visibility of the indicia also changes significantly as a function of those parameters. For example, in some cases where the first and second regions both contain cube corner elements, the appearance of the two regions may be substantially the same or very similar in ordinary ambient lighting conditions, such that the visibility of the indicia formed by those regions is very low. But, due to the directional nature of light return by cube corner elements, that same security article may provide a high visibility for the indicia under retroreflective lighting conditions, e.g., where incident light impinges on the article along an illumination axis, and the user observes the article along an observation axis, and the illumination axis and the observation axes are parallel or nearly parallel. In such cases, the visibility of the indicia would typically change as a function of the angle between the illumination axis and the observation axis.

Example 1

Non-Canted Full Cubes with Pseudo-Randomized MNO

An array of full (PG) cube corner elements similar to that of FIG. 68B, but containing thousands of cube corner elements, and where the cube corner elements all had rectangular perimeters whose aspect ratio was close to 1.7, was cut in the surface of a hard copper substrate using only a rotating end mill, whose motion was computer controlled to make all the cuts necessary to form all the faces in the array. The hard copper substrate was nominally 25.4 mm thick. A primary set of six cuts was used to form six rounded edges and six compound faces, such compound faces forming a matched pair of cube corner elements analogous to cube corner elements 6886', 6887' in FIG. 68B. The end mill used was a diamond end mill substantially as shown in FIGS. 5A-5D, with a taper angle per side (THA) equal to 36.264 degrees, and a tip diameter (Dbot) equal to 60 micrometers. The substrate was of a type shown in FIG. 1 and included a working surface 107. For all faces of the array, the end mill was positioned relative to the substrate such that the axis of rotation of the end mill was perpendicular to the working surface as shown in FIG. 6A. That is, the cutting envelope was not tilted, and the polar angle θ was zero.

In preparation for the cutting, the flat tip of the end mill was placed at the top, flat surface of the substrate, and was then moved away from the substrate a vertical distance of approximately 0.042 mm above the surface. This vertical position (Z coordinate) was then set to be zero at this location.

A sequence of cuts was then made in the working surface to form the first two non-orthogonal cube corner elements in a closely packed array of non-orthogonal cube corner elements, by moving the rotating end mill along a path defined by the Cartesian coordinates provided in Table 2 below. The initial (X,Y) coordinate of (0,0) was assigned to a particular location on the substrate. The X, Y, and Z values in Table 2 follow a standard Cartesian coordinate system, with the plane defined by Z=−0.042 mm corresponding to the initially smooth, flat working surface of the substrate, and positive Z values located above the working surface. In comparison to the x, y, z axes shown in FIG. 68B, the X, Y, Z axes of Table 2 correspond to a 90 degree counterclockwise rotation of the x, y, z axes about the z-axis.

Before executing the sequence of cuts, a total of nine random numbers between −0.005 mm and +0.005 mm were selected. For instance, three random values were selected and assigned to RandX1, RandX2, RandX3, three more random values were selected and assigned to RandY1, RandY2, RandY3, and a final three random values were selected and assigned to RandZ1, RandZ2, RandZ3. As shown in Table 2, these random numbers were applied as offsets to nominal X, Y, Z coordinates, the nominal coordinates being those that produce strictly orthogonal cube corner elements and 90 degree dihedral angles. The random numbers were not applied to coordinates that correspond to the bases of the cavities (positions 3 and 10 for one cube corner element, positions 10 and 12 for the other) so that the base positions throughout the array would produce a well-defined, regular grid, but in alternative embodiments offsets can also, or instead, be applied to the base positions.

TABLE 2

| | Path of Rotating End Mill | | |
|---|---|---|---|
| Position | X | Y | Z |
| 1 | 0 | 0 | 0.01 |
| 2 | 0 + RandX1 | 0 + RandY1 | −0.1633 + RandZ1 |
| 3 | 0.2 | 0.1155 | −0.3266 |
| 4 | 0.2 + RandX2 | 0.2309 + RandY2 | −0.2449 + RandZ2 |
| 5 | 0.2 | 0.3464 | −0.3266 |
| 6 | 0 + RandX3 | 0.4619 + RandY3 | −0.1633 + RandZ3 |
| 7 | 0 + RandX3 | 0.4619 + RandY3 | 0.01 |
| 8 | 0.4 + RandX1 | 0 + RandY1 | 0.01 |
| 9 | 0.4 + RandX1 | 0 + RandY1 | −0.1633 + RandZ1 |
| 10 | 0.2 | 0.1155 | −0.3266 |
| 11 | 0.2 + RandX2 | 0.2309 + RandY2 | −0.2449 + RandZ2 |
| 12 | 0.2 | 0.3464 | −0.3266 |
| 13 | 0.4 + RandX3 | 0.4619 + RandY3 | −0.1633 + RandZ3 |
| 14 | 0.4 + RandX3 | 0.4619 + RandY3 | 0.01 |

The rotating end mill formed a first cut (and a first rounded edge and first pair of flat faces) in the substrate as the end mill moved from position 2 to 3. A second cut was formed (along with a second rounded edge and a second pair of flat faces) when the end mill moved from position 3 to 4. A third cut was formed (and a third rounded edge and a third pair of flat faces) when the end mill moved from position 4 to 5. A fourth cut was formed (and a fourth rounded edge and a fourth pair of flat faces) when the end mill moved from position 5 to 6. A fifth cut was formed (and a fifth rounded edge and a fifth pair of flat faces) when the end mill moved from position 9 to 10. A sixth cut was formed (and a sixth rounded edge and a sixth pair of flat faces) when the end mill moved from position 12 to 13. Having finished these cuts, the first, second, and fifth rounded edges formed dihedral edges of a first cube corner element, and the third, fourth, and sixth rounded edges formed dihedral edges of a second (matched pair) cube corner element, the three optical faces of each cube corner element being compound faces. As a result of the random offsets provided by the random numbers, the constituent faces of each compound face were in general not precisely parallel to each other, and the nominally orthogonal dihedral angles between optical faces (and portions thereof) contained angle errors as discussed above. Each cube corner element had a depth (below the initial flat surface of the substrate) of 284.6 micrometers.

Having formed the two non-orthogonal cube corner elements, the same procedure was carried out in a step-and-repeat fashion to form more pairs of cube corner elements, by applying a local coordinate offset to reposition the (0,0) (X,Y) coordinate to a new location on the substrate. For each new repetition of the sequence of six cuts, a new set of nine random values between −0.005 mm and +0.005 mm were selected, such that sequentially formed pairs of cube corner elements would have different orientations of their respective faces and different sets of dihedral angle errors. (However, the random number generator used a technique based on a fractal pattern, and as a result, only a limited number— on the order of several dozen—of unique sets of nine random values were used, and after the last such unique set was used, the same sets of random numbers were used again, in the same order, to form the next pairs of cube corner elements during the step-and-repeat process. This re-use of the random value sets, combined with the methodical progression of the step-and-repeat process along a given direction, produced a pattern that was substantially larger than the size of the cube corner elements and visually apparent to an observer of the machined substrate.) In all, the six cut sequence was stepped and repeated 76 times in the X direction at a pitch spacing of 0.4 mm, and 38 times in the Y direction at a pitch spacing of 0.4619 mm. This produced an array of well over 5,000 non-orthogonal cube corner elements, each having a rectangular perimeter in plan view with side dimensions of 400 micrometers in the X direction and 231 micrometers in the Y direction, the array filling a rectangular area on the substrate about 30 mm in the X direction and 18 mm in the Y direction.

Alongside this first rectangular array of non-orthogonal PG cube corner elements on the same substrate, a substantially similar second array of cube corner elements was formed by the same end milling procedure and the same step-and-repeat procedure, except that the random number values were all zero so that constituent faces of every cube corner element in this second array were parallel to each other, and the nominally orthogonal dihedral angles between optical faces (and portions thereof) did not contain any significant angle errors as discussed above. Thus, substantially all the cube corner elements in the second array were strictly orthogonal PG cube corner elements.

Figure 73A:
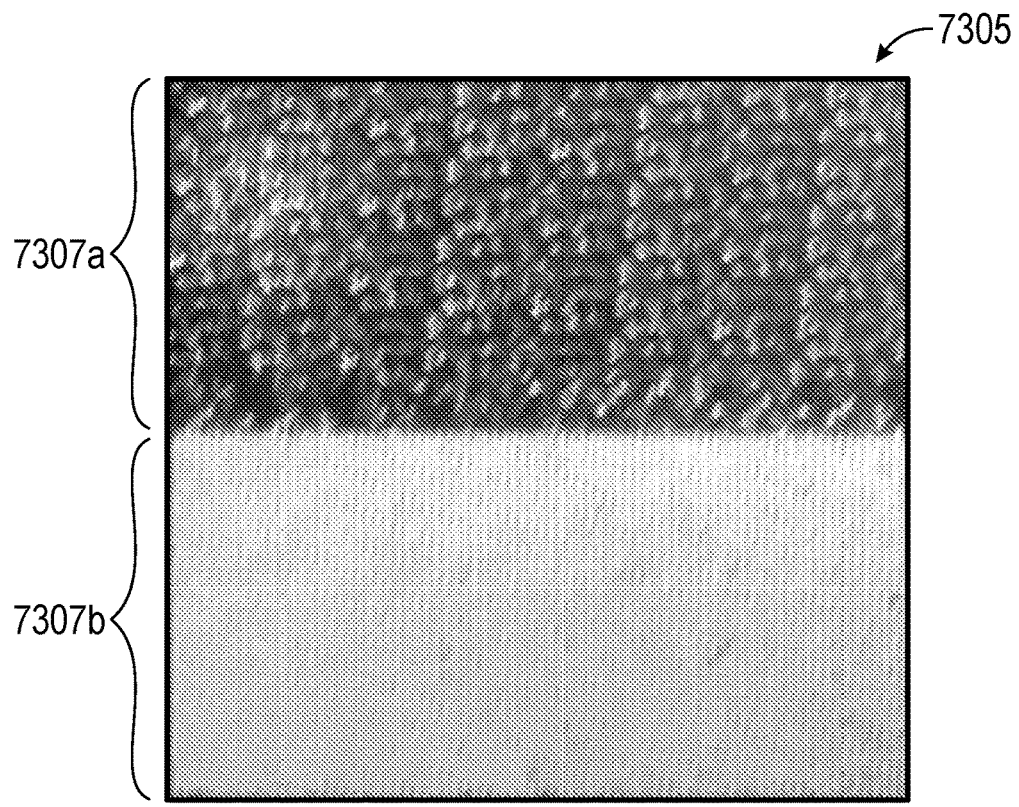
FIG. 73A is a picture of a retroreflective cube corner article, suitable for use as a security article, in which some PG cube corner elements in one zone of the article incorporate substantial dihedral angle errors, the picture taken at a small observation angle.
Figure 73B:
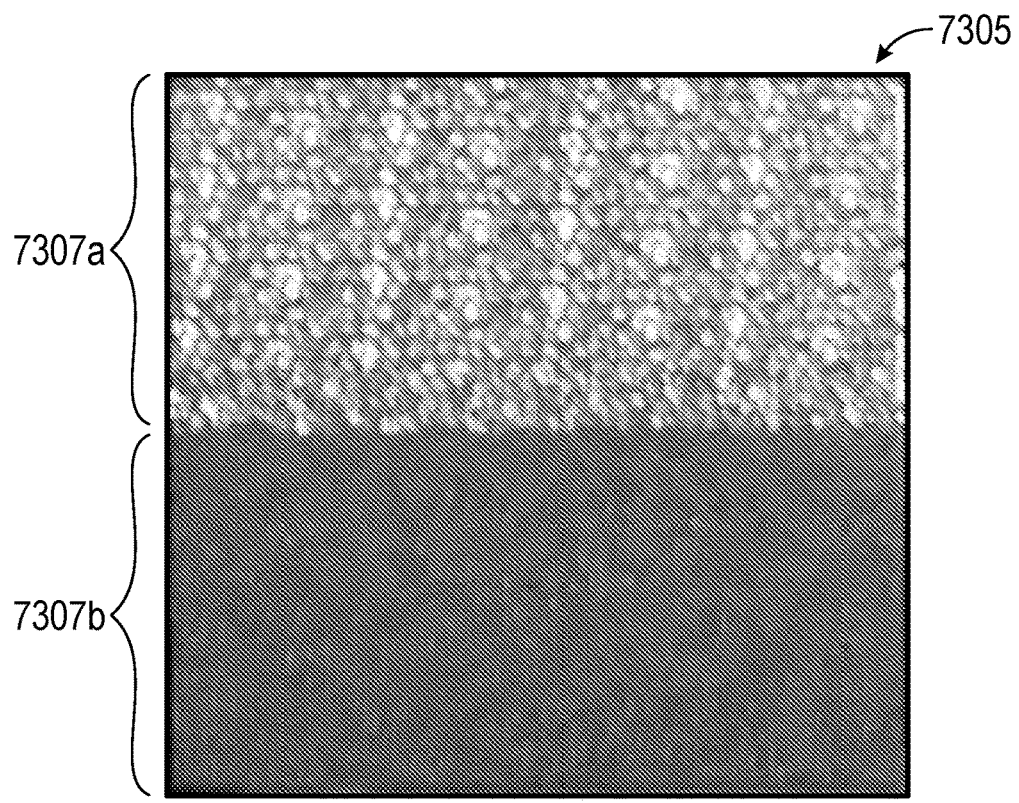
FIG. 73B is a picture of the article of FIG. 73A but at a greater observation angle.
Figure 73C:
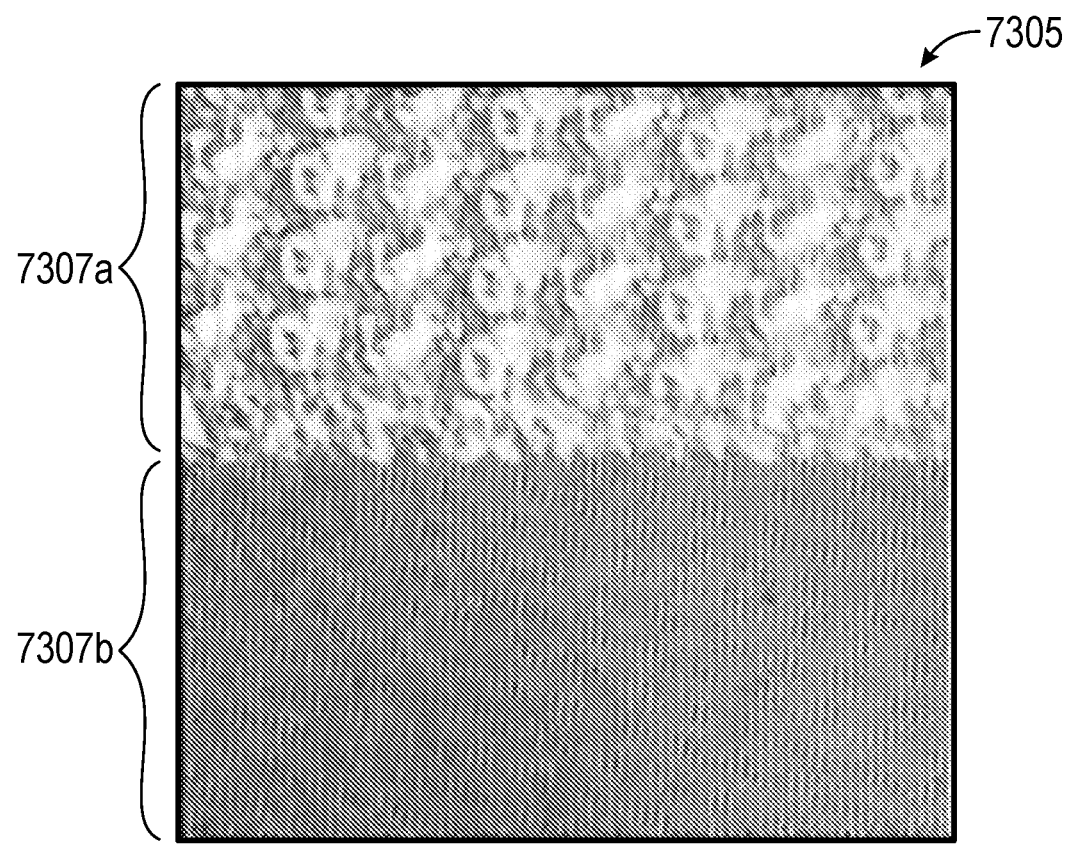
FIG. 73C is a picture of the article of FIGS. 73A & 73B but at a still greater observation angle.

FIG. 73A is a photograph of the resulting machined substrate 7305, where the working surface is divided into a first portion 7307a containing the first array of (non-orthogonal) PG cube corner elements, and a second portion 7307b containing the second array of (orthogonal) PG cube corner elements. The observation geometry for FIG. 73A used normal illumination, i.e., illumination along an illumination axis substantially parallel to the Z-axis of the substrate, and a small or zero observation angle, i.e., the angle between the illumination axis and an observation axis (a line drawn from the substrate to the camera lens) was substantially zero. FIGS. 73B and 73C are photographs of the same machined substrate 7305 using the same normal illumination but at substantially larger observation angles. At the larger observation angles, the array of orthogonal cube corner elements loses brightness, while the array of non-orthogonal cube corner elements gains brightness (relative to zero observation angle) as a consequence of the dihedral angle errors. Note that the pattern discussed above relating to the re-use of the random number sets can be seen in each of FIGS. 73A-C in the working surface portion 7307a.

This Example 1 article exhibits two types of indicia features that can be usefully employed in a security article. One such indicia feature is represented by the contrast between the first portion 7307a (a first region of the structured surface) and the second portion 7307b (a second region of the structured surface). Those two regions are arranged as adjacent rectangular-shaped areas with a straight boundary between them, such areas and boundary being suitable for use as a first indicia or portion thereof. By comparison of FIGS. 73A-C, the visual contrast between these two regions can be seen to change significantly as a function of illumination/observation geometry.

The Example 1 article also embodies a second indicia feature. The second indicia feature is smaller in scale than the first indicia feature, and is characterized by the repeating pattern of brighter and darker areas within the boundary of the first portion 7307a. The repeating pattern can best be seen (i.e., it is most visually apparent) in FIG. 73C. The repeating pattern forms a second indicia, and is made up of a collection of regions in which cube corner elements with different sets of dihedral angle errors are spatially distributed in a recurring fashion throughout the first portion 7307a, as a result of the re-use of the sets of random numbers that were used to form the cube corner elements.

Example 2

Non-Canted Full Cubes with Semi-Circular MNO Pattern

An array of full (PG) cube corner elements was made on another hard copper substrate using substantially the same procedure as described above in connection with Example 1, except for the manner in which the small offsets which produced the dihedral angle errors were applied. Rather than applying the offsets with different sets of random numbers to a sequence of cube corner elements (as was done in Example 1), the cube corner elements were instead formed according to a binary decision process, i.e., they were formed either with no offset (thus producing a matched pair of rectangular cube corner elements with substantially no dihedral angle errors), or with a small fixed offset equal to 0.005 mm (thus producing a matched pair of rectangular cube corner elements with nonzero dihedral angle errors). For each matched pair of rectangular cube corner elements made, the controller for the end milling machine was programmed to choose between the zero offset or the small fixed offset as a function of position on the substrate where the matched pair was located: for positions that fell within a semicircular arc-shaped region of inner radius 10 mm and outer radius 12 mm, the small fixed offset was applied, but for positions outside of the semicircular arc-shaped region, no offset was applied.

The result was an array of about 1300 cube corner elements, each having a rectangular perimeter in plan view with side dimensions of 400 micrometers in the X direction and 231 micrometers in the Y direction, the array filling a rectangular area on the substrate about 15 mm in the X direction and 8 mm in the Y direction. The cube corner elements located in the predetermined semicircular arc-shaped region were non-orthogonal, i.e., they had nonzero dihedral angle errors, whereas the remaining cube corner elements were orthogonal, i.e., they had substantially no dihedral angle errors. The entire rectangular array was retroreflective, but the retroreflective characteristics were different between first cube corner elements (e.g. those located within the arc-shaped region) and second cube corner elements (those located outside the arc-shaped region) as a result of the slightly modified geometry of the optical faces.

Figure 74B:
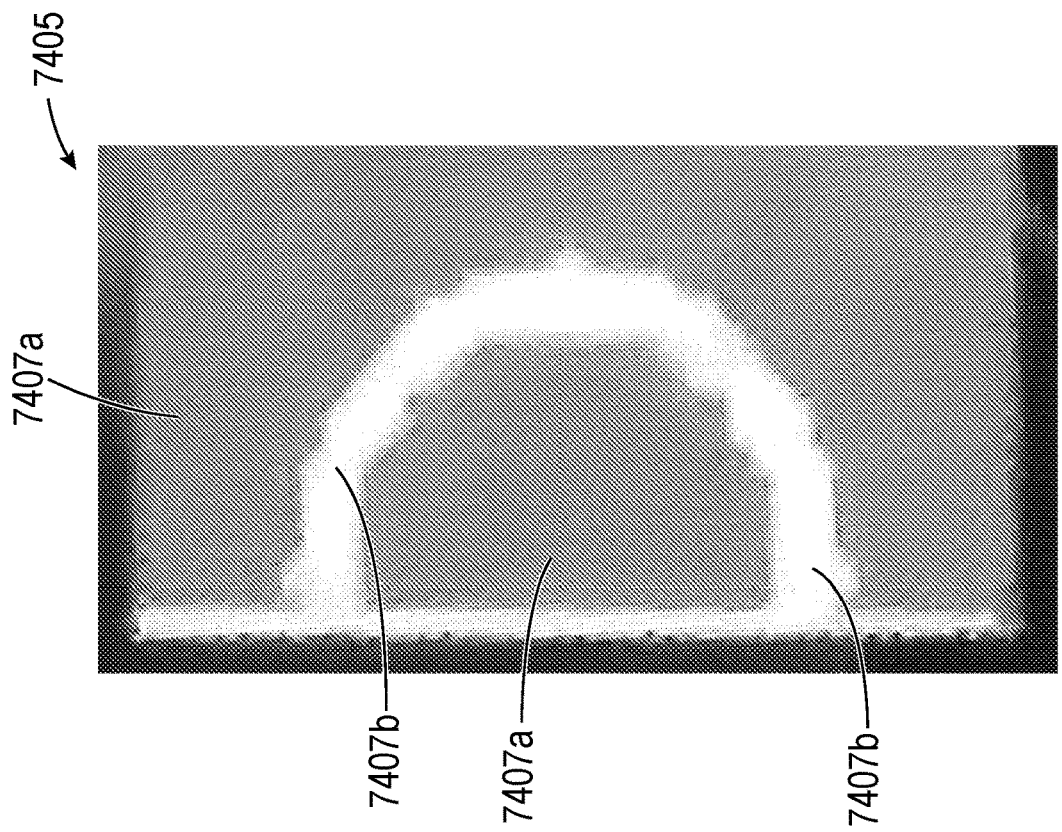
FIG. 74B is a picture of the article of FIG. 74A but at a greater observation angle.
Figure 74A:
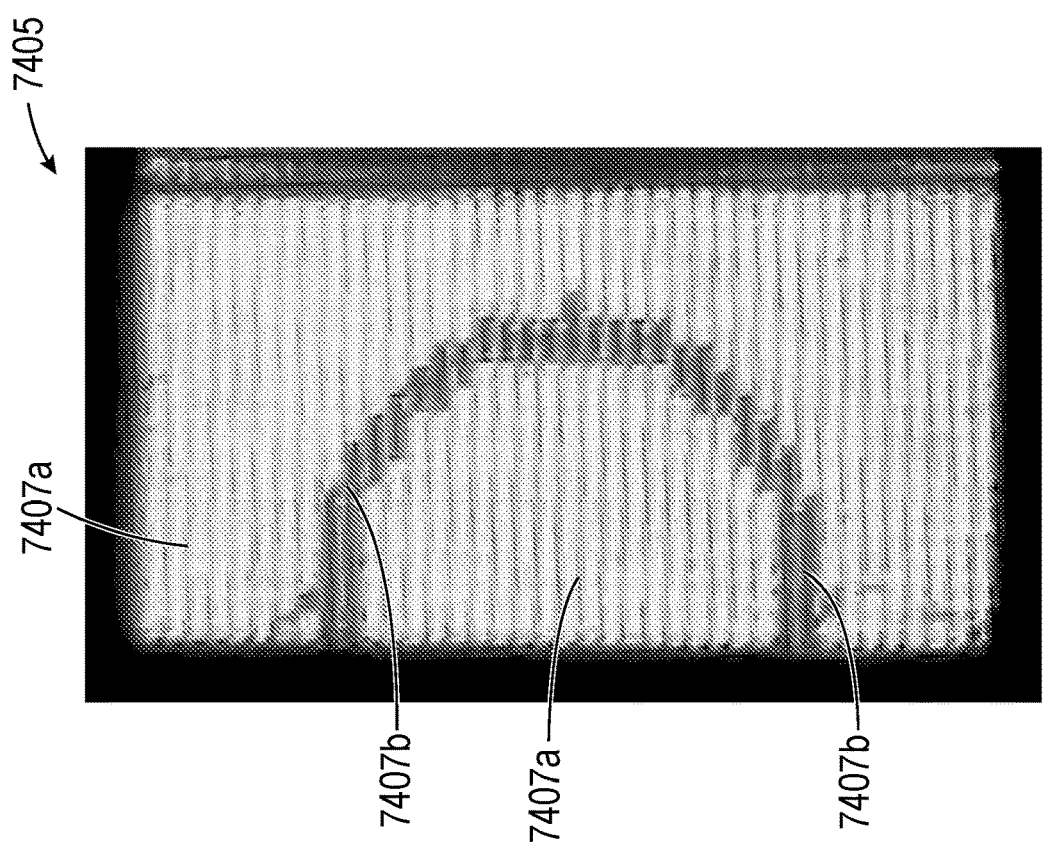
FIG. 74A is a picture of a retroreflective cube corner article, suitable for use as a security article, in which some PG cube corner elements in one zone incorporate substantial dihedral angle errors, the picture taken at a small observation angle.

Photographs of the Example 2 article are shown in FIGS. 74A and 74B. These photographs differ only in the observation geometry used to take the photographs. In both cases, the article was illuminated with substantially normally incident light. In the photograph of FIG. 74A, the camera lens was located close to the illumination axis, such that the observation angle was small or zero. In the photograph of FIG. 74B, the camera lens was farther away from the illumination axis, such that the observation angle was larger. Predictably, the non-orthogonal cube corner elements were brighter for the larger observation angle. The contrast between the two regions, and of the arc-shaped indicia, changed as a function of illumination geometry and observation geometry.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. An article, comprising:
a substrate having a structured surface that extends along a reference plane, the structured surface including distinct microstructures formed therein, each of the microstructures being a recess or a protrusion;
wherein each of the microstructures has a first face, and a second face distinct from the first face, that connect to each other by a rounded edge, the rounded edge extending along an axis that is inclined at an angle α relative to the reference plane; and
wherein the microstructures comprise first microstructures and second microstructures that differ from each other to define indicia.

2. The article of claim 1, wherein each of the microstructures has at least one characteristic dimension on the order of 1 millimeter or less.

3. The article of claim 1, wherein the first microstructures and the second microstructures both comprise cube corner elements.

4. The article of claim 1, wherein the first microstructures differ from the second microstructures in terms of orientation, and the orientation is with regard to rotation about an axis orthogonal to the reference plane.

5. The article of claim 1, wherein the indicia has a visibility that changes as a function of one or both of illumination geometry and observation geometry.

6. The article of claim 1, wherein the rounded edge has a radius of curvature of at least 10 micrometers as measured in a selected cross-sectional plane.

7. The article of claim 1, wherein the rounded edge exhibits a curvature of constant radius in a selected cross-sectional plane but not in a cross-sectional plane that is perpendicular to both the first and second faces.

8. The article of claim 1, wherein the article is a master, and the structured surface is a working surface of the master.

9. The article of claim 1, wherein the substrate is thin and flexible, with a length and width greater than its thickness.

10. The article of claim 9, wherein the article is a cube corner sheeting.

11. An article, comprising:
a substrate having a structured surface that extends along a reference plane, the structured surface including cube corner elements formed therein;
wherein the cube corner elements comprise first cube corner elements and second cube corner elements that differ from each other to define indicia; and
wherein at least some of the cube corner elements each have a compound face that includes a first face and a second face that meet along a break line, the break line being inclined relative to the reference plane.

12. The article of claim 11, wherein, for each of the at least some of the cube corner elements, the cube corner element has a vertex, and the break line extends to the vertex.

13. The article of claim 11, wherein each of the cube corner elements has at least one characteristic dimension on the order of 1 millimeter or less.

14. The article of claim 11, wherein the first cube corner elements differ from the second cube corner elements in terms of orientation, and the orientation is with regard to rotation about an axis orthogonal to the reference plane.

15. The article of claim 11, wherein the indicia has a visibility that changes as a function of one or both of illumination geometry and observation geometry.

16. A method of making a security article, comprising:
providing a substrate having a working surface, the working surface extending along a reference plane; and
forming a plurality of microstructures in the substrate, the microstructures including first microstructures and second microstructures that differ from each other to define indicia;
wherein the forming includes:
cutting the substrate with a rotating end mill to form a recess in the substrate; and
during the cutting, causing the rotating end mill to move along a cutting path relative to the substrate, wherein the cutting path includes a path portion that is inclined relative to the reference plane.

17. The method of claim 16, further including forming distinct first and second faces of the recess during the cutting as the rotating end mill moves along the path portion wherein the first and second faces are nominally flat and are connected by a rounded edge.

18. The method of claim 16, wherein the first microstructures and the second microstructures both comprise cube corner elements.

19. The method of claim 16, wherein the first microstructures differ from the second microstructures in terms of orientation, and the orientation is with regard to rotation about an axis orthogonal to the reference plane.

20. The method of claim 16, wherein the forming is carried out such that the indicia has a visibility that changes as a function of one or both of illumination geometry and observation geometry.

* * * * *